US011190744B2

(12) United States Patent
Fuchie et al.

(10) Patent No.: US 11,190,744 B2
(45) Date of Patent: Nov. 30, 2021

(54) IMAGE PROCESSING DEVICE, IMAGE PROCESSING METHOD, AND PROGRAM FOR DETERMINING A COST FUNCTION FOR MODE SELECTION

(71) Applicant: SONY CORPORATION, Tokyo (JP)

(72) Inventors: Takaaki Fuchie, Kanagawa (JP); Masaki Hirose, Tokyo (JP); Atsuo Yada, Kanagawa (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/346,783

(22) PCT Filed: Oct. 17, 2017

(86) PCT No.: PCT/JP2017/037572
§ 371 (c)(1),
(2) Date: May 1, 2019

(87) PCT Pub. No.: WO2018/116603
PCT Pub. Date: Jun. 28, 2018

(65) Prior Publication Data
US 2019/0281267 A1     Sep. 12, 2019

(30) Foreign Application Priority Data
Dec. 19, 2016 (JP) .............................. JP2016-246000

(51) Int. Cl.
*H04N 19/107*   (2014.01)
*H04N 19/109*   (2014.01)
(Continued)

(52) U.S. Cl.
CPC ................. *H04N 9/68* (2013.01); *H04N 9/87* (2013.01); *H04N 19/107* (2014.11);
(Continued)

(58) Field of Classification Search
None
See application file for complete search history.

(56) References Cited

U.S. PATENT DOCUMENTS

| 2008/0240240 A1 | 10/2008 | Kodama |
| 2015/0245044 A1 | 8/2015 | Guo et al. |

(Continued)

FOREIGN PATENT DOCUMENTS

| CN | 105850134 A | 8/2016 |
| EP | 3 021 561 A1 | 5/2016 |

(Continued)

OTHER PUBLICATIONS

International Search Report dated Jan. 23, 2018 in PCT/JP2017/037572.

(Continued)

*Primary Examiner* — Jayanti K Patel
*Assistant Examiner* — Christopher Kingsbury Glover
(74) *Attorney, Agent, or Firm* — Oblon, McClelland, Maier & Neustadt, L.L.P.

(57) ABSTRACT

An image processing device is described. The circuitry of the image processing device obtains an image that is generated on a basis of an incident light and a transfer function related to a conversion between the incident light and the image, and determines a cost function for prediction mode selection according to the transfer function. The cost function calculates a cost value based on a first parameter corresponding to a prediction residual code amount and a second parameter corresponding to a prediction mode code amount. The cost function is determined in a manner in favor of increasing the prediction residual code amount or decreasing the prediction mode code amount as a dynamic range of the transfer function increases. The circuitry determines a prediction mode for coding a coding unit of the (Continued)

image according to the determined cost function, and encodes the coding unit according to the determined prediction mode.

18 Claims, 35 Drawing Sheets

(51) Int. Cl.
    *H04N 19/147*     (2014.01)
    *H04N 19/61*     (2014.01)
    *H04N 9/68*     (2006.01)
    *H04N 19/162*     (2014.01)
    *H04N 9/87*     (2006.01)
    *H04N 19/117*     (2014.01)

(52) U.S. Cl.
    CPC ......... *H04N 19/109* (2014.11); *H04N 19/117* (2014.11); *H04N 19/147* (2014.11); *H04N 19/162* (2014.11); *H04N 19/61* (2014.11)

(56) References Cited

U.S. PATENT DOCUMENTS

| | | | |
|---|---|---|---|
| 2015/0245050 A1* | 8/2015 | Tourapis | H04N 19/98 375/240.02 |
| 2016/0134870 A1* | 5/2016 | Lu | H04N 19/147 375/240.03 |
| 2016/0360215 A1* | 12/2016 | Rusanovskyy | H04N 19/1887 |
| 2017/0085878 A1* | 3/2017 | Sole Rojals | H04N 19/46 |
| 2017/0155903 A1* | 6/2017 | Rosewarne | H04N 19/159 |
| 2018/0167615 A1* | 6/2018 | Kim | H04N 19/98 |
| 2019/0037213 A1* | 1/2019 | Hermansson | H04N 19/157 |

FOREIGN PATENT DOCUMENTS

| | | |
|---|---|---|
| EP | 3 301 925 A1 | 4/2018 |
| JP | 2011-506536 | 3/2011 |
| JP | 2014-518030 | 7/2014 |
| JP | 2015-144404 | 8/2015 |
| WO | WO 2009/087952 A1 | 7/2009 |
| WO | WO 2012/147018 A2 | 11/2012 |
| WO | WO 2015/130797 A1 | 9/2015 |
| WO | WO 2016/168652 A1 | 10/2016 |
| WO | WO 2016/199409 A1 | 12/2016 |
| WO | WO 2016/200969 A1 | 12/2016 |

OTHER PUBLICATIONS

Supplementary European Search Report dated Jan. 7, 2020.
Liu, Shan et al. "Bit-depth Scalable Coding for High Dynamic Range Video," Visual Communications and Image Processing, Jan. 29, 2008.

* cited by examiner

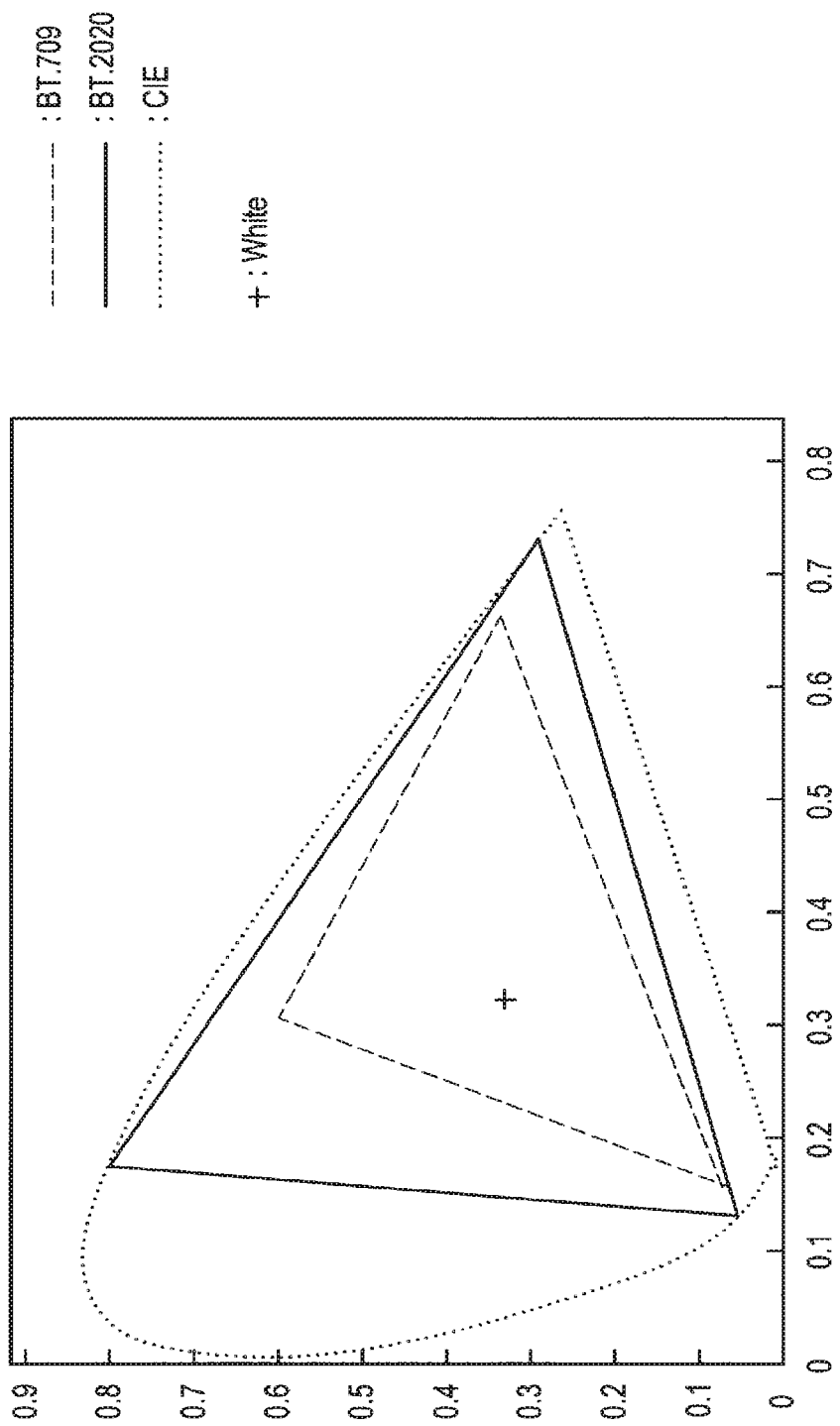

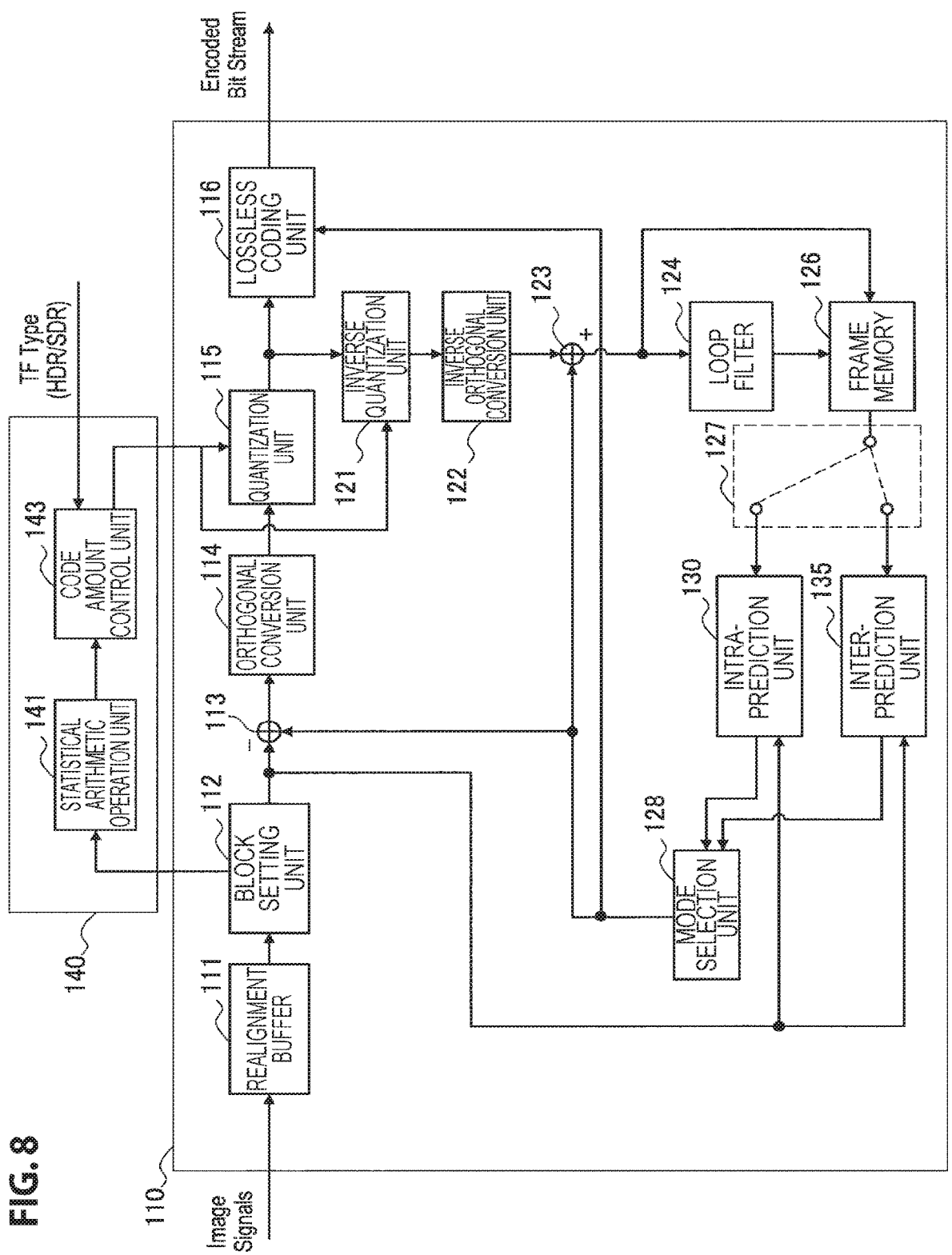

IMAGE PROCESSING DEVICE, IMAGE PROCESSING METHOD, AND PROGRAM FOR DETERMINING A COST FUNCTION FOR MODE SELECTION

TECHNICAL FIELD

The present disclosure relates to an image processing device, an image processing method, and a program.

BACKGROUND ART

In the related art, a large number of video coding schemes for efficiently coding videos have been standardized. For example, H.264/advanced video coding (AVC) that ITU-T and ISO/IEC developed together is a standard coding scheme of a later model of MPEG-2 (see Non-Patent Literature 1). According to H.264/AVC, image signals are coded to bit streams with improved coding efficiency using a variety of element technologies such as prediction, orthogonal conversion, quantization, and entropy coding. Further, it is believed that H.265/high efficiency video coding (HEVC) that is a standard coding scheme of a later model of H.264/AVC achieves coding efficiency of about four times the coding efficiency of MPEG-2 and about double the coding efficiency of H.264/AVC (see Non-Patent Literature 2).

Separately from seeking high coding efficiency, extension of video image signal expressions has been pursued in order to enable more faithful reproduction of a state of an actual world or display of a video image with more extensive brightness and colors in recent years. A high dynamic range (HDR) is a concept for attempting to express an image or a video image in a wider luminance dynamic range than a standard dynamic range (SDR) that is a standard dynamic range in the related art. For example, it is known that light in the actual world with a luminance of greater than 100 nits can be reproduced on a display by converting light into an image signal (and converting the image signal to the light) with a transfer function (also referred to as a tone curve) such as hybrid log-gamma (HLG), ST2084, or S-Log 3 (see Non-Patent Literature 3 for HLG). In another example, BT.2020 standardized by ITU-R defines a color range that enables expressions of clearer colors as compared with a color range of BT.709 that has been used in many applications until now.

CITATION LIST

Non-Patent Literature

Non-Patent Literature 1: ITU-T, "H.264: Advanced video coding for generic audiovisual services", ITU-T Recommendation H.264, November 2007

Non-Patent Literature 2: ITU-T, "H.265: High efficiency video coding," ITU-T Recommendation H.265, October 2014

Non-Patent Literature 3: Association of Radio Industries and Businesses, "ESSENTIAL PARAMETER VALUES FOR THE EXTENDED IMAGE DYNAMIC RANGE TELEVISION (EIDRTV) SYSTEM FOR PROGRAMME PRODUCTION ARIB STANDARD", ARIB STD-B67 Version 1.0, Jul. 3, 2015. The document was retrievable on Nov. 24, 2016, from the web site of Association of Radio Industries and Businesses (ARIB) in Japan, file name: "2-STD-B67v1_0.pdf".

DISCLOSURE OF INVENTION

Technical Problem

Existing devices involved in signal conversion for coding, decoding, imaging, or reproducing video images (or individual images included in video images) cannot necessarily sufficiently be adapted to video image signal expressions that are being diversified. A similar situation is also conceivable for image processing of stationary images.

It is desirable to provide a mechanism capable of providing satisfactory image quality irrespective of signal expression schemes.

Solution to Problem

According to the present disclosure, there is provided an image processing device including: a coding unit that codes an image acquired on the basis of a transfer function related to conversion between light and an image signal; and a control unit that controls a coding amount assigned to each partial region of the image in the coding unit, on the basis of the transfer function.

In addition, according to the present disclosure, there is provided an image processing method including: coding an image acquired on the basis of a transfer function related to conversion between light and an image signal; and controlling a coding amount assigned to each partial region of the image during the coding, on the basis of the transfer function.

In addition, according to the present disclosure, there is provided a program that causes a processor of an image processing device to function as: a coding unit that codes an image acquired on the basis of a transfer function related to conversion between light and an image signal; and a control unit that controls a coding amount assigned to each partial region of the image in the coding unit, on the basis of the transfer function.

In addition, according to the present disclosure, there is provided an image processing device including: a coding unit that codes an image acquired on the basis of a transfer function related to conversion between light and an image signal for enabling display with a luminance of greater than 100 nits; and a control unit that controls a coding amount assigned to each partial region of the image in the coding unit depending on at least one of a luminance component or a chrominance component of the partial region.

In addition, according to the present disclosure, there is provided an image processing method including: coding an image acquired on the basis of a transfer function related to conversion between light and an image signal for enabling display with a luminance of greater than 100 nits; and controlling a coding amount assigned to each partial region of the image during the coding, depending on at least one of a luminance component or a chrominance component of the partial region.

In addition, according to the present disclosure, there is provided a program that causes a processor of an image processing device to function as: a coding unit that codes an image acquired on the basis of a transfer function related to conversion between light and an image signal for enabling display with a luminance of greater than 100 nits; and a control unit that controls a coding amount assigned to each partial region of the image in the coding unit depending on at least one of a luminance component or a chrominance component of the partial region.

Also, according to the present disclosure, there is provided an image processing device including: a coding unit that codes an image acquired on the basis of a transfer function related to conversion between light and an image signal; and a control unit that controls a predicted residual coding amount or a mode coding amount for mode selection when the image is coded in the coding method, on the basis of the transfer function.

Also, according to the present disclosure, there is provided an image processing method including: coding an image acquired on the basis of a transfer function related to conversion between light and an image signal; and controlling a predicted residual coding amount or a mode coding amount for mode selection when the image is coded, on the basis of the transfer function.

Also, according to the present disclosure, there is provided a program that causes a processor of an image processing device to function as a coding unit that codes an image acquired on the basis of a transfer function related to conversion between light and an image signal; and a control unit that controls a predicted residual coding amount or a mode coding amount for mode selection when the image is coded in the coding unit, on the basis of the transfer function.

Advantageous Effects of Invention

According to the technology of the present disclosure, it is possible to provide satisfactory image quality irrespective of signal expression schemes.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 5 is an explanatory diagram for explaining color ranges defined by BT.709 and BT.2020.

FIG. 8 is a block diagram illustrating an example of detailed configurations of a control unit and a coding unit according to the first embodiment.

MODES FOR CARRYING OUT THE INVENTION

Figure 1A:
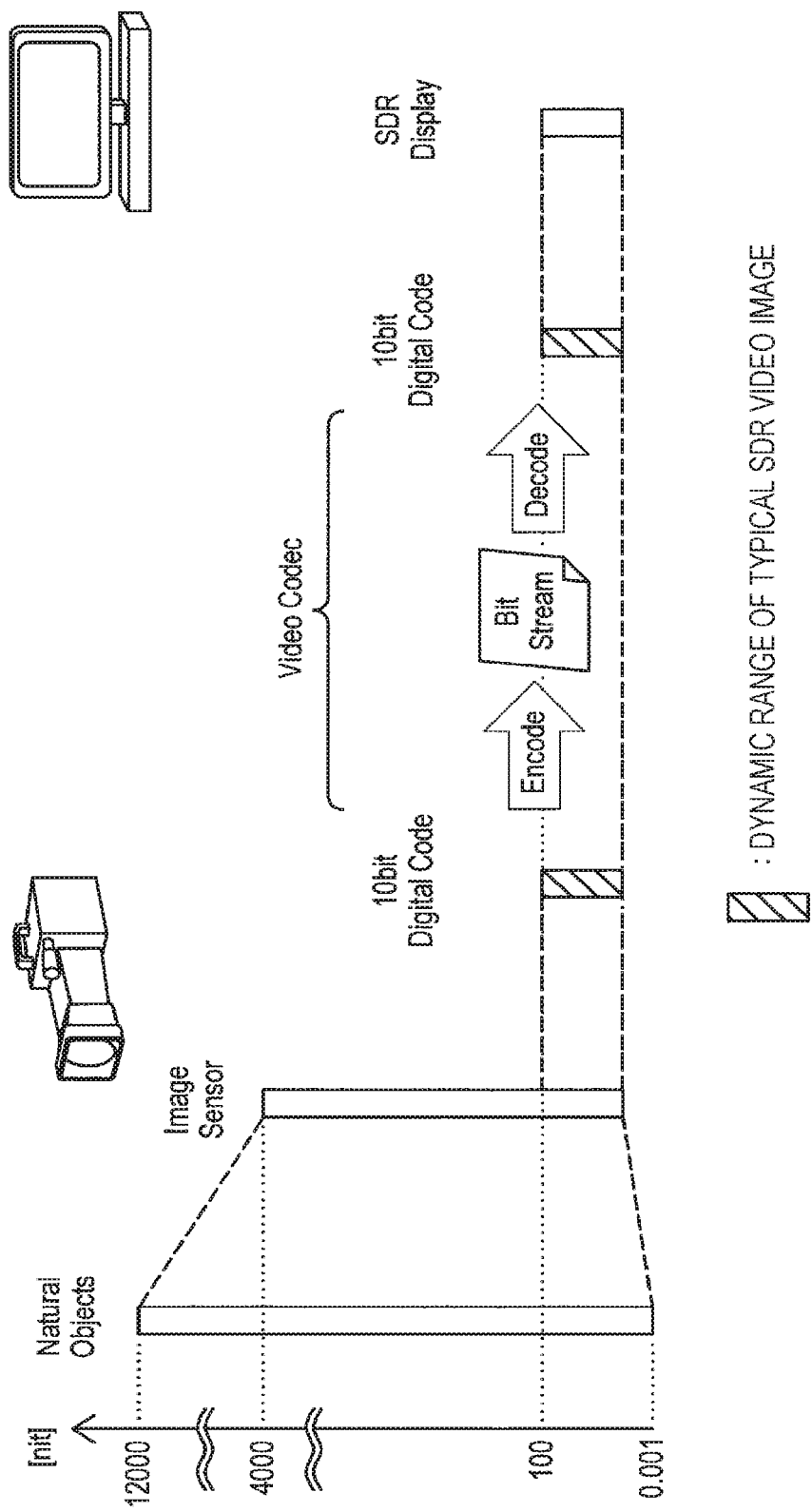
FIG. 1A is an explanatory diagram for explaining a luminance dynamic range of an SDR video image.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Also, description will be given in the following order.
1. Explanation of related technologies
1-1. SDR and HDR
1-2. Codec distortion
1-3. Transfer function
1-4. Color range
2. First embodiment
2-1. Introduction
2-2. Outline of system
2-3. Schematic configuration of image processing device
2-4. Detailed configurations of coding unit and control unit
2-5. Flow of processing
2-6. Modification example
2-7. Overview of first embodiment
3. Second embodiment
3-1. Introduction
3-2. Outline of system
3-3. Schematic configuration of image processing device
3-4. Detailed configurations of coding unit and control unit
3-5. Flow of processing
3-6. Overview of second embodiment
4. Hardware configuration example
5. Application examples
6. Summary <1. Explanation of Related Technologies>
[1-1. SDR and HDR]

In recent years, extension of video image signal expressions has been pursued in order to enable more faithful reproduction of a state of an actual world or reproduction of a video image with more extensive brightness and colors. HDR is a concept for attempting to express an image or a video image in a wider luminance dynamic range than SDR that is a standard dynamic range in the related art.

FIG. 1A is an explanatory diagram for explaining a luminance dynamic range of an SDR video image. The vertical axis in FIG. 1A represents luminance[nits]. The maximum luminance in the natural world may reach 20000 nits, and luminance of typical objects is about 12000 nits at maximum, for example. The upper limit of a dynamic range of an image sensor is lower than the maximum luminance in the natural world and may be 4000 nits, for example. An imaging device such as a digital camera or a digital camcorder converts an electrical signal generated by performing photoelectric conversion on incident light using an image sensor into a 10-bit digital image signal, for example, in a signal processing circuit in a latter stage of the image sensor. In a signal format of an SDR video image in the related art, grayscale at a high luminance part exceeding 100 nits is lost during such conversion. The digital image signal generated by the imaging device is coded by a predetermined video image coding scheme (also referred to as a video codec) in accordance with a purpose of an application such as transmission or recording, for example, and is converted into a coded bit stream. Then, when the SDR video image is displayed, a digital image signal acquired by decoding the coded bit stream is provided to a display device, and a video image is reproduced with display luminance with an upper limit of 100 nits.

Figure 1B:
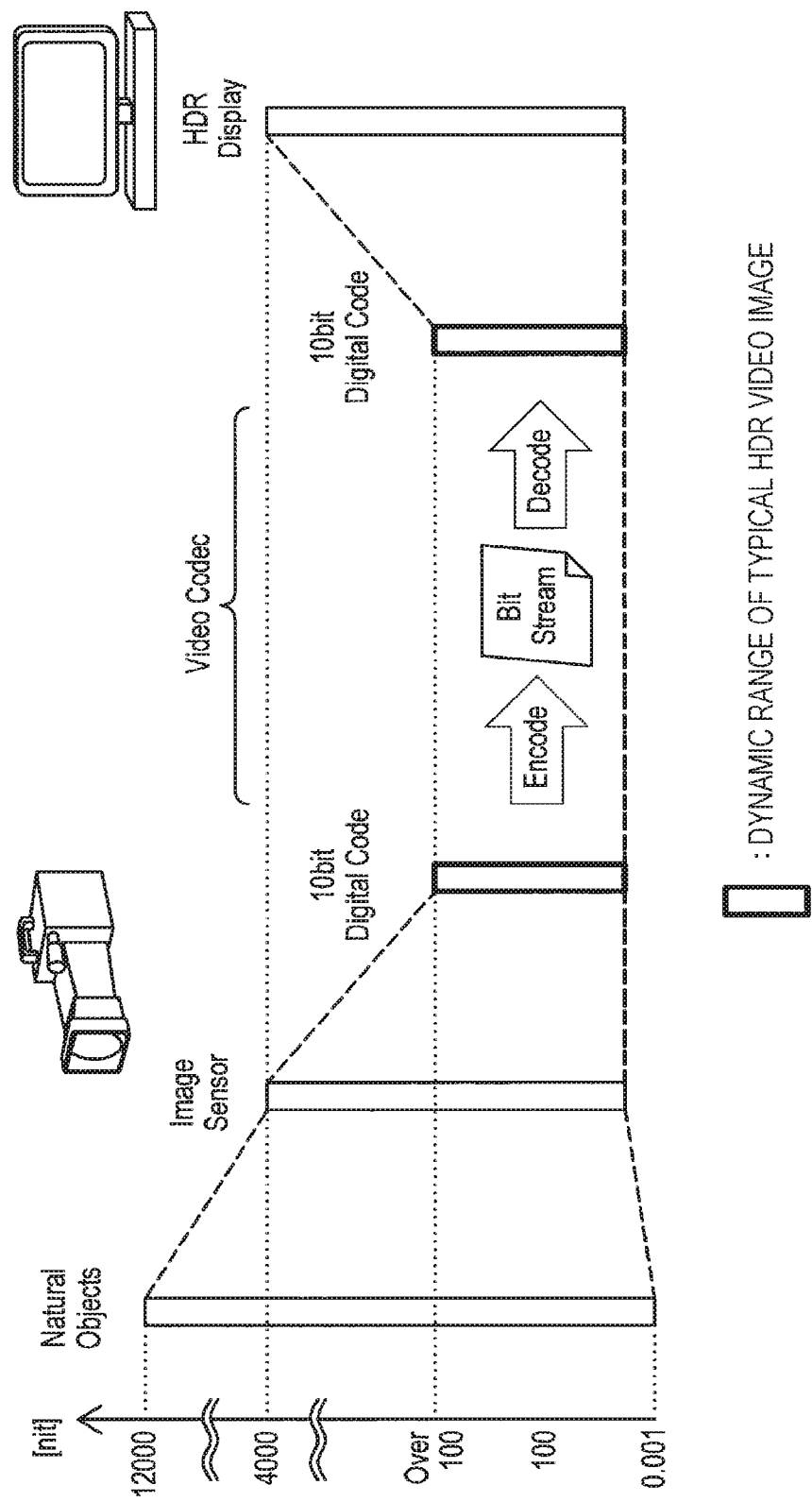
FIG. 1B is an explanatory diagram for explaining a luminance dynamic range of an HDR video image.

FIG. 1B is an explanatory diagram for describing a luminance dynamic range of an HDR video image. Similarly to the case of the SDR, an imaging device converts light that is incident on an image sensor into an analog electrical signal and further converts the analog electrical signal into a 10-bit digital image signal, for example. A signal format of the HDR video image enables maintenance of grayscale at a high luminance part exceeding 100 nits during such conversion and reproduction of a video image with a luminance with an upper limit of several hundreds or thousands of nits. The digital image signal generated by the imaging device is also coded by a predetermined video image coding scheme in accordance with a purpose of an application and is converted into a coded bit stream. When the HDR video image is displayed, a digital image signal acquired by decoding the coded bit stream is provided to a display device, and a video image is reproduced in a luminance dynamic range including display luminance of greater than 100 nits.

Note that a case in which the upper limit of the luminance dynamic range is equal to or less than 100 nits is assumed to correspond to the SDR and a case in which the upper limit is greater than 100 nits is assumed to correspond to the HDR here as a reference for categorizing the SDR and the HDR. However, at a certain timing in the future, a dynamic range that will be widely distributed (that is, will become a standard) at the timing and a newer dynamic range (with a higher upper limit) may be categorized using a reference value that is greater than 100 nits rather than 100 nits. The technology according to the present disclosure can be widely applied to cases in which two dynamic ranges have mutually different upper limits in general and is not limited by what reference value is used to categorize the dynamic ranges. The SDR is also referred to as a low dynamic range (LDR) in contrast to the HDR.

[1-2. Codec Distortion]

In either of an SDR video image or an HDR video image, if an image signal is coded by a video image coding scheme including lossy compression, image quality may deteriorate in an image reproduced on the basis of a decoded image signal. Such deterioration of image quality will be referred to as codec distortion in this specification. A degree of the codec distortion may be evaluated using an index of a peak signal-to-noise ratio (PSNR). In general, in a case in which coding efficiency is assumed to be equivalent, image quality of an image coded/decoded by H.264/AVC is higher than image quality of an image coded/decoded by MPEG-2, and image quality of an image coded/decoded by H.265/HEVC is higher than that of H.264/AVC. However, evaluation of the codec distortion is typically performed by comparing an original image input to an encoder with a decoded image output from a decoder. How signal conversion that is performed during capturing or displaying of an HDR video image or reduction or extension of a dynamic range affects the codec distortion is not well known.

The present inventors conducted an experiment in which multiple sample video images were converted into image signals in a signal format for the HDR, and after coding and decoding using an encoder and a decoder in accordance with H.264/AVC, image quality of HDR video images reproduced from the image signals after the decoding was verified. As a result, it was recognized that there were cases in which degradation of the image quality that was not sensed in SDR video images using the same samples was visually recognized in the HDR video images in the video codec. The degradation of the image quality was scattered over the entire images mainly in the form of block noise or mosquito noise and also significantly occurred in parts of the images.

The degree of degradation occurring when the same 10-bit image signal is coded by the same video image coding scheme is typically similar. The reason that distortion that was not sensed (or hardly sensed) in the SDR video image was still detected in the HDR video image is considered to be because codec distortion was enlarged together when the dynamic range of the image signals after the decoding was extended.

Figure 2A:
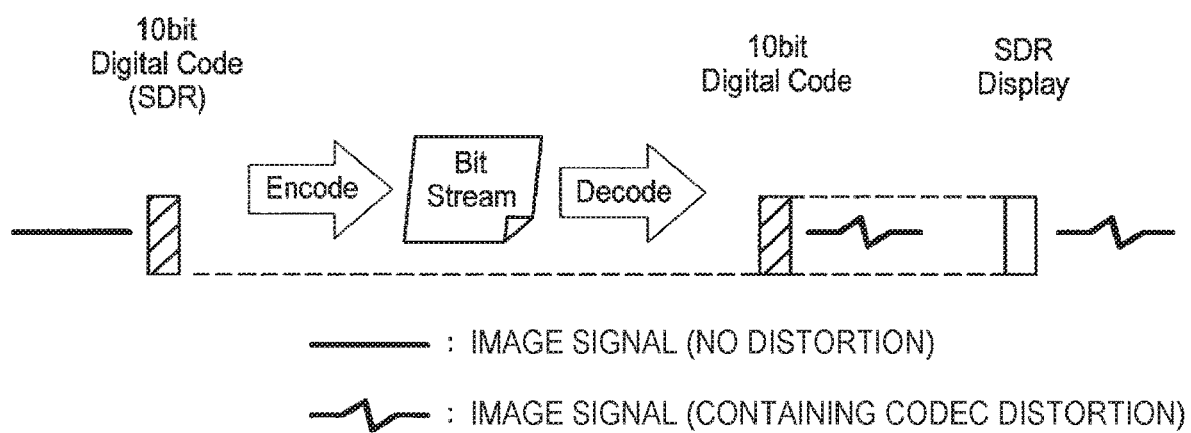
FIG. 2A is an explanatory diagram for explaining codec distortion of an image signal of an SDR video image.
Figure 2B:
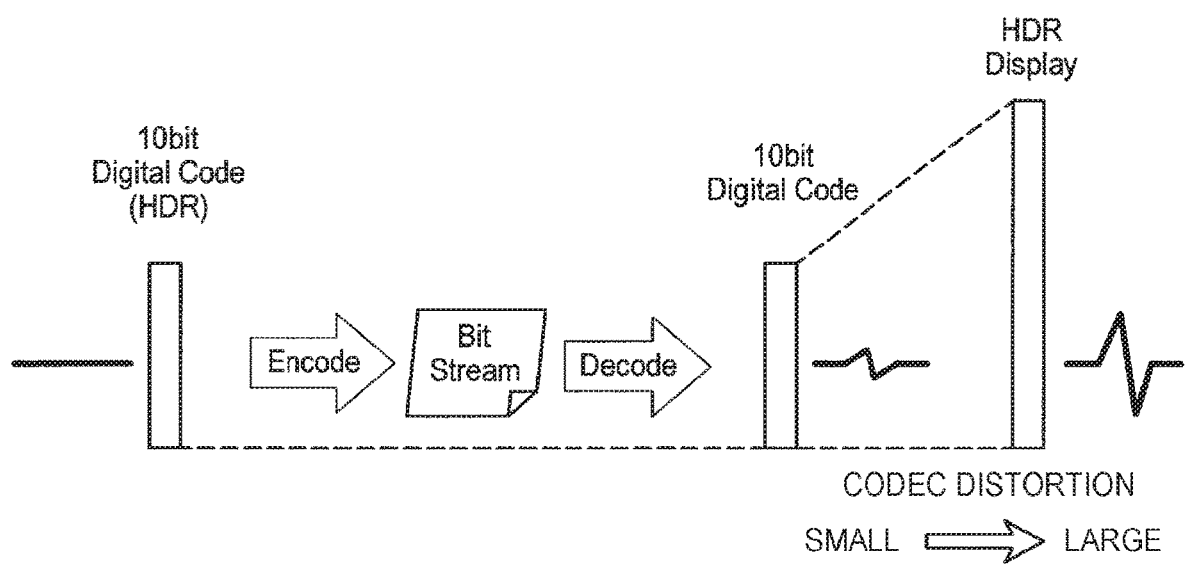
FIG. 2B is an explanatory diagram for explaining codec distortion of an image signal of an HDR video image.

FIG. 2A illustrates a state in which codec distortion occurs in an image signal of an SDR video image after coding and decoding. Since the codec distortion is not enlarged when the SDR video image is reproduced, the distortion is not subjectively sensed if the distortion is sufficiently small. Meanwhile, FIG. 2B illustrates a state in which codec distortion also occurs in an image signal of an HDR video image. When the HDR video image is reproduced, a probability of deterioration of image quality such as block noise or mosquito noise being subjectively sensed increases as a result of the enlargement of the codec distortion with the extension of the dynamic range.

Figure 2C:
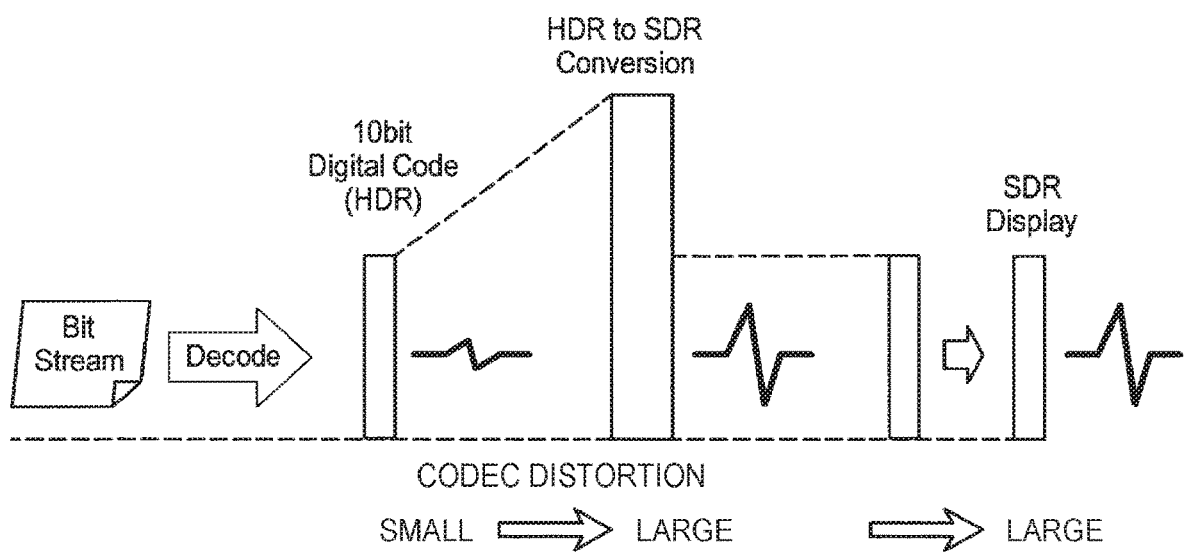
FIG. 2C is an explanatory diagram for explaining codec distortion that is enlarged through HDR-SDR conversion.

The codec distortion may also be enlarged when format conversion from the HDR to the SDR is executed on an image signal expressed in a signal format for the HDR. FIG. 2C illustrates a state in which codec distortion is enlarged after format conversion from the HDR to the SDR, that is, HDR-SDR conversion. The HDR-SDR conversion generally includes processing of restoring an image signal (obtained by decoding a coded bit stream, for example) to an original signal corresponding to an output of an image sensor with an inverse function of a transfer function corresponding to a signal format for the HDR and processing of reconverting the restored original signal into an image signal for the SDR with a transfer function corresponding to a signal format for the SDR. Codec distortion enlarged in the former processing is not reduced in the reconversion into the signal format for the SDR. Therefore, if the SDR video image is reproduced on the basis of the image signal after the HDR-SDR conversion, this may lead to a result in which the enlarged codec distortion is subjectively sensed.

If the codec distortion as described above is caused by performance of the video image coding scheme itself, the distortion should uniformly occur. However, in the aforementioned verification of the sample video images, it was confirmed that distortion significantly appeared in characteristic partial regions as listed below in addition to the distortion scattered over the entire images:

Regions with high luminance (for example, clouds in the sky)

Regions with bright colors (for example, a lamp emitting red or blue light)

A reason that the distortion significantly appeared in these partial regions relates to the signal transfer function of the signal format for the HDR.

[1-3. Transfer Function]

Figure 3:
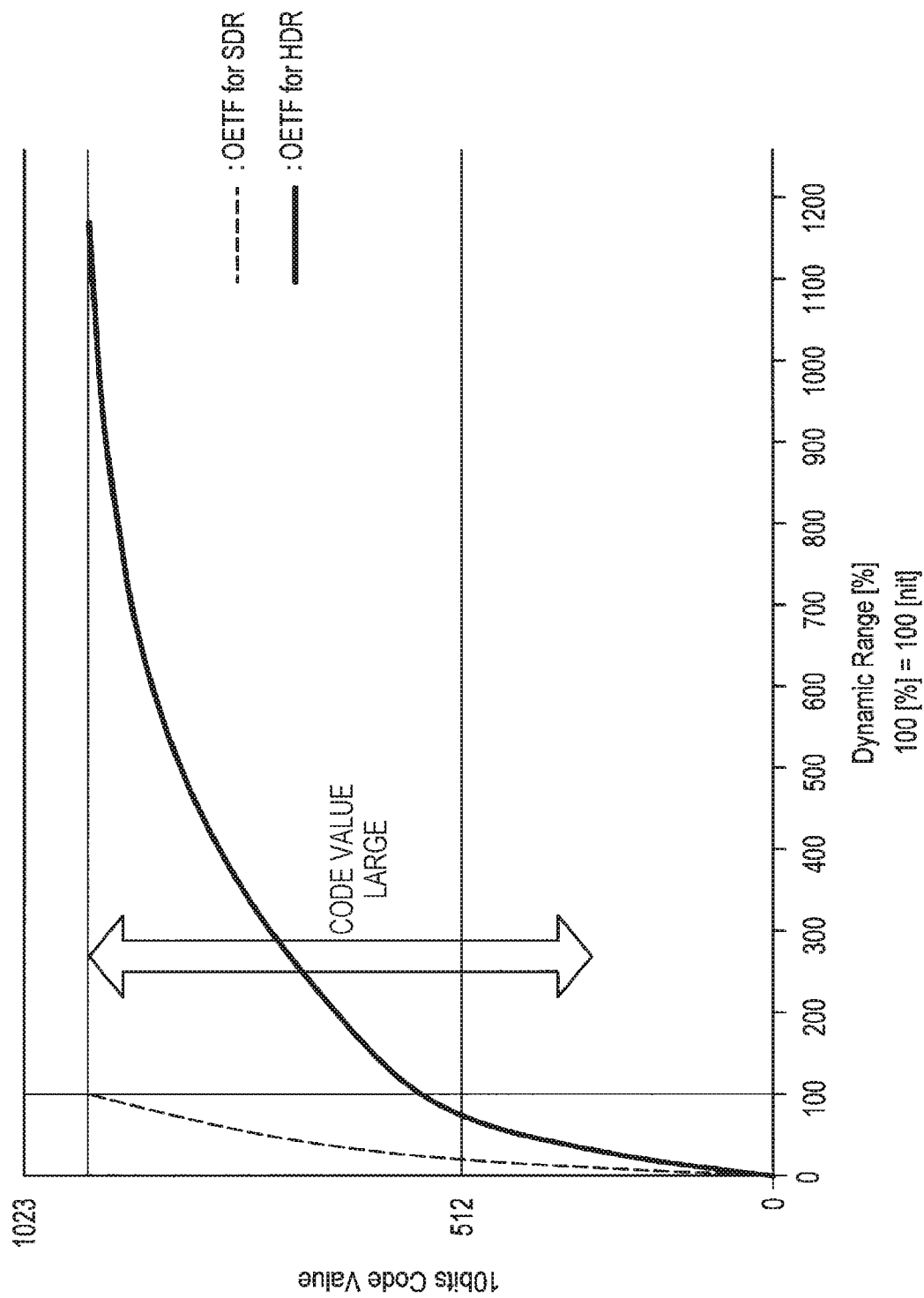
FIG. 3 is an explanatory diagram illustrating examples of OETF of a signal format for SDR and a signal format for HDR.

Typically, characteristics of signal conversion from light to image signals in an imaging device are modeled with an opto-electronic transfer function (OETF). FIG. 3 illustrates the respective examples of an OETF of a typical signal format for the SDR and an OETF of a typical signal format for the HDR. In FIG. 3, the horizontal axis represents a luminance dynamic range of light before conversion, and 100% corresponds to a luminance of 100 nits. The vertical axis represents a code value of an image signal after the conversion, and the code value may be a value from 0 to 1023 in the case of 10 bits. In comparison between the OETF of the signal format for the SDR (for example, BT.709) represented by a dashed line and the OETF for the HDR (for example, HLG, ST2084, or S-Log 3) represented by a solid line in the drawing, a difference in inclination of the transfer functions significantly appears at a part in which the code value is relatively large, in particular. This means that image information is compressed at a higher compression ratio in the case of the HDR than in the case of the SDR, that is, a similar change in code value represents a greater change in grayscale in the case of the HDR than in the SDR, at such a part. In a case in which the respective transfer functions of a red (R) component, a green (G) component, and a blue (B) component are analyzed in an RGB color system, a difference in signal transmission properties between the HDR and the SDR similar to that in the graph illustrated in FIG. 3 is observed.

Figure 4:
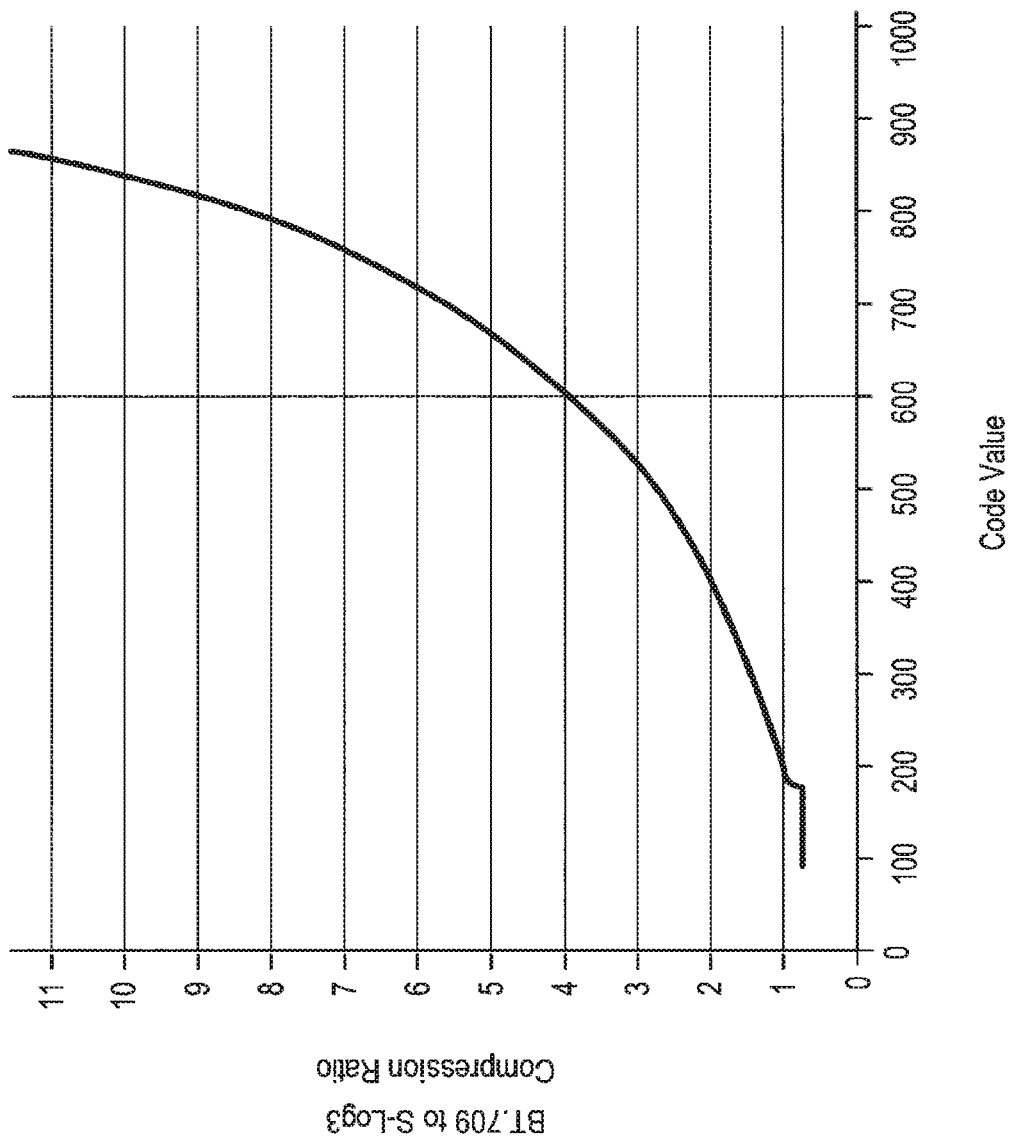
FIG. 4 illustrates a graph representing how much S-Log 3 for HDR compresses image information with respect to BT.709 for SDR.

FIG. 4 illustrates a graph illustrating how much image information is compressed in a case of S-Log 3 for the HDR with respect to BT.709 for the SDR. The horizontal axis in FIG. 4 represents a code value of a 10-bit image signal. The vertical axis represents a ratio of a compression ratio of S-Log 3 with respect to a compression ratio of BT.709. The compression ratio of S-Log 3 is about four times the compression ratio of BT.709 around a code value of "600" of S-Log 3 corresponding to the luminance dynamic range of 100%, and the compression ratio of S-Log 3 is relatively higher as the code value increases. It is also understood from this graph that the image information is more strongly compressed in the case of the HDR than in the case of the SDR at a part in which the code value is relatively large.

When an HDR video image is reproduced, a level of a voltage to be supplied to a display element may be decided by applying an electro-optical transfer function (EOTF) that is an inverse function of the OETF represented by the solid line in FIG. 3 to a code value of an image signal in many cases. Then, individual images included in the HDR video image are displayed in a luminance dynamic range extended by the application of the EOTF. A transfer function of the entire system including imaging to display is referred to as an OOTF, and the OOTF may be referred to as a system gamma. In the specification, "transfer function" means any one or a combination of two or more of the OETF, the EOTF, and the OOTF unless particularly stated otherwise. Such transfer functions may be referred to as tone curves.

[1-4. Color Range]

As a technology that enables more faithful reproduction of a state of the actual world and richer video image expression, a color range is also an important concept as well as the HDR. BT.2020 standardized by ITU-R defines a color range that enables clearer color expression than a color range of BT.709 that has been used in a large number of applications. FIG. 5 is an explanatory diagram for explaining color ranges defined by BT.709 and BT.2020. Referring to FIG. 5, a color range graph in which a three-dimensional color space is mapped in a two-dimensional plane using a predetermined constraint condition is illustrated. The cross mark in the graph represents a position at which the color white is mapped. The dashed line in the graph represents a range of colors that can be expressed in accordance with BT.709. The solid line in the graph represents a range of colors that can be expressed in accordance with BT.2020. The dotted line in the graph represents a range of colors that can be identified by a human sense of vision. As can be understood from FIG. 5, BT.2020 enables expression of more colors than BT.709. It is believed that BT.709 can express about 75% of the colors that exist in the actual world while BT.2020 can express about 99% or more of those colors. BT.2020 may be used as a color range for an SDR video image or may be used as a color range for an HDR video image.

<2. First Embodiment>

[2-1. Introduction]

A part of the aforementioned codec distortion that significantly appears in a partial region in an image when a signal format for the HDR is used is caused by shortage of the amount of assigned codes for expressing a grayscale of an original signal in a subrange corresponding to a relatively large code value in a dynamic range of each color component of an image signal, in particular. An encoder in accordance with a video image coding scheme such as MPEG-2, H.264/AVC, or H.265/HEVC quantizes the image signal in a frequency domain in order to achieve a required compression ratio. In general, a conversion coefficient obtained by orthogonally converting a prediction residual after an application of a prediction technology such as intra-prediction or inter-prediction is quantized. However, a quantization step used by such an encoder optimized for coding an SDR video image is excessively large in many cases in which the signal format for the HDR is used. This is because the existing encoder does not consider the fact that grayscale information is already more strongly compressed (than in the case of the SDR) during signal conversion in a subrange corresponding to a large code value.

Thus, an embodiment for assigning a larger coding amount to a partial region in which grayscale is strongly compressed in an image, satisfactorily preserving the grayscale, and reducing deterioration of image quality in a case in which a signal format for the HDR is used will be described in this section.

[2-2. Outline of System]

Figure 6A:
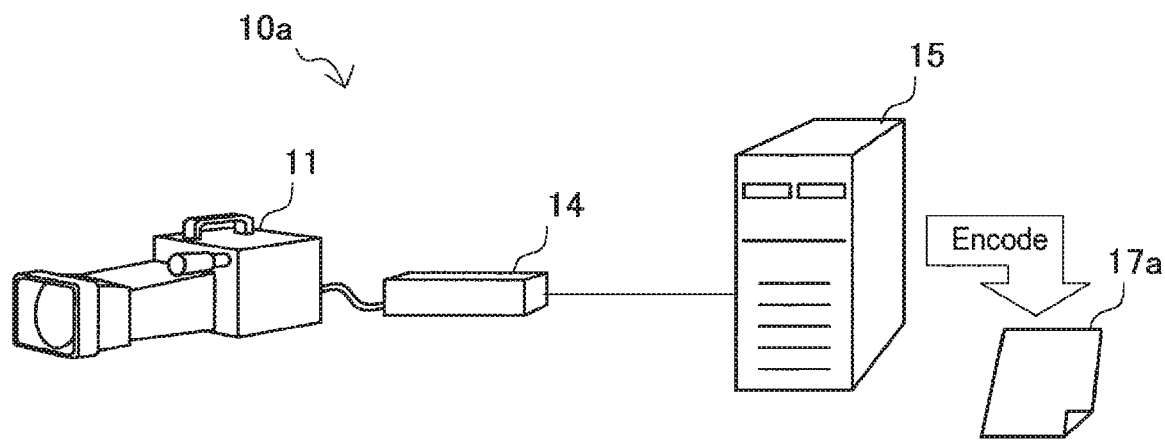
FIG. 6A is an explanatory diagram illustrating a first example of a configuration of an image processing system according to an embodiment.

FIG. 6A is an explanatory diagram illustrating a first example of a configuration of an image processing system according to the embodiment. An image processing system 10a illustrated in FIG. 6A includes an imaging device 11, a signal processing device 14, and a server device 15.

The imaging device 11 may be a digital video camera, a digital still camera, or an arbitrary type of device with a video image capturing function (for example, a monitoring camera, a web camera, an information terminal, or the like), for example. The imaging device 11 images a state of an actual world using an image sensor and generates a primitive image signal. The signal processing device 14 may be a baseband processing unit (BPU), for example, and is connected to the imaging device 11. The signal processing device 14 executes AD conversion and digital signal processing on the primitive image signal generated by the imaging device 11 and generates an image signal in a predetermined signal format. The digital signal processing executed by the signal processing device 14 may include gamma correction and color conversion, for example. The signal processing device 14 may be integrally formed with the imaging device 11.

Properties of signal conversion from light that is incident on the imaging device 11 into an image signal generated by the signal processing device 14 are represented by an OETF. For example, the signal processing device 14 may generate an image signal with a transfer function (or a signal format) selected from a plurality of candidates by a user via some user interface. In one example, the plurality of candidates may include one signal format for the SDR (for example, BT.709) and one signal format for the HDR (a combination of BT.2020 and HLG or S-Log 3, for example). In another example, the plurality of candidates may include a plurality of signal formats for the HDR. In a modification example, the signal processing device 14 can generate an image signal only in a single signal format for the HDR.

The signal processing device 14 multiplexes a sound signal and an auxiliary signal including metadata as needed with the image signal generated as a result of the signal conversion and outputs the multiplexed signals to the server device 15. The server device 15 is an image processing device that is connected to the signal processing device 14 with a signal line in accordance with a transmission protocol such as a serial digital interface (SDI) or HD-SDI, for example. The server device 15 acquires the image signal transmitted from the signal processing device 14, codes the image by a predetermined video image coding scheme, and generates a coded bit stream 17a. The coded bit stream 17a may be stored in a storage device inside or outside the server device 15 or may be transmitted to another device (for example, a display device) connected to the server device 15.

Figure 6B:
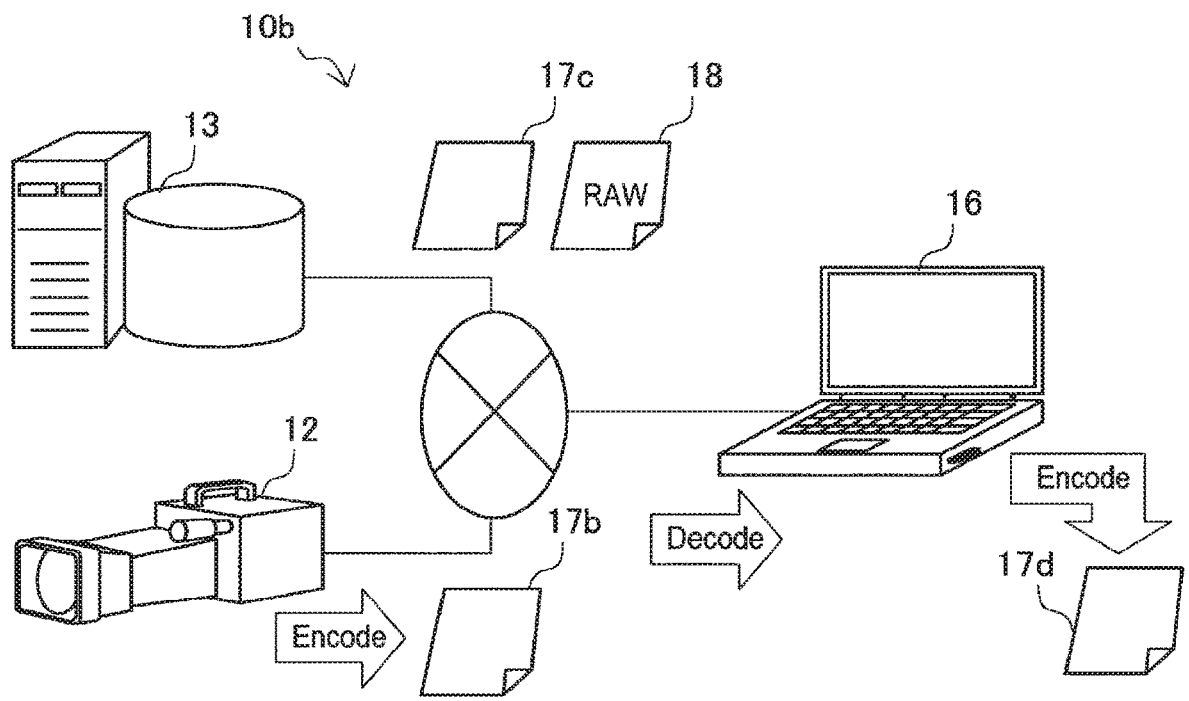
FIG. 6B is an explanatory diagram illustrating a second example of a configuration of an image processing system according to an embodiment.

FIG. 6B is an explanatory diagram illustrating a second example of the configuration of the image processing system according to the embodiment. An image processing system 10b illustrated in FIG. 6B includes an imaging device 12, a storage device 13, and a terminal device 16.

The imaging device 12 may be a digital video camera, a digital camcorder, a digital still camera, or an arbitrary type of device with a video image capturing function, for example. The imaging device 12 images a state of an actual world using an image sensor and generates a primitive image signal. In addition, the imaging device 12 executes AD conversion and a digital signal processing as described above in relation to the signal processing device 14 and generates an image signal in a predetermined signal format. The imaging device 12 may generate the image signal with a transfer function selected from a plurality of candidates by a user via some user interface similarly to the signal processing device 14, or the image signal may be able to be generated only with a single transfer function for the HDR.

The imaging device 12 codes the image by a predetermined video image coding scheme and generates a coded bit stream 17b on the basis of the image signal generated as a result of the signal conversion. The coded bit stream 17b may be stored as a video image file or may be provided to the storage device 13 or the terminal device 16 via a network, for example.

The storage device 13 is a data storage that stores various kinds of video image data. The storage device 13 may store a video image file 17c generated by coding the image by a predetermined video image coding scheme, for example. In a header reason in the video image file, a type of a transfer function related to conversion between light and an image signal that is applied to video image content included in the video image file, a type of a color range, and a parameter for identifying each video image coding scheme can be included, for example. The storage device 13 may store a RAW video image file 18 that records the image signal before the coding (or the signal conversion) as RAW data. The storage device 13 provides a file that the user desires to reproduce or edit to the terminal device 16 via a network in response to a request from the terminal device 16, for example.

The terminal device 16 is an image processing device that has a function of reproducing or editing a video image file generated by the imaging device 12 or stored in the storage device 13. The terminal device 16 may decode a coded bit stream included in the video image file 17b or 17c acquired from the imaging device 12 or the storage device 13 and generate a decoded image signal, for example. Also, the terminal device 16 may execute dynamic range conversion (for example, HDR-SDR conversion or SDR-HDR conversion) on the thus generated decoded image. Further, the terminal device 16 may code an image signal included in the RAW video image file 18 or a decoded image signal after the dynamic range conversion by a predetermined video image coding scheme and generate a coded bit stream 17*d*.

All the server device 15 in the example in FIG. 6A and the imaging device 12 and the terminal device 16 in the example in FIG. 6B have functions as image processing devices (that is, encoders) that code images. In the embodiment, deterioration of image quality in a case in which a signal format for the HDR is used is reduced by controlling the code amount assigned to each partial region of an image on the basis of a transfer function (for example, on the basis of a type or another attribute of the transfer function) when these image processing devices code the image. In the following section, specific and exemplary configurations of such image processing devices will be described in detail.

[2-3. Schematic Configuration of Image Processing Device]

Figure 7A:
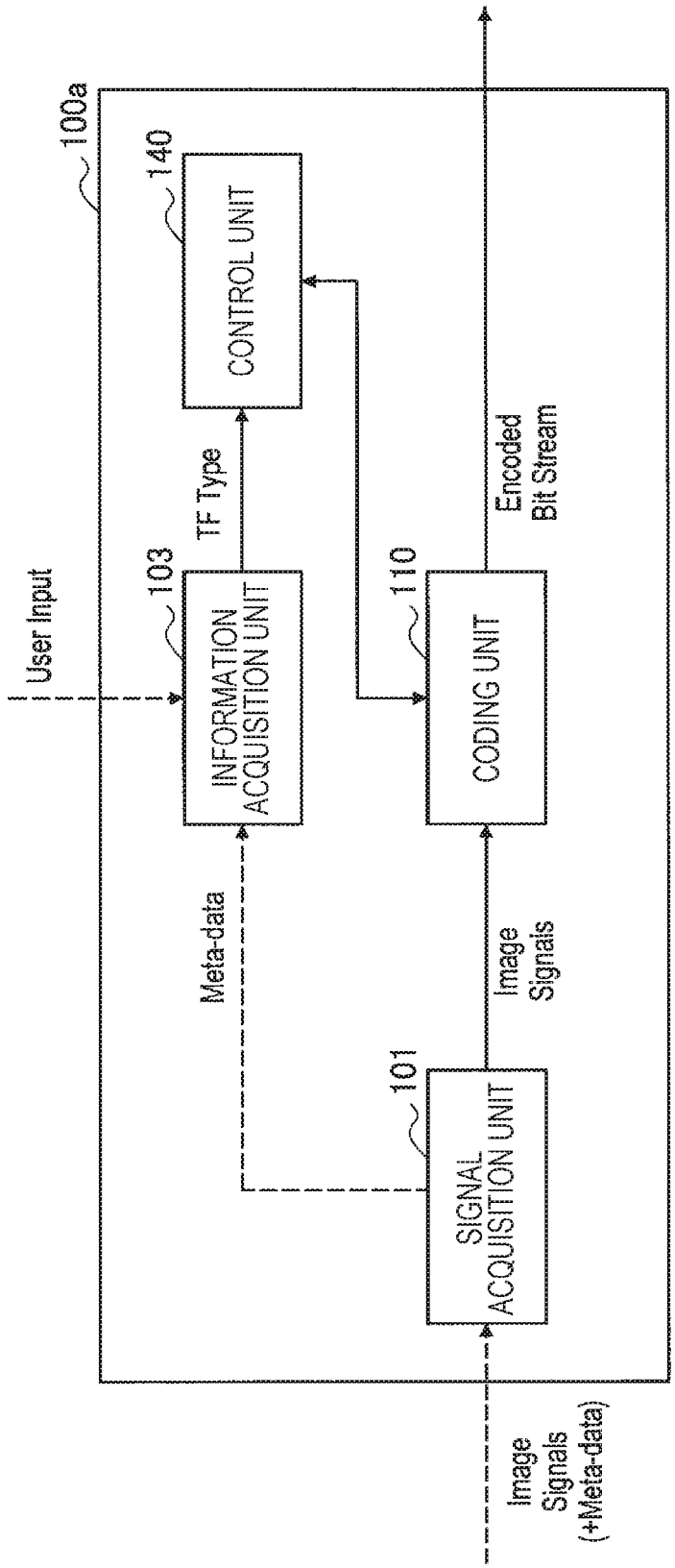
FIG. 7A is a block diagram illustrating a first example of schematic configurations of an image processing device according to a first embodiment.

FIG. 7A is a block diagram illustrating a first example of a schematic configuration of an image processing device according to the embodiment. An image processing device 100*a* illustrated in FIG. 7A may be the server device 15 in the example in FIG. 6A or the imaging device 12 or the terminal device 16 (or an image processing module mounted on any of these devices) in the example in FIG. 6B, for example. The image processing device 100*a* includes a signal acquisition unit 101, an information acquisition unit 103, a coding unit 110, and a control unit 140.

The signal acquisition unit 101 acquires an input image signal generated on the basis of a transfer function related to conversion between light and an image signal. The signal acquisition unit 101 may acquire the input image signal from an external device via a transmission interface or may acquire the input image signal from an imaging module and a signal processing module (not illustrated) that are integrally configured with the image processing device 100*a*.

The information acquisition unit 103 acquires input information related to the transfer function applied to an image that is coded by the coding unit 110. In one example, the information acquisition unit 103 may acquire the input information via a user interface that the image processing device 100*a* has. The user interface may be provided by a physical input device such as a touch panel, a button, or a switch, for example, provided in a case body of the image processing device 100*a*. Instead, the user interface may be provided as a graphical user interface (GUI) on a terminal device that is connected in a remote manner via a communication interface. In the embodiment, the input information includes at least a transfer function type indicating a type of the transfer function applied to the image to be coded. The user interface may allow the user to select one of two options, namely "SDR" and "HDR" to be applied to the image, for example. In this case, it is determined that one transfer function defined in advance for the SDR or one transfer function defined in advance for the HDR has been applied to the image. In this case, the user interface may allow the user to select the transfer function to be applied to the image from a plurality of candidates of the transfer function (for example, BT.709, HLG, ST2084, and S-Log 3).

In another example, the information acquisition unit 103 may acquire the input information from an auxiliary signal to be multiplexed with the input image signal. For example, the auxiliary signal is received by the signal acquisition unit 101 in a period (for example, a blanking period) during which the image signal is not transmitted on a signal line. Then, the information acquisition unit 103 may acquire the input information including the transfer function type indicating the type of the transfer function applied to the image from the auxiliary signal separated by the signal acquisition unit 101. Also, the information acquisition unit 103 may acquire needed input information by accessing an external data source.

The coding unit 110 codes the image expressed by the image signal that is acquired by the signal acquisition unit 101 and generates a coded bit stream. The coding unit 110 may execute the coding processing in accordance with any video image coding scheme such as MPEG-2, H.264/AVC, or H.265/HEVC, for example. The coding processing executed by the coding unit 110 is processing that typically includes a variety of kinds of arithmetic operation processing such as prediction, orthogonal conversion, quantization, and entropy coding, and in particular, quantization is processing that includes lossy compression for achieving a required compression ratio for the quantization, in particular.

The control unit 140 controls the code amount to be assigned to each partial region of an image by the coding unit 110 on the basis of the transfer function indicated by the input information that is acquired by the information acquisition unit 103. More specifically, in a case in which a transfer function for the HDR of a first transfer function corresponding to the HDR (a transfer function for the HDR) and a second transfer function corresponding to the SDR (a transfer function for the SDR) is applied to the image, the control unit 140 activate quantization control processing for reducing deterioration of image quality of an HDR video image. The quantization control processing may include processing of modifying a processing parameter for quantization processing executed irrespective of the transfer function or the signal format in order to adjust the assignment of the code amount in the case in which the transfer function for the HDR is applied. Note that an example in which the assigned code amount is controlled on the basis of the type of the transfer function will be mainly described here, the code amount may be controlled on the basis of another attribute of the transfer function such as an upper limit value of the dynamic range associated with the transfer function.

Figure 7B:
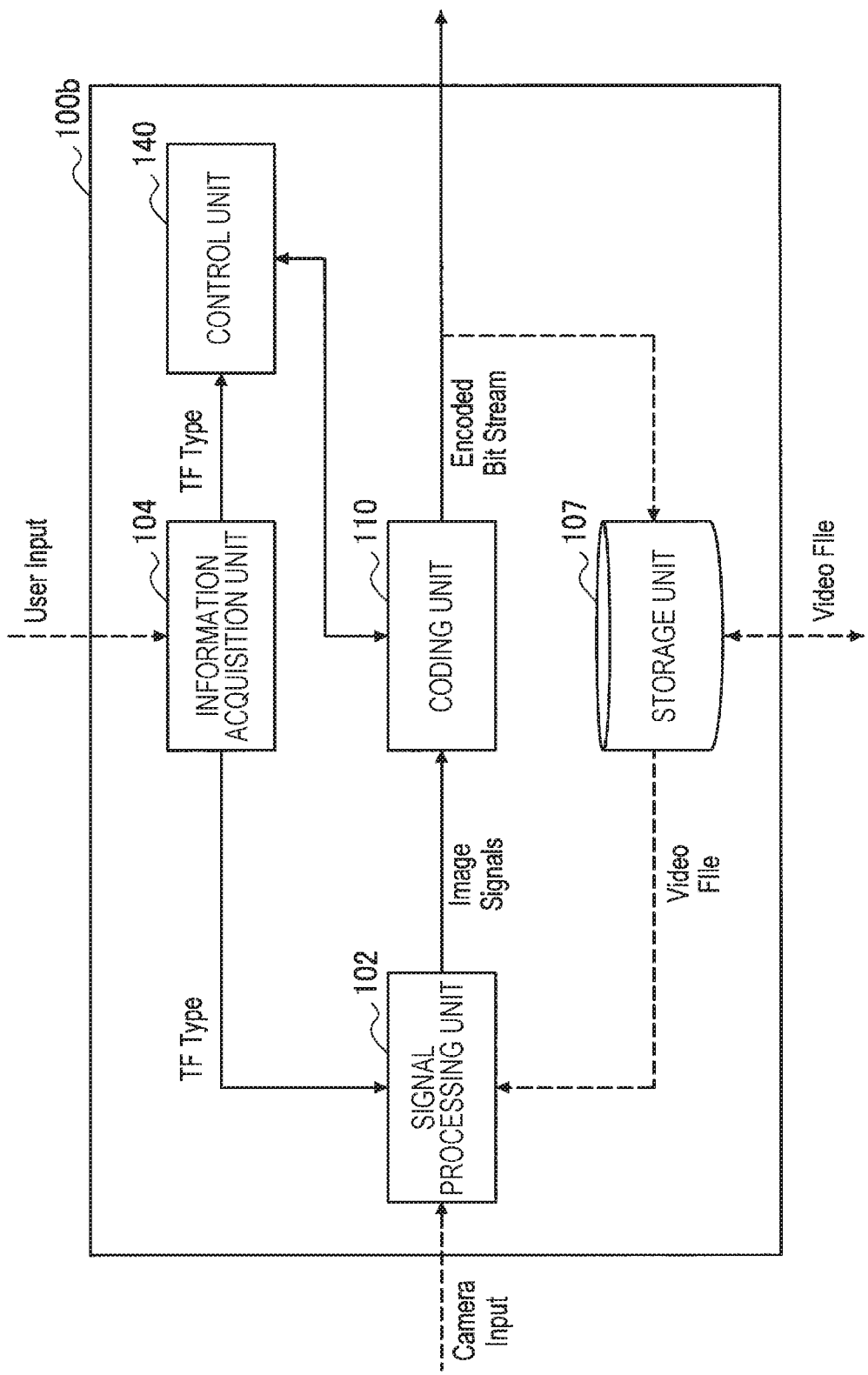
FIG. 7B is a block diagram illustrating a second example of schematic configurations of an image processing device according to a first embodiment.

FIG. 7B is a block diagram illustrating a second example of a schematic configuration of an image processing device according to the embodiment. An image processing device 100*b* illustrated in FIG. 7B may also be the server device 15 in the example in FIG. 6A or the imaging device 12 or the terminal device 16 (or an image processing module mounted on any of these devices) in the example in FIG. 6B, for example. The image processing device 100*b* includes a signal processing unit 102, an information acquisition unit 104, a storage unit 107, a coding unit 110, and a control unit 140.

The signal processing unit 102 acquires a primitive image signal input from the imaging device via some transmission interface or a signal line in the device or acquires the image signal from a video image file stored in the storage unit 107. Then, the signal processing unit 102 executes digital signal processing that may include gamma correction and color conversion, for example, on the primitive image signal and generates an image signal as a target of coding in a predetermined signal format. The signal format and the corresponding transfer function applied to the image by the signal processing unit 102 are decided on the basis of the input information acquired by the information acquisition unit 104. Then, the signal processing unit 102 outputs the generated image signal to the coding unit 110.

The information acquisition unit 104 acquires input information related to the transfer function to be applied to the image coded by the coding unit 110. For example, the information acquisition unit 104 may acquire the input information via a user interface that the image processing device 100b has (provided by a physical input device or provided as a GUI). As described above, the input information includes at least a transfer function type indicating a type of a transfer function to be applied to the image to be coded. The user interface may allow the user to select one of two options, namely "SDR" and "HDR" to be applied to the image, for example. Also, the user interface may allow the user to select the transfer function to be applied to the image among a plurality of candidates of the transfer function.

The storage unit 107 is a storage device for storing various kinds of video image data. The storage unit 107 may store a video image file that records the digital image signal before the signal conversion, for example. The user may cause the storage unit 107 to store the video image file acquired from an external storage medium via an input and output interface (not illustrated) that the image processing device 100b has. Also, the storage unit 107 may store the video image file including the coded bit stream that is generated as a result of the coding processing executed by the coding unit 110. The video image file may be output to an external device in response to a request.

Similar to the first example described with reference to FIG. 7A, the coding unit 110 codes an image expressed by the image signal that is acquired by the signal processing unit 102 and generates a coded bit stream. The control unit 140 controls the code amount assigned to each partial region of the image by the coding unit 110 on the basis of the type of the transfer function indicated by the input information that is acquired by the information acquisition unit 104. The coded bit stream generated by the coding unit 110 may be transmitted to a device outside the image processing device 100b or may be stored as a video image file in the storage unit 107.

[2-4. Detailed Configurations of Coding Unit and Control Unit]

In this section, more specific configurations of the coding unit 110 and the control unit 140 illustrated in FIGS. 7A and 7B will be described in detail. FIG. 8 is a block diagram illustrating an example of detailed configurations of the coding unit and the control unit according to the first embodiment.

(1) Coding Unit

Referring to FIG. 8, the coding unit 110 includes a realignment buffer 111, a block setting unit 112, a subtraction unit 113, an orthogonal conversion unit 114, an quantization unit 115, a lossless coding unit 116, an inverse quantization unit 121, an inverse orthogonal conversion unit 122, an addition unit 123, a loop filter 124, a frame memory 126, a switch 127, a mode selection unit 128, an intra-prediction unit 130, and an inter-prediction unit 135.

The realignment buffer 111 realigns image data of a series of images expressed by image signals that are acquired by the signal acquisition unit 101 or the signal processing unit 102 in accordance with a group-of-picture (GOP) structure. The realignment buffer 111 outputs image data after the realignment to the block setting unit 112, the intra-prediction unit 130, and the inter-prediction unit 135.

The block setting unit 112 divides each images corresponding to pictures into a plurality of blocks. In MPEG-2 and H.264/AVC, a picture is divided in a grid pattern into a plurality of macro-blocks with a fixed size, and coding processing is executed in processing units of the respective macro-blocks. The quantization processing may be executed in processing units of smaller sub-blocks set in each macro-block. In H.265/HEVC, a picture is divided in a quadtree pattern into a plurality of encoding units (coding units) with a variable size, and the coding processing is executed in processing units of the respective CUs. Quantization Processing may be executed using smaller conversion units (transform units) set for each CU as the processing units.

The subtraction unit 113 calculates prediction residual data that is a difference between image data and a predicted image data input from the block setting unit 112 and outputs the prediction residual data to the orthogonal conversion unit 114.

The orthogonal conversion unit 114 converts the prediction residual data input from the subtraction unit 113 from image data in a spatial region into conversion coefficient data in a frequency region. Orthogonal conversion executed by the orthogonal conversion unit 114 may be, for example, discrete cosine conversion, discrete sine conversion, or the like. Then, the orthogonal conversion unit 114 outputs conversion coefficient data to the quantization unit 115.

The quantization unit 115 quantizes the conversion coefficient data input from the orthogonal conversion unit 114 in a quantization step decided such that a required compression ratio is achieved. The quantization step may be set to be small in a case in which free capacity of a buffer or a transmission path is large relative to the size of the coded bit stream to be output, and in contrast, the quantization step may be set to be large in a case in which free capacity is small. The quantization step is generally decided for each partial region in the image. Different quantization steps may be used for each of the three color components. As the quantization step used for a certain partial region is smaller, the conversion coefficient of the partial region is more finely quantized. This means that a larger code amount is assigned to the partial region, that is, grayscale of the image in the partial region is maintained with less damage. The quantization unit 115 may apply different quantization steps to different frequency components in the conversion coefficient using a quantization matrix. Then, the quantization unit 115 outputs the conversion coefficient data after the quantization (hereinafter, referred to as quantized data) to the lossless coding unit 116 and the inverse quantization unit 121.

In a case in which the transfer function for the HDR is applied to the input image signal, a parameter for adjusting (scaling) the quantization step used for each partial region is provided from the control unit 140 to the quantization unit 115. The quantization unit 115 scales the quantization step by dividing (or multiplying) the quantization step with the parameter provided from the control unit 140 and quantizes the conversion coefficient data in the quantization step after the scaling. Note that in several video image coding schemes, a quantization parameter (QP) with a logarithmic relationship with the quantization step is coded instead of directly coding the quantization step as a control value required for inverse quantization on the side of the decoder. The scaling of the quantization step is realized by adding (or subtracting) some offset to (or from) a quantization parameter instead of dividing (or multiplying) the quantization step by some coefficient.

The lossless coding unit 116 codes the quantized data input from the quantization unit 115, thereby generating a coded bit stream. Also, the lossless coding unit 116 codes various parameters that are referred by the decoder and inserts the coded parameters into the coded bit stream. The parameters coded by the lossless coding unit 116 may include information related to the transfer function, information related to the color range, and information related to the aforementioned quantization parameter. The lossless coding unit 116 outputs the generated coded bit stream to an output destination in accordance with a purpose of the application.

The inverse quantization unit 121, the inverse orthogonal conversion unit 122, and the addition unit 123 are included in a local decoder. The local decoder serves to reconstruct an original image from the coded data.

The inverse quantization unit 121 inversely quantizes the quantized data in the quantization step that is the same as that used by the quantization unit 115 and restores the conversion coefficient data. In a case in which the transfer function for the HDR is applied to the input image signal, the quantization step scaled using the parameter provided from the control unit 140 may be used for each partial region. Then, the inverse quantization unit 121 outputs the restored conversion coefficient data to the inverse orthogonal conversion unit 122.

The inverse orthogonal conversion unit 122 executes inverse orthogonal conversion processing on the conversion coefficient data input from the inverse quantization unit 121, thereby restoring prediction residual data. Then, the inverse orthogonal conversion unit 122 outputs the restored reproduction residual data to the addition unit 123.

The addition unit 123 adds the restored prediction residual data input from the inverse orthogonal conversion unit 122 and the prediction image data generated by the intra-prediction unit 130 or the inter-prediction unit 135, thereby generating decoded image data. Then, the addition unit 123 outputs the generated decoded image data to a loop filter 124 and a frame memory 126.

The loop filter 124 is an in-loop filter for the purpose of improving image quality of a decoded image. The loop filter 124 may include a deblock filter for reducing block distortion that appears in the decoded image, for example. Also, the loop filter 124 may include an adaptive offset filter for adding an edge offset or a band offset to the decoded image. The loop filter 124 outputs decoded image data after the filtering to the frame memory 126.

The frame memory 126 stores decoded image data before the filtering input from the addition unit 123 and decoded image data after the application of the in-loop filter input from the loop filter 124.

The switch 127 reads the decoded image data before the filtering that is used for intra-prediction from the frame memory 126 and supplies the read decoded image data as reference image data to the intra-prediction unit 130. Also, the switch 127 reads the decoded image data after the filtering that is used for inter-prediction from the frame memory 126 and supplies the read decoded image data as reference image data to the inter-prediction unit 135.

The mode selection unit 128 selects a prediction method for each block on the basis of comparison of cost input from the intra-prediction unit 130 and the inter-prediction unit 135. The mode selection unit 128 outputs prediction image data generated by the intra-prediction unit 130 to the subtraction unit 113 and outputs information related to intra-prediction to the lossless coding unit 116 for a block for which intra-prediction is selected. Also, the mode selection unit 128 outputs prediction image data generated by the inter-prediction unit 135 to the subtraction unit 113 and outputs information related to inter-prediction to the lossless coding unit 116 for a block for which inter-prediction is selected.

The intra-prediction unit 130 executes intra-prediction processing on the basis of original image data and decoded image data. For example, the intra-prediction unit 130 evaluates cost that is estimated to occur for each of a plurality of candidate modes included in a search range. Next, the intra-prediction unit 130 selects a prediction mode in which the cost becomes minimum as an optimal prediction mode. Also, the intra-prediction unit 130 generates prediction image data in accordance with the selected optimal prediction mode. Then, the intra-prediction unit 130 outputs information related to intra-prediction including prediction mode information indicating the optimal prediction mode, corresponding cost, and the predicted image data to the mode selection unit 128.

The inter-prediction unit 135 executes inter-prediction processing (motion compensation) on the basis of original image data and decoded image data. For example, the inter-prediction unit 135 evaluates cost that is estimated to occur for each of a plurality of candidate modes included in a search range. Next, the inter-prediction unit 135 selects a prediction mode in which cost becomes minimum as an optimal prediction mode. Also, the inter-prediction unit 135 generates prediction image data in accordance with the selected optimal prediction mode. Then, the inter-prediction unit 135 outputs information related to inter-prediction, corresponding cost, and the prediction image data to the mode selection unit 128.

(2) Control Unit

Referring to FIG. 8, the control unit 140 includes a statistical arithmetic operation unit 141 and a code amount control unit 143.

The statistical arithmetic operation unit 141 calculates statistics related to intensity of at least one of a luminance component or a chrominance component for each partial region set in an image. The statistics calculated by the statistical arithmetic operation unit 141 may be a representative value (for example, an average, a central value, or a most frequent value) or a histogram of pixel values (code values) in a partial region for one or more color components. Then, the statistical arithmetic operation unit 141 outputs the calculated statistics to the code amount control unit 143.

Note that the partial region described here may typically correspond to a block corresponding to a processing unit of the quantization processing. For example, the statistics may be calculated for each macro-block or sub-block in MPEG-2 or H.264/AVC or for each partial region such as CU or TU in H.265/HEVC, and the quantization step may be controlled by a code amount control unit, which will be described next. Also, the present disclosure is not limited to such an example, and quantization control processing described here may be executed for each partial region (this may be one pixel) with another shape.

The code amount control unit 143 determines the type of the transfer function applied to an image to be coded on the basis of input information that is input from the information acquisition unit 103 or 104. Then, the code amount control unit 143 may skip the quantization control processing, which will be described below, in a case in which the transfer function for the SDR of the transfer function for the HDR and the transfer function for the SDR is applied. Meanwhile, the code amount control unit 143 controls the code amount to be assigned to each partial region depending on at least one of the luminance component or the chrominance component of the partial region in a case in which the transfer function for the HDR is applied to the image to be coded. More specifically, the code amount control unit 143 controls the code amount assigned to each partial region by scaling the quantization step used by the quantization unit 115 for each partial region depending on the intensity of one or more color components (or causing the quantization unit 115 to perform scaling). Hereinafter, control depending on the intensity of the luminance component will be described as a first example, control depending on the intensity of the chrominance component will be described as a second example, and control depending on intensity of both the luminance component and the chrominance component will be described as a third example.

(3) First Example—Protection of High Luminance Part

In the first example, the code amount control unit 143 scales the quantization step used for each partial region such that a larger code amount is assigned to a partial region with a luminance component with higher intensity (that is, a high luminance part). The intensity of the luminance component of each partial region is recognized from the statistics of each partial region calculated by the statistical arithmetic operation unit 141. Here, it is assumed that the code amount control unit 143 scales the quantization step by dividing the quantization step by a protection ratio depending on the intensity of the luminance component of each partial region. The protection ratio is a parameter representing how much image quality of the partial region is to be protected. The value of the quantization step decreases as the value of the protection ratio increases, and image quality of the partial region to which the quantization step is applied is more strongly protected. Note that the actual division with the protection ratio may be performed by the quantization unit 115 to which the protection ratio is provided.

Figure 9A:
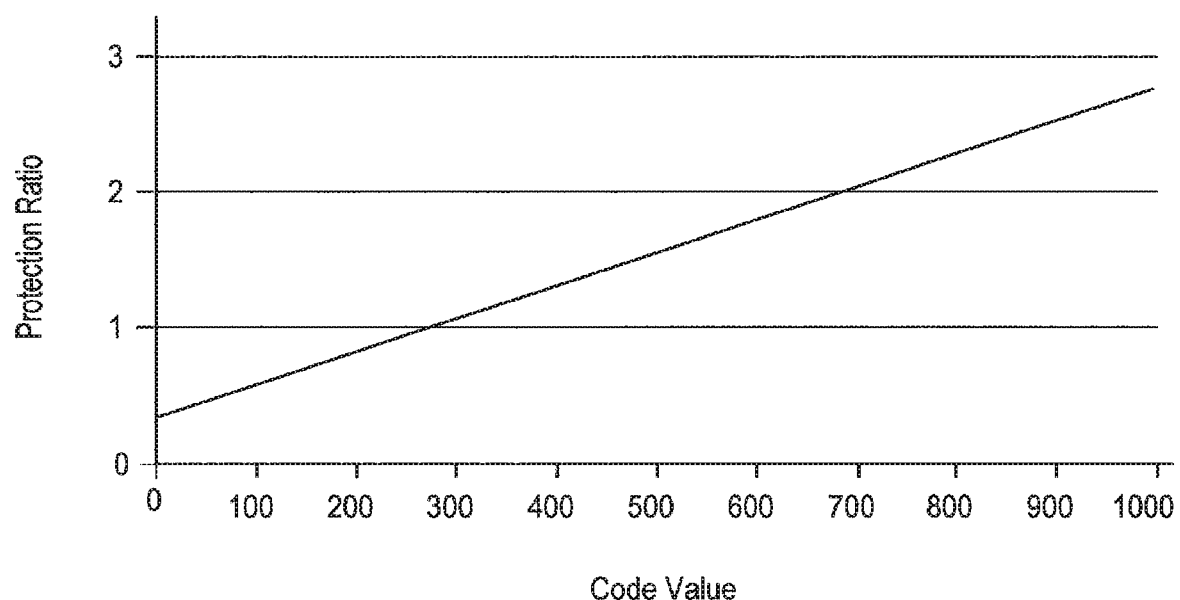
FIG. 9A is an explanatory diagram for explaining a first example of a protection ratio for protecting a high luminance part.

FIG. 9A is an explanatory diagram for explaining a first example of the protection ratio for protecting a high luminance part. The horizontal axis in FIG. 9A represents a code value of a luminance component. The vertical axis represents a protection ratio. As illustrated here, the protection ratio may be a parameter that is calculated using a predetermined function that employs the intensity of the luminance component of each partial region as an argument. Although a linear function is illustrated as an example in FIG. 9A, a higher-order function or another type of function such as a logarithmic function, for example, may be used. As in this example, the quantization step for a partial region with a luminance component of higher intensity is scaled to be a smaller value by the protection ratio of such a partial region being set to be higher. In this manner, it is possible to avoid excessive loss of image information of the high luminance part that has already been strongly compressed before the conversion from light into an electrical signal.

Figure 9B:
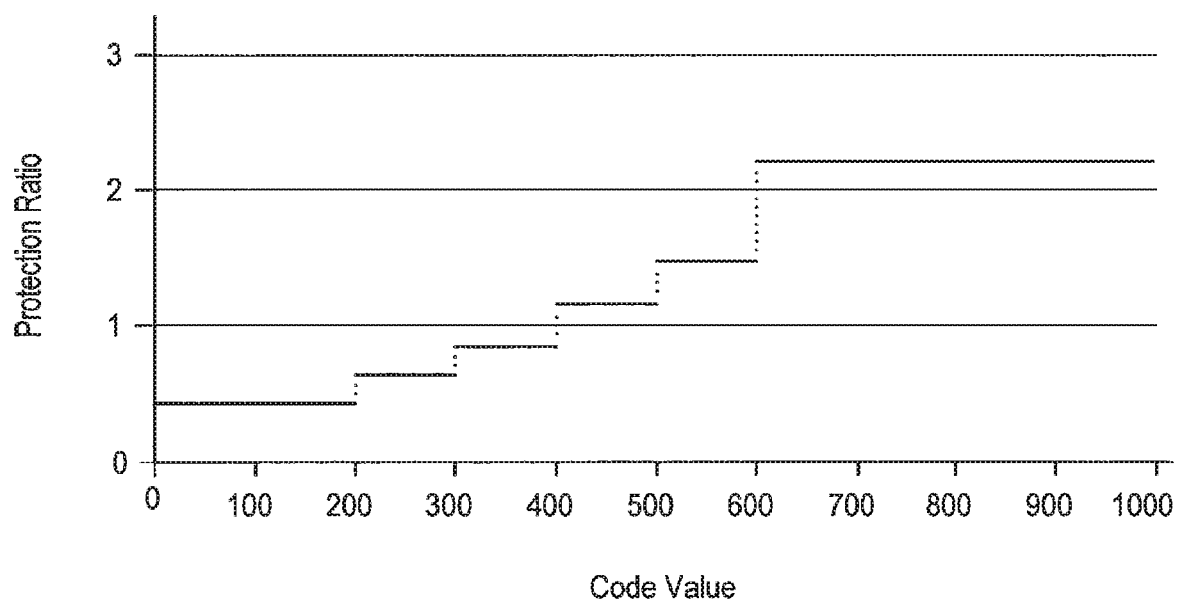
FIG. 9B is an explanatory diagram for explaining a second example of a protection ratio for protecting a high luminance part.

FIG. 9B is an explanatory diagram for explaining a second example of the protection ratio for protecting a high luminance part. As illustrated in FIG. 9B, the protection ratio may be parameter that is selectively decided in accordance with to which subrange the intensity of the luminance component of each partial region belongs. According to the second example, the intensity of the luminance component of each partial region is categorized into six subranges, namely less than 200 nits, equal to or greater than 200 nits and less than 300 nits, equal to or greater than 300 nits and less than 400 nits, equal to or greater than 400 nits and less than 500 nits, equal to or greater than 500 nits and less than 600 nits, and equal to or greater than 600 nits, and protection ratios corresponding to the respective sub-ranges are defined. The code amount control unit 143 may have a memory that stores a mapping table that maps such sub-ranges and corresponding protection ratios in advance. Since the protection ratio is also set to be higher for a partial region with the luminance component with higher intensity in the second example similarly to the first example, it is possible to avoid excessive loss of image information of the high luminance part that has already been strongly compressed before the conversion from light into an electrical signal.

Note that according to the second example, the protection ratio (or the quantization step) is finely controlled at the central part of the dynamic range while the protection ratio is fixed at ends of the dynamic range. It is possible to efficiently strengthen the protection of the central part of the dynamic range, which is prone to affect image quality that is subjectively sensed through human's sense of vision while inhibiting compromise of coding efficiency, by setting the protection ratio in this manner.

(4) Second Example—Protection of High Chrominance Part

In the second example, the code amount control unit 143 scales the quantization step used for each partial region such that a larger code amount is assigned to a partial region with a chrominance component with higher intensity (that is, a higher chrominance part).

Figure 10:
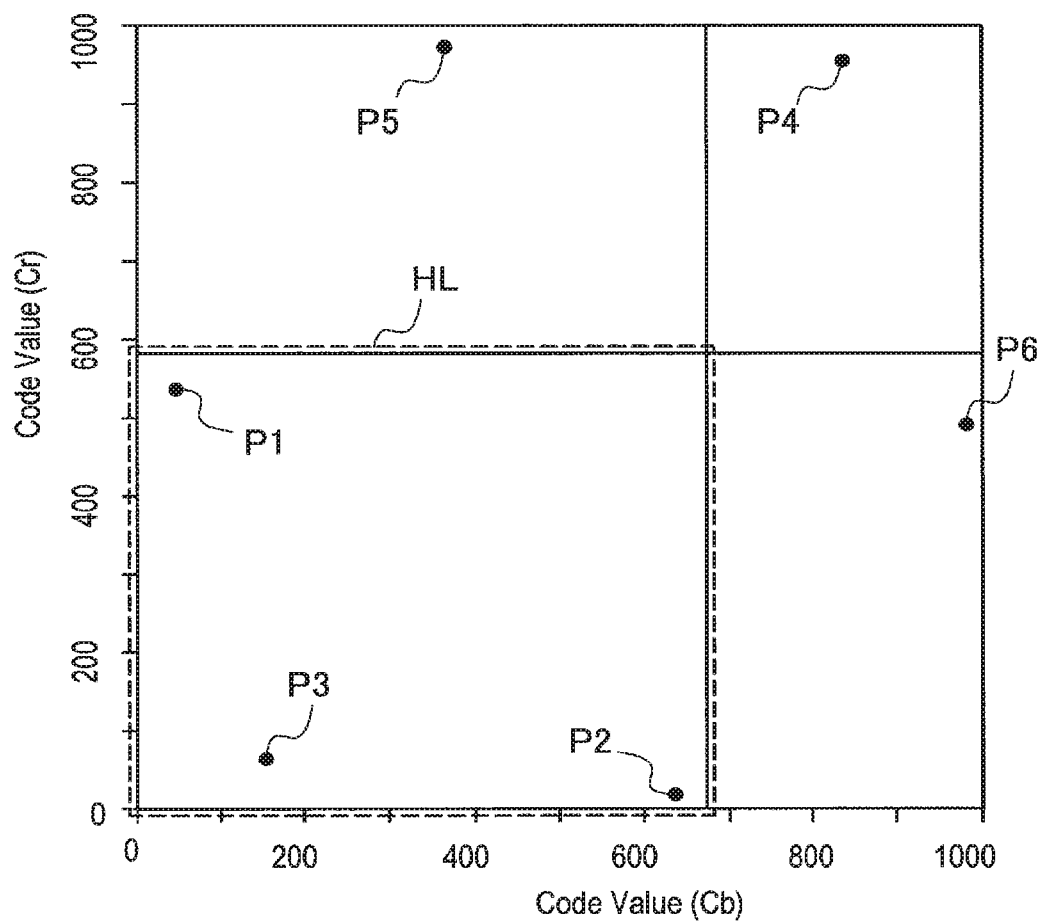
FIG. 10 is an explanatory diagram for explaining a code value to be protected as a high chrominance part.

FIG. 10 is an explanatory diagram for explaining a code value to be protected as a high chrominance part. The horizontal axis in FIG. 10 represents a code value of a Cb component that is one of two chrominance component. The vertical axis represents a code value of a Cr component that is the other one of the two chrominance components. The point P1 in the drawing indicates a corresponding position of a specific point, at which code values of the R component and the G component exceed 1000 and correspond to a so-called "yellow color" in the RGB space, on a CbCr plane in a YCbCr space. The point P2 indicates a corresponding position of a specific point, at which code values of the G component and the B component exceed 1000 and correspond to so-called "cyan" in the RGB space, on the CbCr plane in the YCbCr space. The point P3 indicates a corresponding position of a specific point, at which a code value of the G component exceeds 1000 and corresponds to a so-called "green color" in the RGB space, on the CbCr plane in the YCbCr space. The point P4 indicates a corresponding position of a specific point, at which code values of the R component and the B component exceed 1000 and correspond to so-called "magenta" in the RGB space, on the CbCr plane in the YCbCr space. The point P5 indicates a corresponding position of a specific point, at which a code value of the R component exceeds 1000 and corresponds to a so-called "red color" in the RGB space, on the CbCr plane in the YCbCr space. The point P6 indicates a corresponding position of a specific point, at which a code value of the B component exceeds 100 and corresponds to a so-called "blue color" in the RGB space, on the CbCr plane in the YCbCr space.

According to analysis of the color component values of these points, the points P1, P2 and P3 inside the dashed line frame HL in the drawing have relatively high Y component values (for example, equal to or greater than 700) in the YCbCr space while the points P4, P5, and P6 outside the dashed line frame HL have relatively low Y component values (for example, less than 700). This means that the "yellow color", "cyan", and "green color" parts may be protected if luminance components are taken into consideration while the "magenta", "red color", and 'blue color" parts may not be protected in the clear color parts. Therefore, it is also advantageous to increase the code amount assigned to the high chrominance part. The intensity of the chrominance component in each region is recognized from the statistics for each partial region calculated by the statistical arithmetic operation unit 141. Here, it is assumed that the code amount control unit 143 scales the quantization step (common to the luminance component or specific to the chrominance component) by dividing the quantization step by the protection ratio depending on the intensity of the chrominance component of each partial region. Note that the actual division may be performed by the quantization unit 115 to which the protection ratio is provided.

The protection ratio for protecting the high chrominance part may be a parameter calculated using a predetermined function that employs intensity of the chrominance component of each partial region as an argument similarly to the first example illustrated in FIG. 9A. Instead, the protection ratio for protecting the high chrominance part may be a parameter decided depending on to which subrange the intensity of the chrominance component of each partial region belongs similarly to the second example illustrated in FIG. 9B. The code amount control unit 143 may have a memory that stores a mapping table that maps the subrange of the chrominance component and the corresponding protection ratio in advance.

Figure 11:
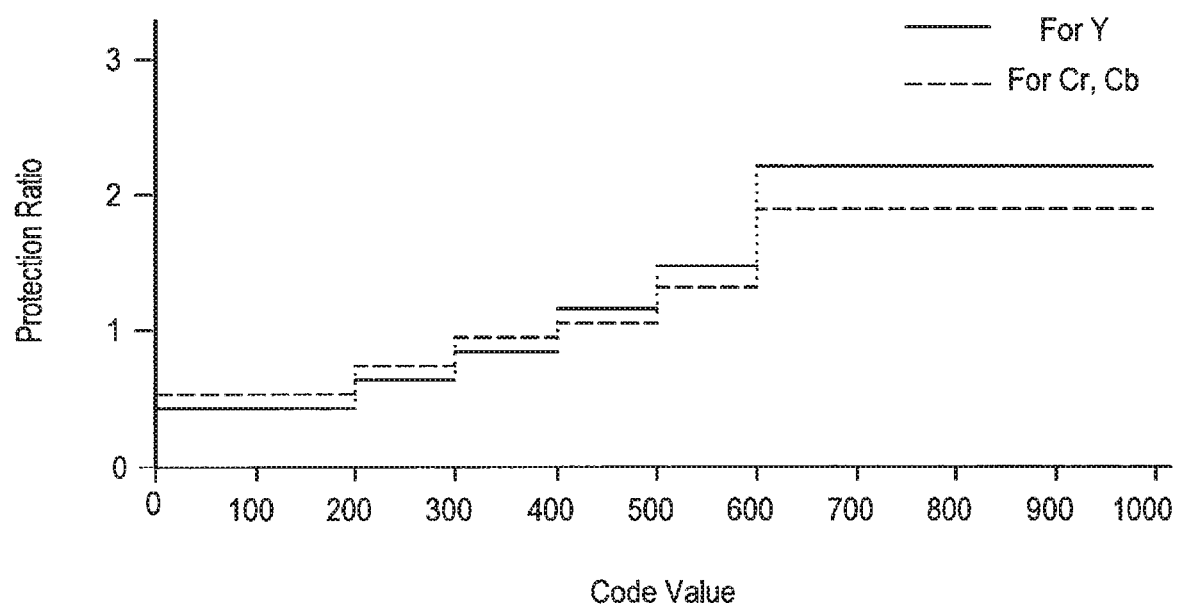
FIG. 11 is an explanatory diagram for explaining an example of a protection ratio for protecting a high chrominance part.

FIG. 11 is an explanatory diagram for explaining an example of the protection ratio for protecting the high chrominance part. FIG. 11 illustrates, in addition to the protection ratios (solid lines) of luminance components corresponding to the six subranges exemplified in FIG. 9B, protection ratios (dashed lines) of chrominance components corresponding to the same six subranges. It is possible to avoid excessive loss of image information of the high chrominance part that has already been strongly compressed before the conversion from light into an electrical signal by setting the protection ratio of the partial region with the chrominance component with higher intensity to be higher. Also, it is possible to efficiently enhance protection of the central part of the dynamic range, which is prone to affect image quality that is subjectively sensed while inhibiting compromise of coding efficiency by finely setting the protection ratio at the central part of the dynamic range.

(5) Third Example—Protection of High Luminance Part and High Chrominance Part

The points P1, P2, and P3 ("yellow color", "cyan", and "green") in FIG. 10 belong to a clear color (intensity of one or more of the R component, the G component, and the B component is high) region and also belongs to a high luminance (intensity of the Y component is high) region as described above. If the partial region with such colors is also protected as a high chrominance part while being protected as a high luminance part, there is a probability that the assigned code amount becomes inappropriately large. Thus, the code amount control unit 143 may not scale the quantization step for a partial region, in which the quantization step has been scaled in accordance with the intensity of one of the luminance component and the chrominance component, in accordance with the intensity of the other one of the luminance component and the chrominance component.

In one example, the code amount control unit 143 categorizes each partial region into two groups on the basis of a histogram calculated for each color component by the statistical arithmetic operation unit 141 for each partial region. More specifically, the code amount control unit 143 may classify a partial region in which a proportion of pixels with a Cb component exceeding a certain Cb reference value exceeds a threshold value or a proportion of pixels with a Cr component exceeding a certain Cr reference value exceeds a threshold value into a first group and classify the other partial region (both the proportions are below the threshold values) into a second group, for example. The first group includes a partial region with many pixels located outside the dashed line frame HL in FIG. 10, and the second group includes a partial region with many pixels located inside the dashed line frame HL. The code amount control unit 143 may apply the protection of the high chrominance part in accordance with the second example to the partial region that belongs to the first group and apply the protection of the high luminance part in accordance with the first example to the partial region that belongs to the second group.

It is possible to reduce processing cost by avoiding redundant control of the quantization step and to prevent excessive localization of the assigned code amount in the image by switching such protection methods.

[2-5. Flow of Processing]

(1) Coding Control Processing

Figure 12:
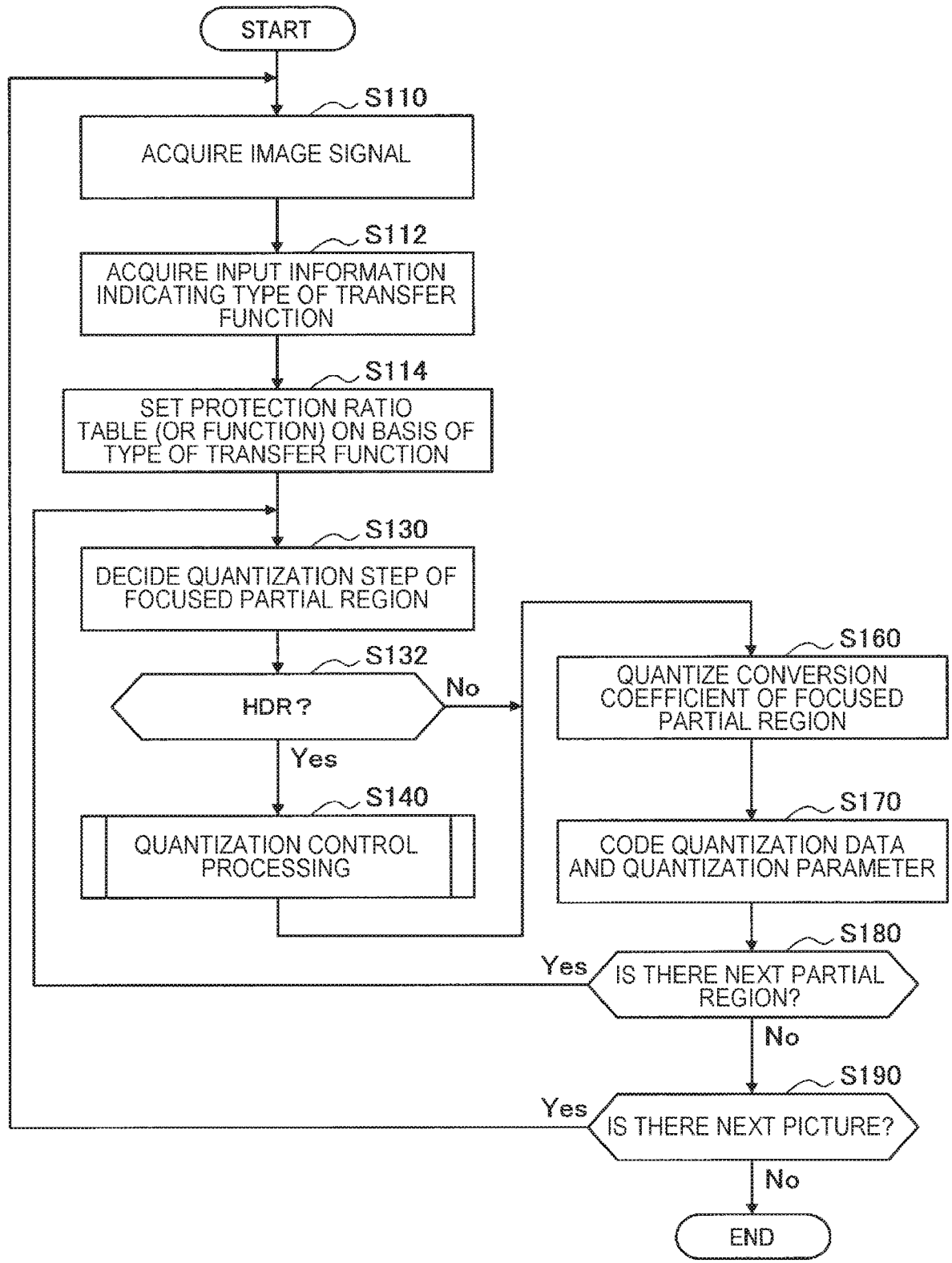
FIG. 12 is a flowchart illustrating an example of a flow of coding control processing according to the first embodiment.

FIG. 12 is a flowchart illustrating an example of a flow of coding control processing according to the embodiment. The coding control processing described here may be repeated for the individual images that are included in a video image. A processing step for acquiring or setting a parameter that does not change over a plurality of images may be skipped in the second and the following repetition. Note that description of processing steps that are not related directly to the control of the code amount will be omitted here for simple explanation.

Referring to FIG. 12, the signal acquisition unit 101 or the signal processing unit 102 first acquires an image signal generated on the basis of a transfer function related to conversion between light and an image signal (Step S110). The image signal acquired here is output to the coding unit 110.

Next, the information acquisition unit 103 or 104 acquires input information related to the transfer function applied to the image that is to be coded by the coding unit 110 from an auxiliary signal multiplexed with an input image signal or via a user interface (Step S112). The input information acquired here is output to the control unit 140.

Next, the code amount control unit 143 sets a protection ratio table or a function to be used when protection ratios are set for the individual partial regions, on the basis of the type of the transfer function indicated by the aforementioned input information (Step S114). The protection ratio table or the function set here may be common to a plurality of transfer functions for the HDR or may be different from each other depending on which of the plurality of transfer functions for the HDR is to be applied.

The following processing is repeated for each of a plurality of partial regions set in the image as a target of processing. The partial region as the target of processing in the repetition will be referred to as a focused partial region here.

First, the quantization unit 115 of the coding unit 110 decides a quantization step for the focused partial region such that a required compression ratio is achieved irrespective of what kind of transfer function is applied (Step S130).

Next, the code amount control unit 143 determines the type of the applied transfer function on the basis of the input information (Step S132). In a case in which it is determined that a transfer function for the HDR has been applied to the image to be coded, then the code amount control unit 143 executes quantization control processing, which will be described later in detail (Step S140). Meanwhile, in a case in which it is determined that a transfer function for the SDR has been applied to the image to be coded, the code amount control unit 143 skips the quantization control processing.

Next, the quantization unit 115 quantizes conversion coefficient data of the focused partial region input from the orthogonal conversion unit 114 in the quantization step after the scaling (or that is not scaled since the image is an SDR video image) (Step S160).

Next, the lossless coding unit 116 codes quantized data and a quantization parameter input from the quantization unit 115 and generates a coded bit stream (Step S170).

Steps S130 to S170 are repeated until processing for all the partial regions in a picture ends (Step S180). Then, if the processing for the entire picture ends, the coding control processing illustrated in FIG. 12 ends (Step S190).

(2) Quantization Control Processing (First Example)

Figure 13A:
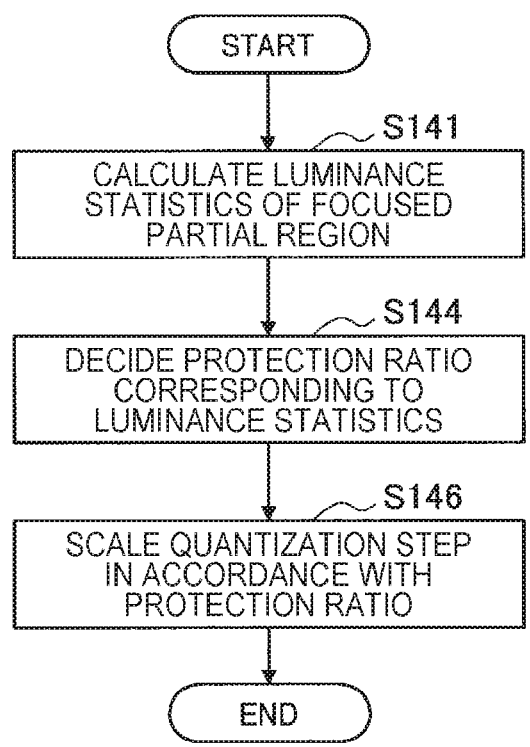
FIG. 13A is a flowchart illustrating an example of a flow of quantization control processing for protecting a grayscale of the high luminance part.

FIG. 13A is a flowchart illustrating a first example of a flow of the quantization control processing that may be executed in Step S140 in FIG. 12. The first example illustrates an example of a flow of the quantization control processing for protecting grayscale of a high luminance part in an image.

Referring to FIG. 13A, the statistical arithmetic operation unit 141 first calculates statistics related to intensity of a luminance component in a focused partial region (Step S141). The statistics calculated here may include an average, a central value, or a most frequent value of pixel values in the partial region for the luminance component, for example. Then, the statistical arithmetic operation unit 141 outputs the calculated statistics to the code amount control unit 143.

Next, the code amount control unit 143 decides a protection ratio corresponding to the luminance statistics of the focused partial region input from the statistical arithmetic operation unit 141 with reference to the protection ratio table or using a function for calculating the protection ratio (Step S144). Then, the code amount control unit 143 outputs the decided protection ratio to the quantization unit 115.

Next, the quantization unit 115 scales the quantization step decided in Step S130 in FIG. 12 in accordance with the protection ratio input from the code amount control unit 143 (Step S146). For example, the quantization unit 115 reduces the quantization step by dividing the quantization step by a protection ratio that is greater than one and that is input from the code amount control unit 143 and enlarges the quantization step by dividing the quantization step by a protection ratio that is smaller than one. Note that the example in which the quantization step that is temporarily decided such that a required compression ratio is achieved is scaled at the protection ratio is described here, the quantization step may be decided in consideration of both the required compression ratio and the protection ratio at the same time. The same applies to another example described below.

(3) Quantization Control Processing (Second Example)

Figure 13B:
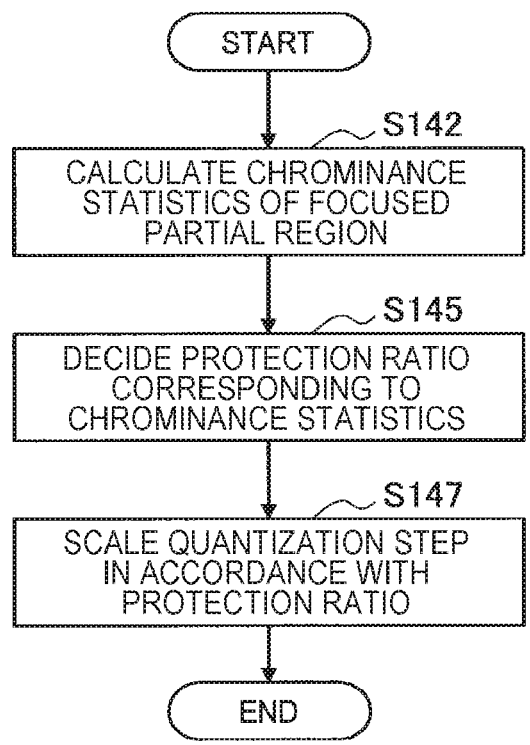
FIG. 13B is a flowchart illustrating an example of a flow of quantization control processing for protecting a grayscale of the high chrominance part.

FIG. 13B is a flowchart illustrating a second example of a flow of the quantization control processing that may be executed in Step S140 in FIG. 12. The second example illustrates an example of a flow of the quantization control processing for protecting grayscale of a high chrominance part in an image.

Referring to FIG. 13B, the statistical arithmetic operation unit 141 first calculates statistics related to intensity of a chrominance component in a focused partial region (Step S142). The statistics calculated here may include an average, a central value, or a most frequent value of pixel values in the partial region for the chrominance component, for example. Then, the statistical arithmetic operation unit 141 outputs the calculated statistics to the code amount control unit 143.

Next, the code amount control unit 143 decides a protection ratio corresponding to the chrominance statistics of the focused partial region input from the statistical arithmetic operation unit 141 with reference to the protection ratio table or using a function for calculating the protection ratio (Step S145). Then, the code amount control unit 143 outputs the decided protection ratio to the quantization unit 115.

Next, the quantization unit 115 scales the quantization step decided in Step S130 in FIG. 12 in accordance with the protection ratio input from the code amount control unit 143 (Step S147). For example, the quantization unit 115 reduces the quantization step by dividing the quantization step by a protection ratio that is greater than one and that is input from the code amount control unit 143 and enlarges the quantization step by dividing the quantization step by a protection ratio that is smaller than one.

(4) Quantization Control Processing (Third Example)

Figure 13C:
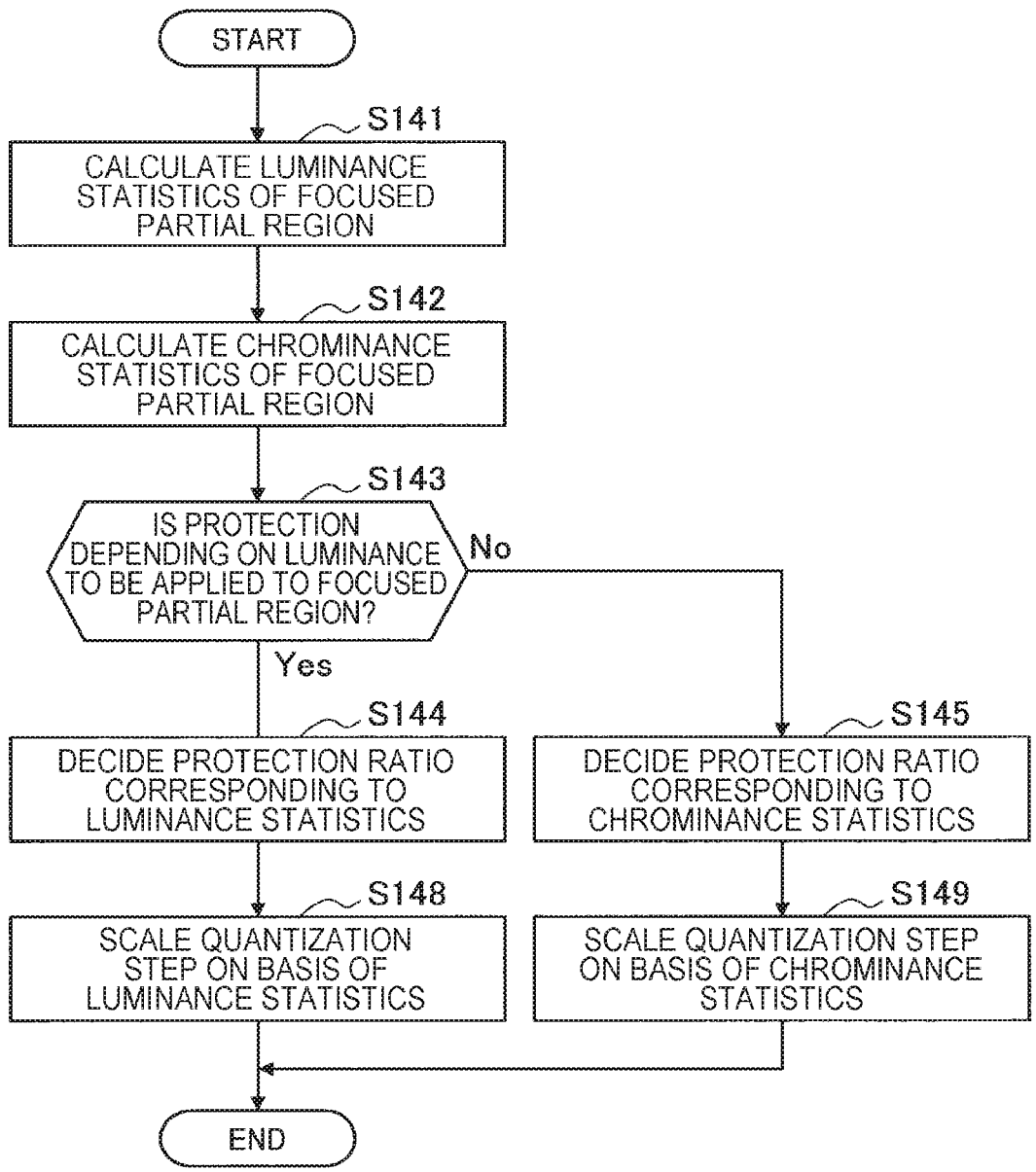
FIG. 13C is a flowchart illustrating an example of a flow of quantization control processing for protecting grayscales of both the high luminance part and the high chrominance part.

FIG. 13C is a flowchart illustrating a third example of a flow of the quantization control processing that may be executed in Step S140 in FIG. 12. The third example illustrates an example of a flow of the quantization control processing for protecting grayscale of both a high luminance part and a chrominance part in an image.

Referring to FIG. 13C, the statistical arithmetic operation unit 141 first calculates statistics related to intensity of a luminance component in a focused partial region (Step S141). Also, the statistical arithmetic operation unit 141 calculates statistics related to intensity of a chrominance component in the focused partial region (Step S142). Then, the statistical arithmetic operation unit 141 outputs the calculated statistics to the code amount control unit 143.

Next, the code amount control unit 143 determines which of protection depending on the luminance and protection depending on the chrominance is to be applied to the focused partial region on the basis of the statistics (for example, a histogram of the chrominance component) of the focused partial region input from the statistical arithmetic operation unit 141 (Step S143).

Next, in a case in which it is determined that the protection depending on the luminance is to be applied to the focused partial region, the code amount control unit 143 decides the protection ratio corresponding to the luminance statistics of the focused partial region with reference to the protection ratio table or using the function for calculating the protection ratio (Step S144). Then, the quantization unit 115 scales the quantization step in accordance with the protection ratio input from the code amount control unit 143 based on the luminance statistics (Step S148).

On the other hand, in a case in which it is determined that the protection depending on the chrominance is to be applied to the focused partial region, the code amount control unit 143 decides the protection ratio corresponding to the chrominance statistics of the focused partial region with reference to the protection ratio table or using the function for calculating the protection ratio (Step S145). Then, the quantization unit 115 scales the quantization step in accordance with the protection ratio input from the code amount control unit 143 based on the chrominance statistics (Step S149).

[2-6. Modification Example]

The example in which the image processing device with a function of coding an image switches ON/OFF of the processing of controlling the code amount to be assigned to each partial region on the basis of the type of the transfer function applied to the image has been described above. However, the idea of the embodiment can also be applied to a case in which the control of the code amount assigned to each partial region is executed without the determination of the type of the transfer function. Such a modification example will be described in this section.

(1) Configuration of Image Processing Device

Figure 14:
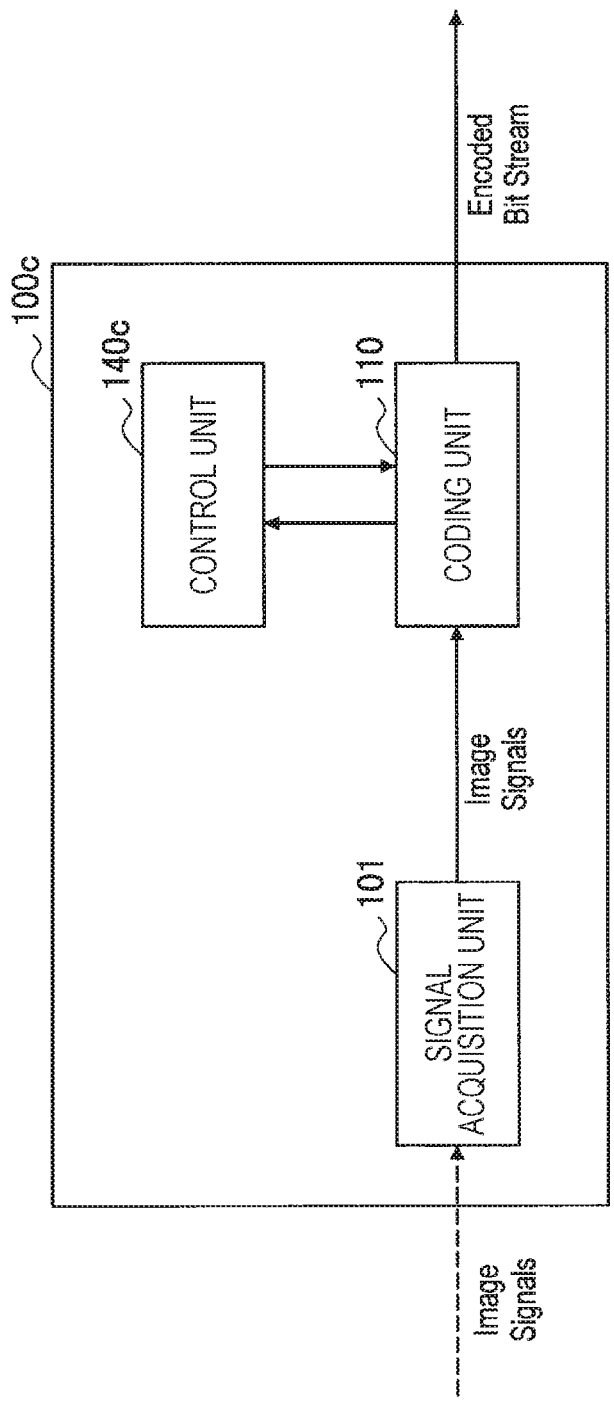
FIG. 14 is a block diagram illustrating a modification example of the configuration of the image processing device according to the first embodiment.

FIG. 14 is a block diagram illustrating a modification example of a configuration of the image processing device according to the first embodiment. An image processing device 100c illustrated in FIG. 14 may be the server device 15 in the example in FIG. 6A or the imaging device 12 or the terminal device 16 (or an image processing module mounted on any of the devices) in the example in FIG. 6B, for example. The image processing device 100c includes a signal acquisition unit 101, a coding unit 110, and a control unit 140c.

Similar to the example described with reference to FIG. 7A, the signal acquisition unit 101 acquires an input image signal generated on the basis of a transfer function related to conversion between light and an image signal. The input image signal acquired by the signal acquisition unit 101 in the modification example is a signal that is converted from light by the transfer function for the HDR and is generated in a signal format for the HDR. The transfer function for the HDR here may be a transfer function such as HLG, ST2084, or S-Log 3 for enabling display of a video image with a luminance of greater than 100 nits, for example. The coding unit 110 codes an image expressed by the image signal input from the signal acquisition unit 101 and generates a coded bit stream. Note that the image processing device 100c may include the signal processing unit 102 described with reference to FIG. 7B instead of the signal acquisition unit 101.

In the modification example, the control unit 140c controls the code amount assigned to each partial region of the image by the coding unit 110 depending on at least one of a luminance component or a chrominance component of the partial region on the assumption that the transfer function for the HDR has been applied to the image to be coded. More specifically, the control unit 140c may control the code amount assigned to each partial region by scaling the quantization step used for each region on the basis of at least one of the luminance component or the chrominance component in accordance with any of the examples described with reference to FIGS. 13A to 13C without determining the type of the transfer function.

The scaling of the quantization step may be realized by multiplying or dividing (for example, division by the protection ratio) of a parameter decided using a function that employs a code value of a color component described with reference to FIG. 9A, for example, as an argument. Instead, the scaling of the quantization step may be realized by multiplying or dividing a code value of the color component described above with reference to FIG. 9B, for example, and a parameter mapped in advance (acquired with reference to a mapping table). It is possible to assign a larger code amount to a partial region with a color component with higher intensity and to reduce deterioration of image quality due to codec distortion by reducing the quantization step for such a partial region.

(2) Coding Control Processing

Figure 15:
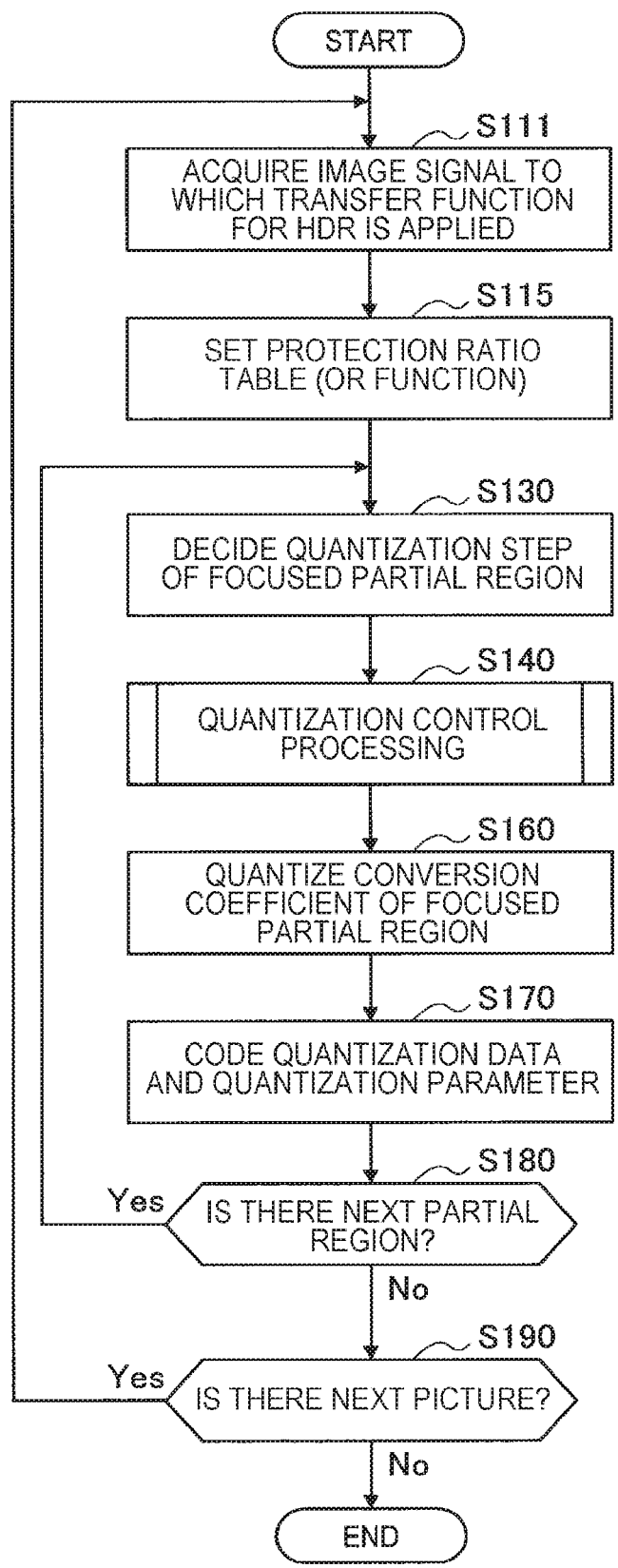
FIG. 15 is a flowchart illustrating an example of a flow of the coding control processing according to the modification example described with reference to FIG. 14.

FIG. 15 is a flowchart illustrating an example of a flow of the coding control processing according to the modification example described with reference to FIG. 14. The coding control processing described here may be repeated for the individual images that are included in a video image. A processing step for acquiring or setting a parameter that does not change over a plurality of images may be skipped in the second and the following repetition. Note that description of processing steps that are not related directly to the control of the code amount will be omitted here for simple explanation.

Referring to FIG. 15, the signal acquisition unit 101 or the signal processing unit 102 first acquires an image signal to which a transfer function for the HDR related to conversion between light and the image signal is applied (Step S111). The image signal acquired here is output to the coding unit 110.

Next, the control unit 140c sets a protection ratio table or a function that is used when protection ratios are set for the individual partial regions (Step S115). The protection ratio table or the function set here may be common to a plurality of transfer functions for the HDR or may be different from each other depending on which of the plurality of transfer functions for the HDR is to be applied.

The following processing is repeated for each of a plurality of partial regions set in an image as a target of processing. First, the quantization unit 115 of the coding unit 110 decides a quantization step for a focused partial region such that a required compression ratio is achieved (Step S130).

Next, the control unit 140c executes one of the quantization control processes described above with reference to FIGS. 13A to 13C (Step S140). In this manner, the quantization step for the focused partial region decided in Step S130 is scaled.

Next, the quantization unit 115 quantizes conversion coefficient data of the focused partial region input from the orthogonal conversion unit 114 in the quantization step after the scaling (Step S160).

Next, the lossless coding unit 116 codes quantized data and a quantization parameter input from the quantization unit 115 and generates a coded bit stream (Step S170).

Steps S130 to S170 are repeated until processing for all the partial regions in a picture ends (Step S180). Then, if the processing for the entire picture ends, the coding control processing illustrated in FIG. 15 ends (Step S190).

[2-7. Overview of First Embodiment]

The first embodiment of the technology according to the present disclosure has been described above with reference to FIGS. 6A to 15. In the aforementioned embodiment, when the acquired image is coded on the basis of the transfer function related to the conversion between light and the image signal, the code amount assigned to each partial region of the image is controlled on the basis of the transfer function. With such a configuration, it is possible to cause the code amount assigned to each partial region to change depending on what kind of transfer function is applied to the image. In this manner, it is possible to prevent codec distortion from significantly appearing in the partial region of the image due to shortage of the assigned coded amount for expressing grayscale of the original signal as a result of the selection of the transfer function.

Also, according to the aforementioned embodiment, the code amount assigned to each partial region may be controlled depending on at least one of the luminance component or the chrominance component of the partial region in the case in which the first transfer function of the first transfer function corresponding to the first dynamic range and the second transfer function corresponding to the second dynamic range that is narrower than the first dynamic range is applied to the image. With such a configuration, it is possible to adjust the assigned code amount decided irrespective of the transfer function for each partial region depending on the intensity of at least one color component in a case in which the transfer function corresponding to a wider dynamic range is applied. In this manner, it is possible to optimize the assigned code amount and to reduce deterioration of image quality by taking advantage of the configuration that is designed or tuned on the assumption of a specific dynamic range for the extended dynamic range.

In one example, the aforementioned first dynamic range may be a dynamic range for enabling display with a luminance of 100 nits or greater, and the aforementioned second dynamic range may be a dynamic range with an upper limit of luminance of 100 nits. In this manner, it is possible to take advantage of an existing encoder designed for an SDR video image for coding an HDR video image to which a transfer function such as HLG, ST2084, or S-Log 3, for example, is applied while preventing deterioration of image quality.

Also, in the aforementioned embodiment, the code amount assigned to each partial region is controlled by scaling the quantization step depending on at least one of the luminance component or the chrominance component of the partial region. For example, it is possible to more satisfactory maintain the grayscale of the image by scaling the quantization step decided in accordance with a requirement (a required compression ratio or the like) of an application to a smaller value. Also, it is possible to compensate for a decrease in coding efficiency by scaling the quantization step to a larger value for a partial region to which the code amount is assigned relatively with a margin.

In one example, if a configuration in which the scaling of the quantization step is performed for each block corresponding to a processing unit of quantization processing defined in the individual video image coding scheme is employed, it is possible to extend an encoder that supports such video image coding schemes and easily incorporate the aforementioned technology according to the embodiment at low cost.

Also, the quantization step used for each partial region is scaled such that a larger code amount is assigned to a partial region in which intensity of at least one of the luminance component or the chrominance component of the partial region is higher in the aforementioned embodiment. As described above, image information is compressed at a higher compression ratio at a part in which the code value is relatively large, in particular, in the case of the HDR, for example, as compared with the case of the SDR, and this causes an increase in codec distortion at a high luminance part and a high chrominance part in an image when the HDR video image is displayed. In contrast, it is possible to reduce codec distortion and to appropriately reproduce a change in grayscale in the original image by reducing the quantization step and raising the assigned code amount in the partial region in which the intensity of the color component is higher.

Also, the transfer function may be determined on the basis of input information related to the transfer function applied to the image in the aforementioned embodiment. In a case in which the input information is acquired via a user interface, it is possible to execute control based on the transfer function as desired by the user even if the transfer function cannot be determined from the input signal. In a case in which the input information is acquired from an auxiliary signal multiplexed with the input image signal, it is possible to automatically execute the control based on the transfer function without requiring a user's input.

Also, according to the modification example, the code amount assigned to each partial region of the image is controlled depending on at least one of the luminance component or the chrominance component of the partial region when the image acquired on the basis of the transfer function related to the conversion between light and an image signal is coded. In this manner, it is possible to prevent codec distortion from significantly appearing in the partial region of the image due to shortage of the assigned code amount for expressing grayscale of the original signal.

<3. Second Embodiment>

[3-1. Introduction]

In many video image coding schemes, an encoder selects an optimal mode from a plurality of selectable modes in terms of coding efficiency, codes mode information indicating the selected mode, and transmits the mode information to the decoder. Such mode selection may include selection of a prediction mode in intra-prediction (for example, a prediction direction and a prediction block size), selection of a prediction mode in inter-prediction (for example, a motion vector, a prediction block size, and a reference picture), and selection of a prediction method between the intra-prediction mode and the inter-prediction mode, for example. The mode selection is typically performed by evaluating cost that may correspond to a sum of a code amount that occurs from a prediction residual remaining after subtracting prediction image data from original image data and a code amount that occurs from mode information as an overhead over a plurality of candidate modes. However, a cost evaluation formula designed or tuned for an SDR video image is not necessarily optima for an HDR video image. This is because image information is more strongly compressed in an image signal of the HDR video image as compared with that in the SDR video image and a difference in the codes amounts between modes occurring from the prediction residual is prone to be underestimated in a case in which the same evaluation formula is used.

The present inventors recognized that unnatural bias often occurs in a selected prediction mode in a case in which an image signal of a sample video image expressed in a signal format for the HDR is coded by an existing encoder in accordance with H.264/AVC. If a prediction mode selected for each prediction block as a result of intra-prediction is analyzed for a certain image, for example, there was a case in which DC prediction (also referred to as average value prediction) was selected in an unnaturally large number of blocks over the entire image. Such bias of the prediction mode leads to degradation of prediction accuracy and distortion that is scatted over the entire image at a required compression ratio. The reason that the bias of the prediction mode occurs is that a uniform cost evaluation formula for mode selection is not suitable for the HDR video image. In particular, it is estimated that contribution of the prediction residual in the cost evaluation formula decreases as a result of strong compression of the image information and contribution of the mode information becomes excessively dominant in the case of the HDR.

In general, rate distortion (RD) optimization based on a Lagrange multipliers method is known as a method for selecting an optimal mode from a plurality of candidate modes. In the RD optimization, code cost $J_i$ for the i-th candidate mode may be described as the following formula.

[Math. 1]

$$J_i = D_i + \lambda \cdot R_i \quad (1)$$

In Formula (1), $D_i$ represents distortion occurring in an image in the i-th candidate mode (also referred to as a prediction residual code amount) and is typically equal to a sum of absolute difference (SAD) between the original image and the prediction image. $R_i$ represents a code amount of an overhead bit (for example, mode information indicating the prediction mode) occurring in the i-th candidate mode. $\lambda$ is a coefficient that depends on a quantization parameter QP. In the right side of Formula (1), an offset value that depends on QP may be added (or subtracted) instead of the coefficient λ. Also, a value obtained by Hadamard transform on the sum of absolute difference may be used as the prediction residual code amount $D_i$.

When the cost evaluation formula as Formula (1) is incorporated in the encoder, it is advantageous to use a fixed value defined in advance for each candidate mode as an item $R_i$ (hereinafter, referred to as a mode code amount) of the code amount of the overhead bit in order to secure a sufficient processing speed or reduce complication of incorporation, for example. Meanwhile, a difference in grayscale that is similar to that in the image before signal conversion is compressed into a smaller difference of a code value in the case of the HDR as compared with the case of the SDR. Thus, the mode encode amount $R_i$ optimized for the SDR video image is too large to be included into a cost evaluation formula along with the prediction residual code amount $D_i$ occurring in the HDR video image.

Figure 16A:
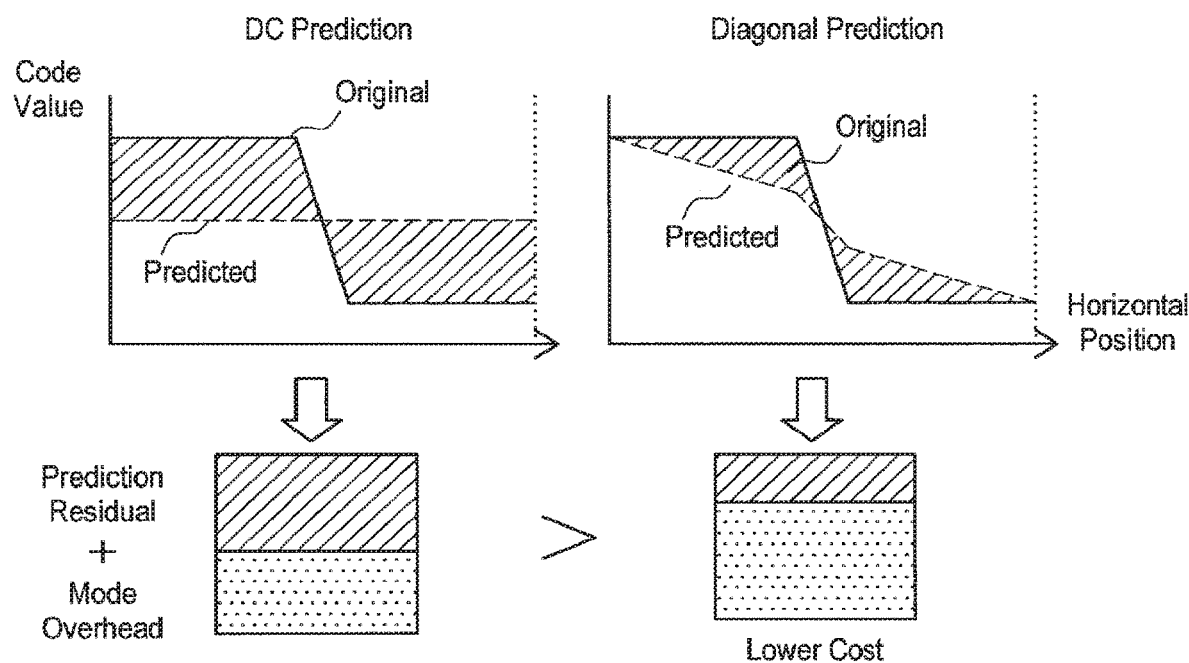
FIG. 16A is a first explanatory diagram for explaining influences of a difference in transfer functions on mode selection.
Figure 16B:
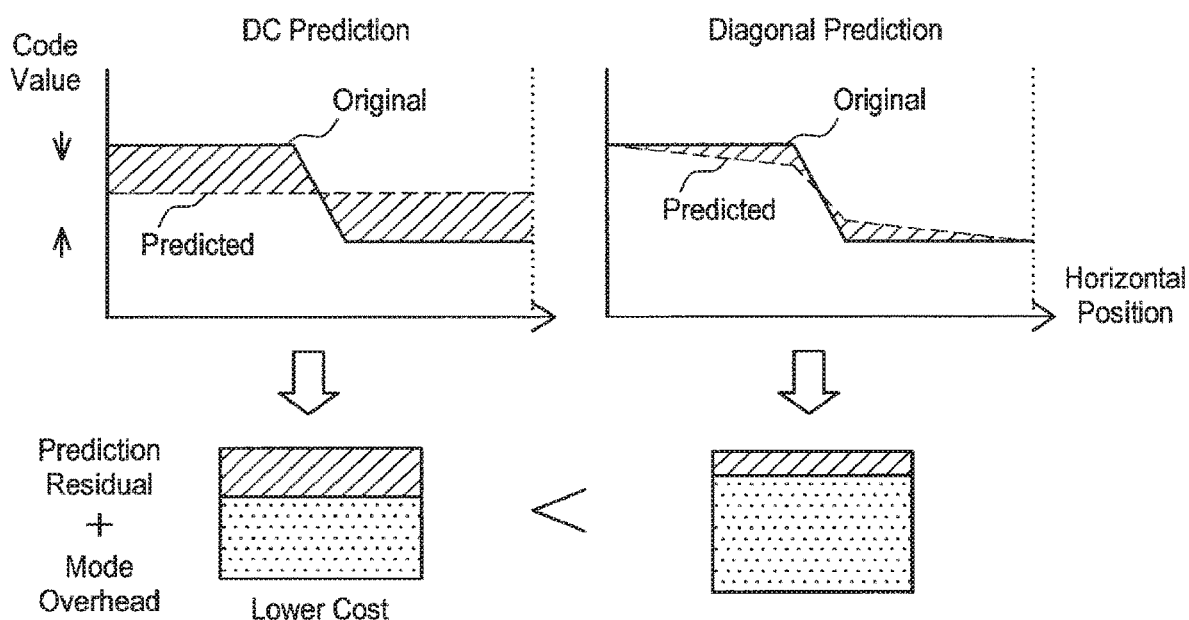
FIG. 16B is a second explanatory diagram for explaining influences of a difference in transfer functions on mode selection.

FIGS. 16A and 16B are explanatory diagram for explaining influences of a difference in transfer functions on the mode selection. The horizontal axis of the graph illustrated in the upper section in FIG. 16A represents a pixel position in the horizontal direction on one line in an image. The vertical axis represents a code value of a certain color component of a pixel array on the line. The solid line of the graph represents a code value of the original image, and in the example illustrated in the drawing, the code value becomes a large value in the left half of the line, decreases at the center of the line, and becomes a small value in the right half of the line. The dashed line of the left graph represents a code value of a predicted image that may be generated in accordance with DC prediction that is one of prediction modes of intra-prediction. The dashed line of the right graph represents a code value of a predicted image that may be generated in accordance with diagonal direction prediction that is another one of prediction modes of the intra-prediction. An area (the hatched part in the drawing) of the part surrounded by the trajectory (solid line) of the code value of the original image and the trajectory (dashed line) of the code value of the predicted image corresponds to a prediction error in a case in which each prediction mode is selected. In the example in FIG. 16A, the prediction error of the DC prediction is larger than the prediction error of the orthogonal direction prediction. Meanwhile, it is assumed that a mode code value (the dotted hatched part in the drawing) that is smaller than that in the orthogonal direction prediction is applied to the DC prediction with a smaller mode number, for example. However, the orthogonal direction prediction exhibits a smaller cost value than the DC prediction in the sum of the prediction error code amount and the mode code amount, that is, in comparison of the cost between two prediction modes. Therefore, the orthogonal direction prediction may be selected as a prediction mode of the intra-prediction in this case.

In the graph illustrated in the upper section in FIG. 16B, the solid line also represents a code value of the original image. However, the transfer function for the SDR is applied in the example in FIG. 16A while a difference of grayscale that should originally be in a similar level is compressed into a smaller difference of the code value as a result of the transfer function for the HDR being applied to the image in the example in FIG. 16B. Therefore, in comparison of the areas of the part surrounded by the trajectory (solid line) of the code value of the original image and the trajectory (dashed line) of the code value of the predicted image, that is, prediction errors (the hatched part in the drawing) between the DC prediction and the orthogonal direction prediction, the difference between the prediction errors becomes smaller. Then, if the respective mode code amounts (dotted hatched part in the drawing) is added to the prediction error code amount, a total cost exhibits a smaller value in the DC prediction than in the orthogonal direction prediction. Therefore, the DC prediction may be selected as a prediction mode of the intra-prediction in this case regardless of the fact that the original image is the same.

In order to prevent undesirable occurrence of codec distortion in the image as a result of the difference in transfer functions affecting the mode selection in this manner, a method of controlling one of the prediction residual code amount and the mode code amount included in the cost evaluation formula on the basis of the transfer function will be proposed as a second embodiment in this section.

[3-2. Outline of System]

An image processing system according to the embodiment may be configured similarly to the image processing system 10a or 10b according to the first embodiment. For example, an imaging device, a server device, a terminal device, or an image processing module mounted on any of the devices in the system has a function as an image processing device (that is, an encoder) that encodes an image acquired on the basis of a transfer function related to conversion between light and an image signal. In the embodiment, a prediction residual code amount or a mode code amount for mode selection is controlled on the basis of the transfer function when the encoder codes the image. In this manner, selection of an inappropriate mode in a case in which a signal format for the HDR is used is avoided, and deterioration of image quality is reduced. In the following sections, a specific and exemplary configuration of such an image processing device will be described in detail.

[3-3. Schematic Configuration of Image Processing Device]

Figure 17A:
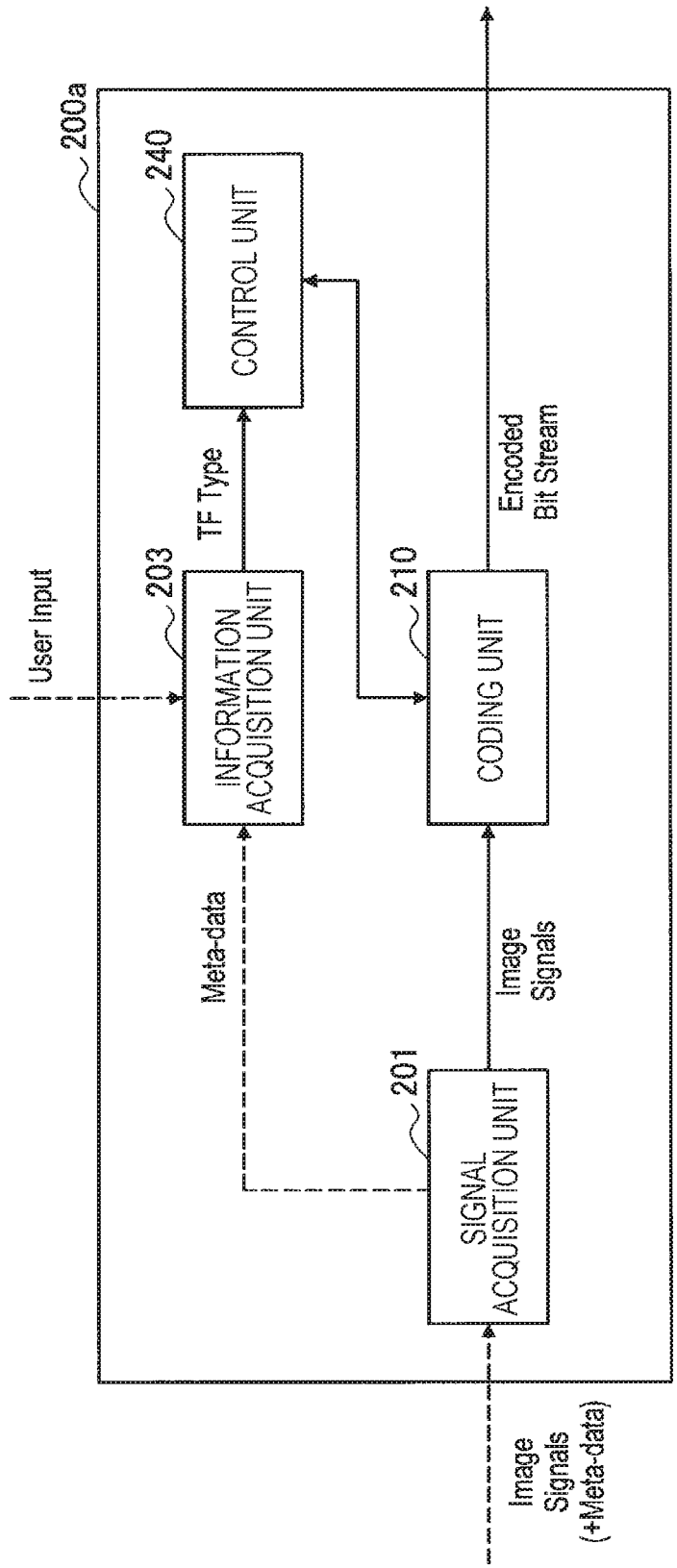
FIG. 17A is a block diagram illustrating a first example of a schematic configuration of an image processing device according to a second embodiment.

FIG. 17A is a block diagram illustrating a first example of a schematic configuration of the image processing device according to the embodiment. An image processing device 200a illustrated in FIG. 17A includes a signal acquisition unit 201, an information acquisition unit 203, a coding unit 210, and a control unit 240.

The signal acquisition unit 201 acquires an input image signal generated on the basis of a transfer function related to conversion between light and an image signal. The signal acquisition unit 201 may acquire the input image signal from an external device via a transmission interface or may acquire the input image signal from an imaging module and a signal processing module (not illustrated) that are integrally configured with the image processing device 200a.

The information acquisition unit 203 acquires input information related to the transfer function applied to an image that is coded by the coding unit 210. In one example, the information acquisition unit 203 may acquire the input information via a user interface that the image processing device 200a has. The user interface may be provided by a physical input device such as a touch panel, a button, or a switch, for example, provided in a case body of the image processing device 200a. Instead, the user interface may be provided as a GUI on a terminal device that is connected in a remote manner via a communication interface. In the embodiment, the input information includes at least a transfer function type indicating a type of the transfer function applied to the image to be coded. The user interface may allow the user to select one of two options, namely "SDR" and "HDR" to be applied to the image, for example. In this case, it is determined that one transfer function defined in advance for the SDR or one transfer function defined in advance for the HDR has been applied to the image. Also, the user interface may allow the user to select the transfer function to be applied to the image among a plurality of candidates of the transfer function.

In another example, the information acquisition unit 203 may acquire input information from an auxiliary signal multiplexed with an input image signal. For example, the auxiliary signal is received by the signal acquisition unit 201 in a period in which an image signal is not transmitted on a signal line. Then, the information acquisition unit 203 may acquire the input information including the transfer function type indicating the type of the transfer function applied to the image from the auxiliary signal separated by the signal acquisition unit 201.

The coding unit 210 codes an image expressed by an image signal acquired by the signal acquisition unit 201 and generates a coded bit stream. The coding unit 210 may execute coding processing in accordance with any video image coding scheme such as MPEG-2, H.264/AVC, or H.265/HEVC, for example. The coding processing executed by the coding unit 210 typically includes various kinds of processing such as prediction, orthogonal conversion, quantization, and entropy coding, and various kinds of mode selection is executed in the processing. Although mode selection in intra-prediction and inter-prediction will be mainly described here, an idea of the embodiment may be used for any kinds of mode selection such as selection of a conversion block size or selection of a prediction mode of inter-layer prediction for scalable coding.

The control unit 240 controls a prediction residual code amount or a mode code amount for mode selection when an image is coded by the coding unit 210, on the basis of the transfer function indicated by the input information that is acquired by the information acquisition unit 203. Typically, the control unit 240 switches at least one item to be included in the cost evaluation formula on the basis of the transfer function such that one of the prediction residual and the mode code amount is neither underestimated nor overestimated relative to the other in the cost evaluation formula. Note that although an example in which cost evaluation is controlled on the basis of the type of the transfer function will be mainly described here, the cost evaluation may be controlled on the basis of other attributes of the transfer function such as an upper limit value of a dynamic range related to the transfer function.

Figure 17B:
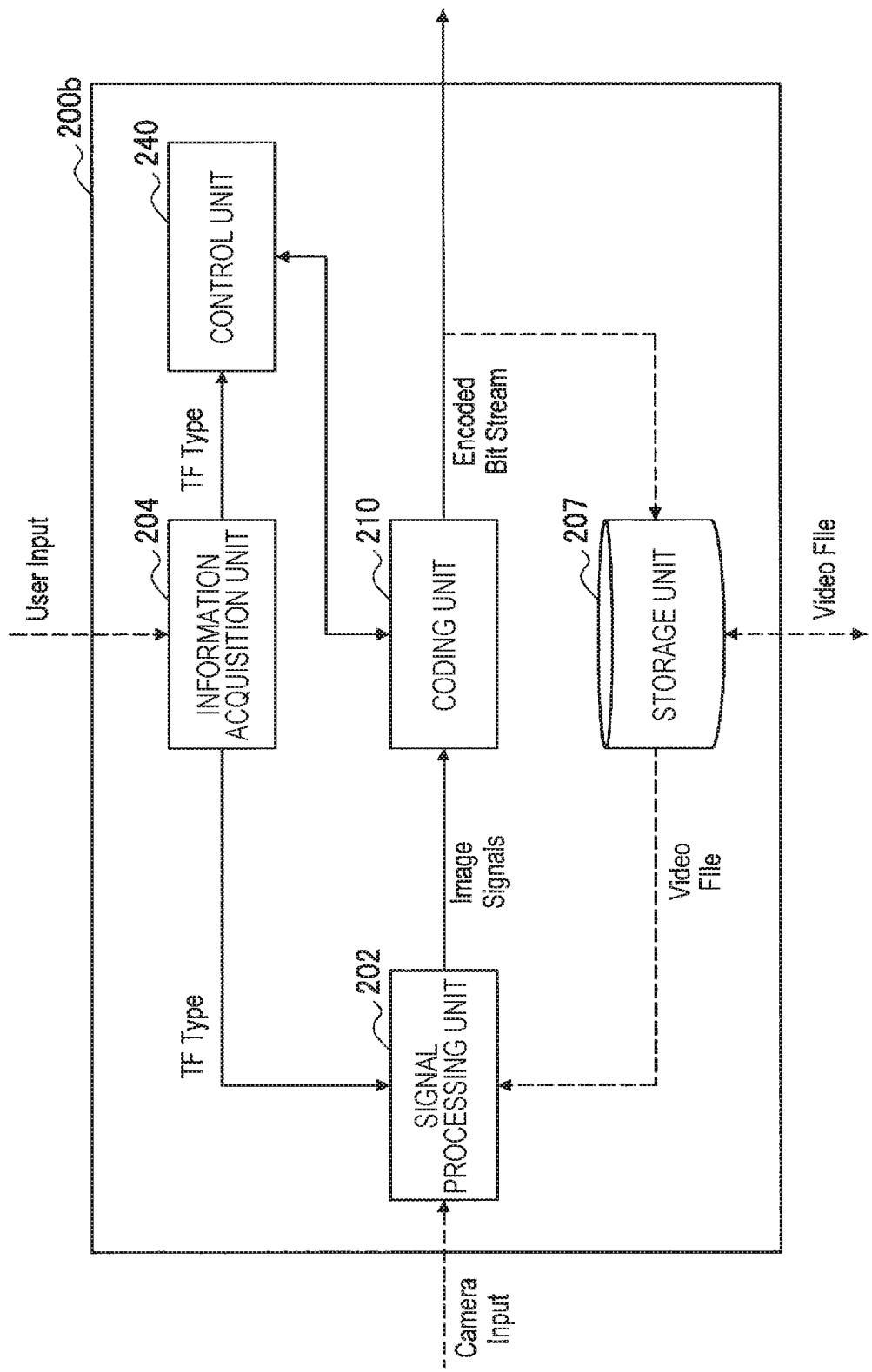
FIG. 17B is a block diagram illustrating a second example of schematic configurations of an image processing device according to a second embodiment.

FIG. 17B is a block diagram illustrating a second example of a schematic configuration of the image processing device according to the embodiment. An image processing device 200b illustrated in FIG. 17B includes a signal processing unit 202, an information acquisition unit 204, a storage unit 207, a coding unit 210, and a control unit 240.

The signal processing unit 202 acquires a primitive image signal input from the imaging device via some transmission interface or a signal line in the device or acquires the image signal from a video image file stored in the storage unit 207. Then, the signal processing unit 202 executes digital signal processing that may include gamma correction and color conversion, for example, on the primitive image signal and generates an image signal as a target of coding in a predetermined signal format. The signal format and the corresponding transfer function applied to the image by the signal processing unit 202 are decided on the basis of the input information acquired by the information acquisition unit 204. Then, the signal processing unit 202 outputs the generated image signal to the coding unit 210.

The information acquisition unit 204 acquires input information related to the transfer function to be applied to the image coded by the coding unit 210. For example, the information acquisition unit 204 may acquire the input information via a user interface that the image processing device 200b has. As described above, the input information includes at least a transfer function type indicating a type of a transfer function to be applied to the image to be coded. The user interface may allow the user to select one of two options, namely "SDR" and "HDR" to be applied to the image, for example. Also, the user interface may allow the user to select the transfer function to be applied to the image among a plurality of candidates of the transfer function.

The storage unit 207 is a storage device for storing various kinds of video image data. The storage unit 207 may store a video image file that records the digital image signal before the signal conversion, for example. The user may cause the storage unit 207 to store the video image file stored in another storage medium via an input and output interface (not illustrated) that the image processing device 200b has. Also, the storage unit 207 may store the video image file including the coded bit stream that is generated as a result of the coding processing executed by the coding unit 210. The video image file may be output to an external device in response to a request.

Similarly to the first example described with reference to FIG. 17A, the coding unit 210 codes an image expressed by an image signal that is acquired by the signal processing unit 202 and generates a coded bit stream. The control unit 240 controls a prediction residual code amount or a mode code amount for mode selection when the image is coded by the coding unit 210, on the basis of a type of a transfer function indicated by input information that is acquired by the information acquisition unit 204. The coded bit stream generated by the coding unit 210 may be transmitted to a device outside the image processing device 200b or may be stored as a video image file by the storage unit 207.

[3-4. Detailed Configurations of Coding Unit and Control Unit]

Figure 18:
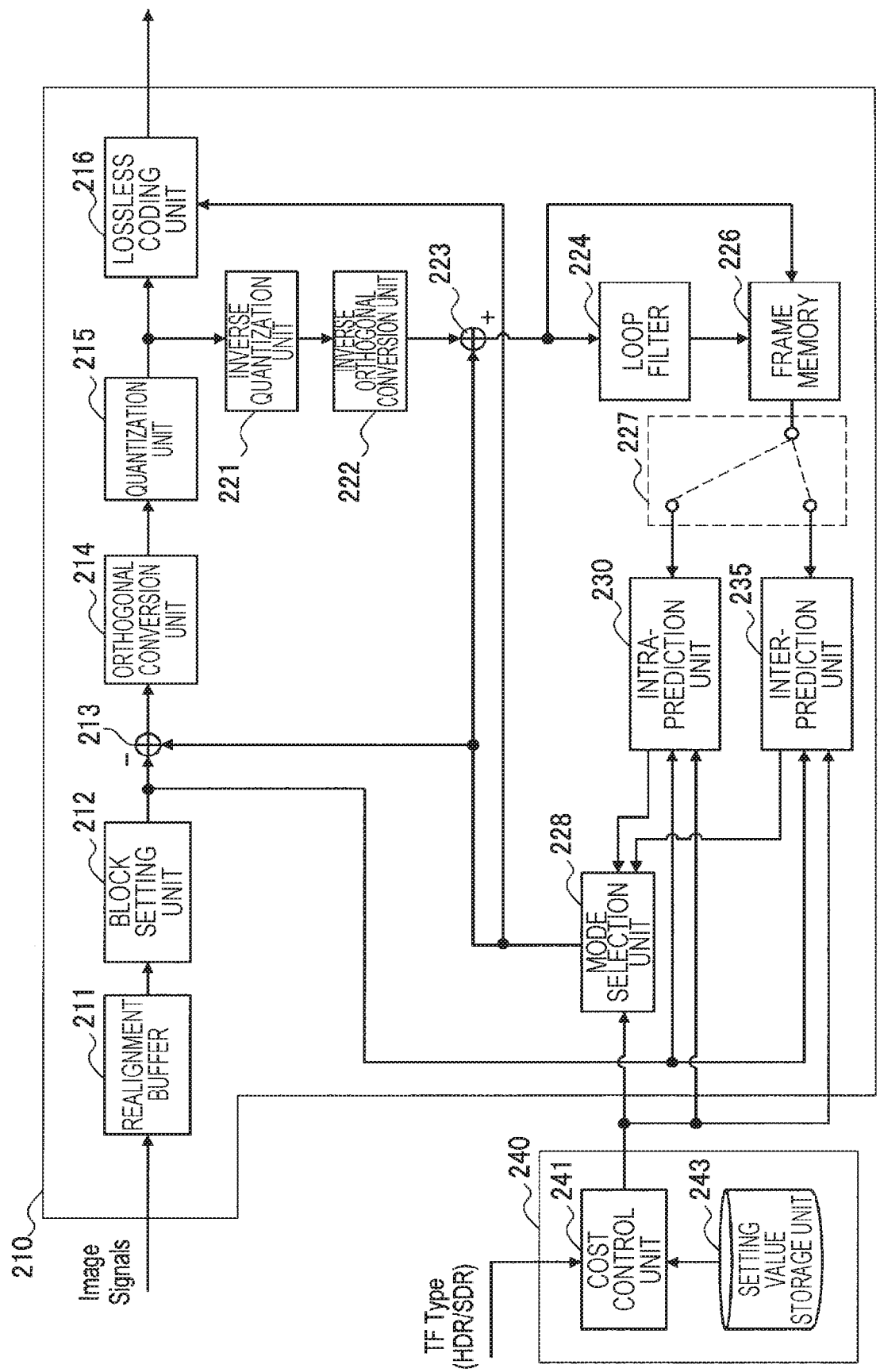
FIG. 18 is a block diagram illustrating an example of detailed configurations of a control unit and a coding unit according to the second embodiment.

In this section, more specific configurations of the coding unit 210 and the control unit 240 illustrated in FIGS. 17A and 17B will be described in detail. FIG. 18 is a block diagram illustrating an example of detailed configurations of the coding unit and the control unit according to the second embodiment.

(1) Coding Unit

Referring to FIG. 18, the coding unit 210 includes a realignment buffer 211, a block setting unit 212, a subtraction unit 213, an orthogonal conversion unit 214, an quantization unit 215, a lossless coding unit 216, an inverse quantization unit 221, an inverse orthogonal conversion unit 222, an addition unit 223, a loop filter 224, a frame memory 226, a switch 227, a mode selection unit 228, an intra-prediction unit 230, and an inter-prediction unit 235.

The realignment buffer 211 realigns image data of a series of images expressed by image signals that are input in accordance with a GOP structure. The realignment buffer 211 outputs image data after the realignment to the block setting unit 212, the intra-prediction unit 230, and the inter-prediction unit 235.

The block setting unit 212 divides each image corresponding to a picture into a plurality of blocks. In MPEG-2 or H.264/AVC, the picture is divided in a grid pattern into a plurality of macroblocks with a fixed size. In H.265/HEVC, the picture is divided into a quadtree pattern into a plurality of coding units with a variable size. These blocks may further be divided into one or more prediction blocks in prediction processing.

The subtraction unit 213 calculates prediction residual data that is a difference between image data and a predicted image data input from the block setting unit 212 and outputs the prediction residual data to the orthogonal conversion unit 214.

The orthogonal conversion unit 214 converts the prediction residual data input from the subtraction unit 213 from image data in a spatial region into conversion coefficient data in a frequency region. Orthogonal conversion executed by the orthogonal conversion unit 214 may be, for example, discrete cosine conversion, discrete sine conversion, or the like. Then, the orthogonal conversion unit 214 outputs conversion coefficient data to the quantization unit 215.

The quantization unit 215 quantizes conversion coefficient data input from the orthogonal conversion unit 214 in a quantization step decided such that a required compression ratio is achieved. Then, the quantization unit 215 outputs the conversion coefficient data after the quantization (hereinafter, referred to as quantized data) to a lossless coding unit 216 and an inverse quantization unit 221.

The lossless coding unit 216 codes the quantized data input from the quantization unit 215, thereby generating the coded bit stream. Also, the lossless coding unit 216 codes various parameters referred to by a decoder and inserts the coded parameters into the coded bit stream. The parameters coded by the lossless coding unit 216 may include information related to the transfer function, information related to a color range, information related to intra-prediction, and information related to inter-prediction. The lossless coding unit 216 outputs the generated coded bit stream to an output destination in accordance with the purpose of an application.

The inverse quantization unit 221, the inverse orthogonal conversion unit 222, and the addition unit 223 are included in a local decoder. The local decoder serves to reconstruct an original image from the coded data.

The inverse quantization unit 221 inversely quantizes the quantized data in the quantization step that is the same as that used by the quantization unit 215 and restores the conversion coefficient data. Then, the inverse quantization unit 221 outputs the restored conversion coefficient data to an inverse orthogonal conversion unit 222.

The inverse orthogonal conversion unit 222 executes inverse orthogonal conversion processing on the conversion coefficient data input from the inverse quantization unit 221, thereby restoring prediction residual data. Then, the inverse orthogonal conversion unit 222 outputs the restored reproduction residual data to the addition unit 223.

The addition unit 223 adds the restored prediction residual data input from the inverse orthogonal conversion unit 222 and the prediction image data generated by the intra-prediction unit 230 or the inter-prediction unit 235, thereby generating decoded image data. Then, the addition unit 223 outputs the generated decoded image data to a loop filter 224 and a frame memory 226.

The loop filter 224 is an in-loop filter for the purpose of improving image quality of a decoded image. The loop filter 224 may include a deblock filter for reducing block distortion that appears in the decoded image, for example. Also, the loop filter 224 may include an adaptive offset filter for adding an edge offset or a band offset to the decoded image. The loop filter 224 outputs decoded image data after the filtering to the frame memory 226.

The frame memory 226 stores decoded image data before the filtering input from the addition unit 223 and decoded image data after the application of the in-loop filter input from the loop filter 224.

The switch 227 reads the decoded image data before the filtering that is used for intra-prediction from the frame memory 226 and supplies the read decoded image data as reference image data to the intra-prediction unit 230. Also, the switch 227 reads the decoded image data after the filtering that is used for inter-prediction from the frame memory 226 and supplies the read decoded image data as reference image data to the inter-prediction unit 235.

The mode selection unit 228 selects a prediction method for each block on the basis of comparison of cost input from the intra-prediction unit 230 and the inter-prediction unit 235. The mode selection unit 228 outputs prediction image data generated by the intra-prediction unit 230 to the subtraction unit 213 and outputs information related to intra-prediction to the lossless coding unit 216 for a block for which intra-prediction is selected. Also, the mode selection unit 228 outputs prediction image data generated by the inter-prediction unit 235 to the subtraction unit 213 and outputs information related to inter-prediction to the lossless coding unit 216 for a block for which inter-prediction is selected.

The intra-prediction unit 230 executes intra-prediction processing on the basis of original image data and decoded image data. For example, the intra-prediction unit 230 evaluates cost estimated to occur for each of a plurality of candidate modes included in a search range. The evaluation of the cost is performed in accordance with the cost evaluation formula (1) described above or a similar evaluation formula, for example. Typically, the cost evaluation formula includes an item of a prediction residual code amount and an item of a mode code amount. In the embodiment, at least one of the item of the prediction residual code amount or the mode code amount is controlled by a cost control unit 241, which will be described later, on the basis of the type of the transfer function. The intra-prediction unit 230 selects a prediction mode in which cost becomes minimum as an optimal prediction mode on the basis of cost evaluation results of the plurality of candidate modes. Also, the intra-prediction unit 230 generates predicted image data in accordance with the selected optimal prediction mode. Then, the intra-prediction unit 230 outputs information related to intra-prediction including the prediction mode information that indicates the optimal prediction mode (a prediction direction, a prediction block size, and the like), corresponding cost, and predicted image data to a mode selection unit 228.

The inter-prediction unit 235 executes inter-prediction processing (motion compensation) on the basis of original image data and decoded image data. For example, the inter-prediction unit 235 evaluates cost that is estimated to occur for each of a plurality of candidate modes included in a search range. Similarly to the case of the intra-prediction, the evaluation of the cost is typically performed in accordance with a cost evaluation formula including an item of a prediction residual code amount and an item of a mode code amount. In the embodiment, at least one of the item of the prediction residual code amount or the item of the mode code amount is controlled by the cost control unit 241, which will be described later, on the basis of the type of the transfer function. The inter-prediction unit 235 selects a prediction mode in which the cost becomes minimum as an optimal prediction mode on the basis of cost evaluation results of the plurality of candidate modes. Also, the inter-prediction unit 235 generates a predicted image data in accordance with the selected optimal prediction mode. Then, the inter-prediction unit 235 outputs information related to inter-prediction including prediction mode information that indicates an optimal prediction mode (a motion vector, a reference picture, a prediction block size, and the like), corresponding cost, and predicted image data to the mode selection unit 228.

(2) Control Unit

Referring to FIG. 18, the control unit 240 includes a cost control unit 241 and a setting value storage unit 243. The cost control unit 241 determines the type of a transfer function applied to an image to be coded on the basis of input information input from the information acquisition unit 203 or 204. Then, the cost control unit 241 controls evaluation of cost for mode selection by one or more sections of the coding unit 210 on the basis of the determined type of the transfer function. More specifically, the cost control unit 241 can adjust a balance between contribution of a prediction residual and contribution of mode information in cost evaluation by scaling one of the prediction residual code amount and the mode code amount included in the cost evaluation formula, for example. In a case in which variation in the mode code amount is large relative to variation in the prediction residual code amount in the plurality of code modes during the cost evaluation, the contribution of the mode code amount to the mode selection becomes excessively large as compared with the contribution of the prediction residual code amount, and as a result, an optimal mode is decided in a state in which the variation in the prediction residual code amount is underestimated. In contrast, in a case in which the variation in the mode code amount is small relative to the variation in the prediction residual code amount in the plurality of candidate modes, the contribution of the mode code amount to the mode selection becomes excessively small as compared with the contribution of the prediction residual code amount, and as a result, an optimal mode is decided in a state in which the variation in the mode code amount is underestimated. Therefore, it is advantageous to optimize a balance between both the contributions of the code amounts by satisfactorily adjusting the contribution of the code amounts.

In a first example, the scaling of the code amount may be performed by setting a set to be used in cost evaluation among a plurality of sets of cost values defined in advance, depending on the type of the transfer function. Since a prediction residual cannot be defined in advance, the mode code amount (for example, the item of $R_i$ in Formula (1)) may be defined for each candidate mode in the first example. A first set of cost values may be set in a case in which a first transfer function is applied to an image, and a second set of cost values may be set in a case in which a second transfer function is applied to the image. Typically, the set of cost values set in a case in which a first transfer function (for example, a transfer function for the HDR) corresponding to a first dynamic range is applied to the image defines a smaller mode code amount as compared with the set of cost values set in a case in which a second transfer function (a transfer function for the SDR) corresponding to a narrower second dynamic range is applied to the image. In this manner, it is possible to reduce the mode code amount in accordance with estimated reduction of the prediction residual and to perform proper cost evaluation with a satisfactory balance.

In a second example, scaling of a code amount may be performed by adding (or subtracting) of an offset corresponding to the type of a transfer function or by multiplying (or subtracting) a coefficient corresponding to the type of the transfer function. In this case, the offset or the coefficient may be applied to any of the prediction residual code amount and the mode code amount. For example, the cost control unit 241 may increase the prediction error code amount or reduce the mode code amount in a case in which the transfer function for the HDR is applied to the image. Also, the cost control unit 241 may reduce the prediction error code amount or increase the mode code amount in a case in which the transfer function for the SDR is applied to the image.

Figure 19:
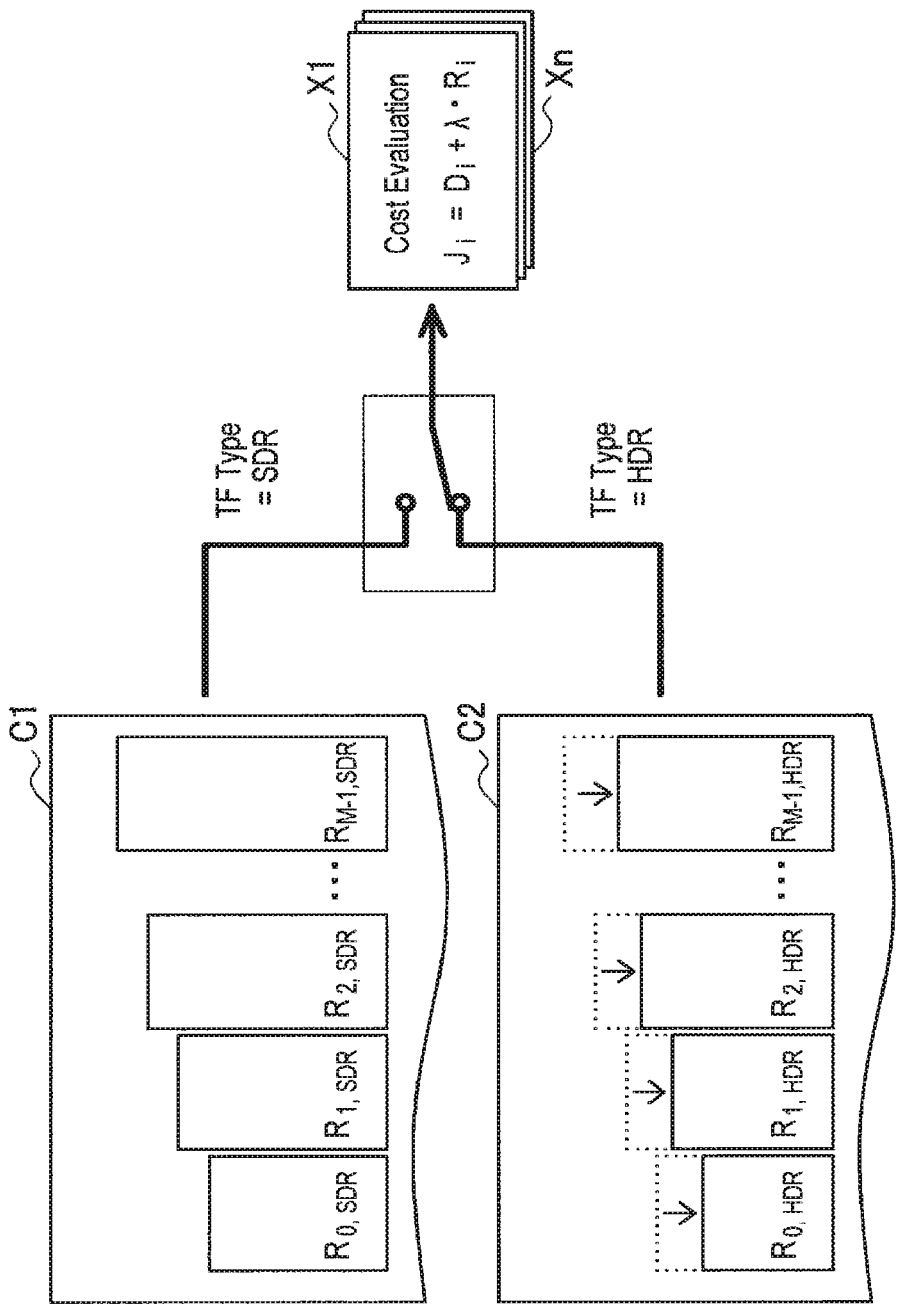
FIG. 19 is an explanatory diagram for explaining an example of switching of a mode coding amount based on a type of a transfer function.

FIG. 19 is an explanatory diagram for explaining an example of switching of a mode code amount based on the type of the transfer function according to the aforementioned first example. A cost value set C1 illustrated in the upper left side in FIG. 19 includes a mode code amount $R_{i,SDR}$ (i=0, . . . , M−1) of each of M candidate modes that is to be included in the cost evaluation formula in a case in which the transfer function for the SDR is applied. A cost value set C2 includes a mode code amount $R_{i,HDR}$ (i=0, . . . , M−1) of each of M candidate modes to be included in the cost evaluation formula in a case in which the transfer function for the HDR is applied. The setting value storage unit 243 stores such cost value sets C1 and C2 defined in advance. As illustrated in the drawing, the mode code amount $R_{i,HDR}$ included in the cost value set C2 is smaller than the mode code amount $R_{i,SDR}$ included in the cost value set C1 for the i-th candidate mode. The setting value storage unit 243 may store three or more cost value sets that are respectively associated with three or more types of transfer functions. The cost control unit 241 may set one corresponding to a type of a transfer function in the plurality of cost value sets that are respectively associated with such a plurality of different transfer functions for one or more sections X1 to Xn of the coding unit 210 that performs mode selection.

Note that the present disclosure is not limited to the example illustrated in FIG. 19, and the setting value storage unit 243 may store the parameter (for example, the offset or the coefficient) used for scaling the prediction residual code amount or the mode code amount in advance in association with one or more transfer functions.

As described above, the coding unit 210 includes an intra-prediction unit 230 that executes intra-prediction. The prediction residual code amount or the mode code amount that is controlled by the cost control unit 241 may be used by the intra-prediction unit 230 for mode selection from a plurality of candidate modes in the intra-prediction. Also, the coding unit 210 includes an inter-prediction unit 235 that executes inter-prediction. The prediction residual code amount or the mode code amount controlled by the cost control unit 241 may be used by the inter-prediction unit 235 for mode selection from a plurality of candidate modes in the inter-prediction. Also, the coding unit 210 includes a mode selection unit 228 that executes selection of a prediction method that is intra-prediction or inter-prediction. The prediction residual code amount or the mode code amount controlled by the cost control unit 241 may be used by the mode selection unit 228 for selecting such a prediction method.

[3-5. Flow of Processing]

Figure 20:
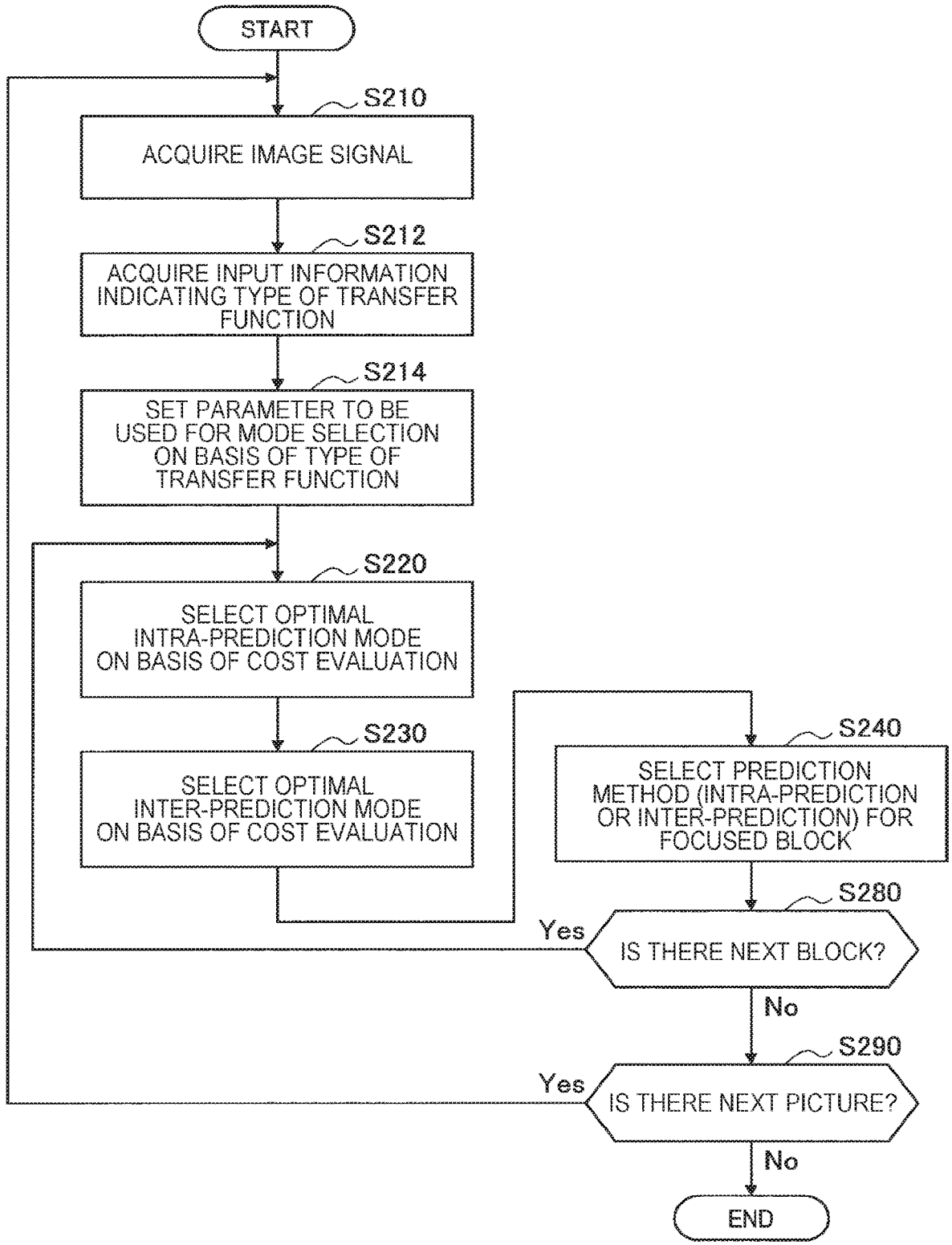
FIG. 20 is a flowchart illustrating an example of a flow of coding control processing according to the second embodiment.

FIG. 20 is a flowchart illustrating an example of a flow of coding control processing according to the embodiment. The coding control processing described here may be repeated for the individual images that are included in a video image. A processing step for acquiring or setting a parameter that does not change over a plurality of images may be skipped in the second and the following repetition. Note that description of processing steps that are not related directly to the control of the mode selection will be omitted here for simple explanation.

Referring to FIG. 20, the signal acquisition unit 201 or the signal processing unit 202 first acquires an image signal generated on the basis of a transfer function related to conversion between light and an image signal (Step S210). The image signal acquired here is output to the coding unit 210.

Next, the information acquisition unit 203 or 204 acquires input information related to the transfer function applied to the image that is to be coded by the coding unit 210 from an auxiliary signal multiplexed with an input image signal or via a user interface (Step S212). The input information acquired here is output to the control unit 240.

Next, the cost control unit 241 sets a parameter to be used for the mode selection performed by the coding unit 210, on the basis of the type of the transfer function indicated by the aforementioned input information (Step S214). The parameter set here may be a set of mode code amounts defined in advance for each candidate mode or may be an offset or a coefficient applied to the prediction residual code amount or the mode code amount.

The following processing is repeated for each of the plurality of blocks set in the image as the target of the processing. The block as a target of the processing in each repetition will be referred to as a focused block here.

The intra-prediction unit 230 of the coding unit 210 evaluates cost of the focused block in the plurality of candidate modes and selects an optimal intra-prediction mode on the basis of the cost evaluation in the candidate modes (Step S220). The cost evaluation described here may be performed using the cost evaluation formula that includes the prediction residual code amount and the mode code amount. In a certain example, the mode code amount is selected from a set of cost values set by the cost control unit 241. In another example, one of the prediction residual code amount and the mode code amount is scaled using the parameter set by the cost control unit 241.

The inter-prediction unit 235 evaluates cost of the focused block in the plurality of candidate modes and selects an optimal inter-prediction mode on the basis of the cost evaluation in the candidate modes (Step S230). The cost evaluation described here may also be performed using the cost evaluation formula that includes the prediction residual code amount and the mode code amount. In a certain example, the mode code amount is selected from a set of cost values set by the cost control unit 241. In another example, one of the prediction residual code amount and the mode code amount is scaled using the parameter set by the cost control unit 241.

Next, the mode selection unit 228 selects a prediction method that realizes satisfactory coding efficiency from the intra-prediction and the inter-prediction for the focused block (Step S240). The selection of the prediction method performed here is also performed on the basis of the cost evaluation. However, the mode selection unit 228 may reuse the cost evaluation derived by the intra-prediction unit 230 and the inter-prediction unit 235. Instead, the mode selection unit 228 may recalculate the cost value for comparison between the intra-prediction and the inter-prediction. Also, a set of cost values that is different from that used in Steps S220 and S230 may be employed for recalculating the cost value using the mode selection unit 228.

Steps S220 to S240 are repeated until the processing ends for all the blocks in the picture (Step S280). Then, if the processing ends for the entire picture, the coding control processing illustrated in FIG. 20 ends (Step S290).

[3-6. Overview of Second Embodiment]

Here, the second embodiment of the technology according to the present disclosure has been described above with reference to FIGS. 16A to 20. In the aforementioned embodiment, the prediction residual code amount or the mode code amount for the mode selection for coding the image is controlled on the basis of the transfer function when the image acquired on the basis of the transfer function related to the conversion between light and an image signal is coded. With such a configuration, it is possible to perform cost evaluation for the mode selection with different evaluation formulae depending on what kind of transfer function is to be applied to the image rather than a uniform evaluation formula. In this manner, it is possible to prevent occurrence of unnatural bias of the prediction mode, to improve prediction accuracy, and to reduce distortion of the image.

Also, according to an example, the mode code amount may be controlled such that the mode code amount becomes smaller in a case in which the first transfer function corresponding to the first dynamic range is applied to the image than in a case in which the second transfer function corresponding to the second dynamic range that is narrower than the first dynamic range is applied to the image. With such a configuration, it is possible to simply reuse the cost evaluation formula that is tuned on the assumption of a specific dynamic range for an extended dynamic range. In particular, the number of candidate modes is specific to the video image coding scheme and does not change. Therefore, it is possible to employ a method with less processing cost in which a plurality of sets of mode code amounts are defined in advance for the respective candidate modes and a set to be used is switched on the basis of the transfer function.

In another example, the mode code amount may be controlled by scaling the prediction residual code amount or the mode code amount in the case in which the first transfer function corresponding to the first dynamic range is applied to the image. With such a configuration, it is possible to prevent deterioration of image quality in the case in which the first transfer function (for example, the transfer function for the HDR) is applied and to execute processing optimized for the second transfer function (cost evaluation using an existing evaluation formula optimized for the transfer function for the SDR, for example) without any modification in the case in which the second transfer function that is different from the first transfer function is applied.

In one example, the aforementioned first dynamic range may be a dynamic range for enabling display with a luminance of 100 nits or greater, and the aforementioned second dynamic range may be a dynamic range with an upper limit of luminance of 100 nits. In this manner, it is possible to take advantage of an existing encoder designed for an SDR video image for coding an HDR video image to which a transfer function such as HLG, ST2084, or S-Log 3, for example, is applied while preventing deterioration of image quality.

<4. Hardware Configuration Example>

The embodiments described in the above sections may be realized using software, hardware, and a combination of software and hardware. In a case in which the image processing device 100a, 100b, 100c, 200a, or 200b uses software, a program that is included in the software is stored in a storage medium (non-transitory medium) that is provided inside or outside the device, for example, in advance. Then, each program is read by a random access memory (RAM) when executed and is then executed by a processor such as a central processing unit (CPU), for example.

Figure 21:
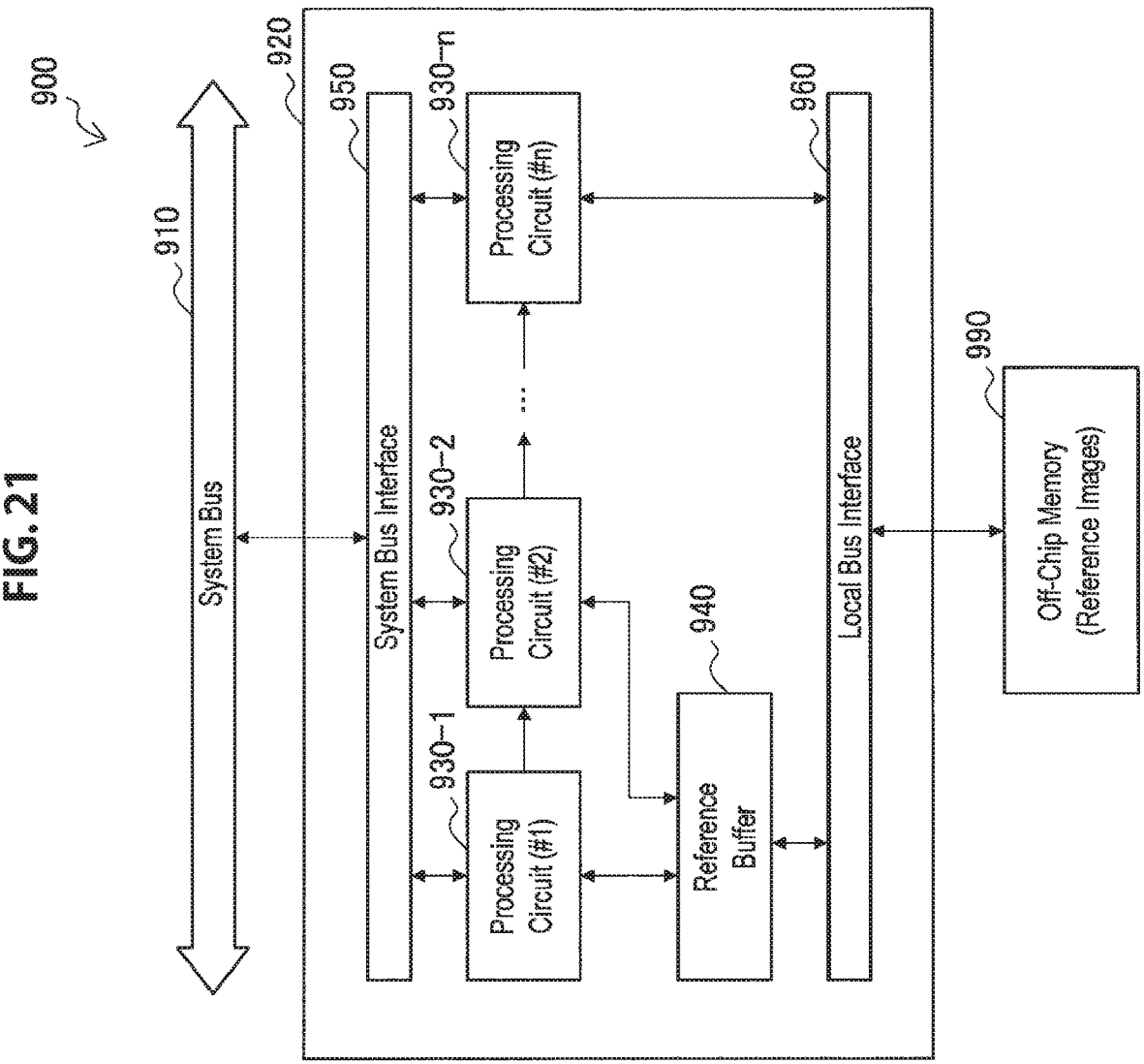
FIG. 21 is a block diagram illustrating an example of a hardware configuration of the device.

FIG. 21 is a block diagram illustrating an example of a hardware configuration of a device to which one or more of the aforementioned embodiments can be applied. Referring to FIG. 21, an image processing device 900 includes a system bus 910, an image processing chip 920, and an off-chip memory 990. The image processing chip 920 includes n (n is one or more) processing circuits 930-1, 930-2, ..., 930-*n*, a reference buffer 940, a system bus interface 950, and a local bus interface 960.

The system bus 910 provides a communication path between the image processing chip 920 and an external module (for example, a central control function, an application function, a communication interface, a user interface, or the like). The processing circuits 930-1, 930-2, ..., 930-*n* are connected to the system bus 910 via the system bus interface 950 and is connected to the off-chip memory 990 via the local bus interface 960. The processing circuits 930-1, 930-2, ..., 930-*n* can also access the reference buffer 940 that may correspond to an on-chip memory (for example, an SRAM). The off-chip memory 990 may be a frame memory that stores image data that is processed by the image processing chip 920, for example. In one example, the processing circuit 930-1 may be used to convert an image signal, and the processing circuit 930-2 may be used to code the image signal. Note that these processing circuits may be formed on discrete chips rather than on the same image processing chip 920.

<5. Application Example>

The technology according to the present disclosure can be applied to various products. For example, the technology according to the present disclosure may be applied to an operating room system.

Figure 22:
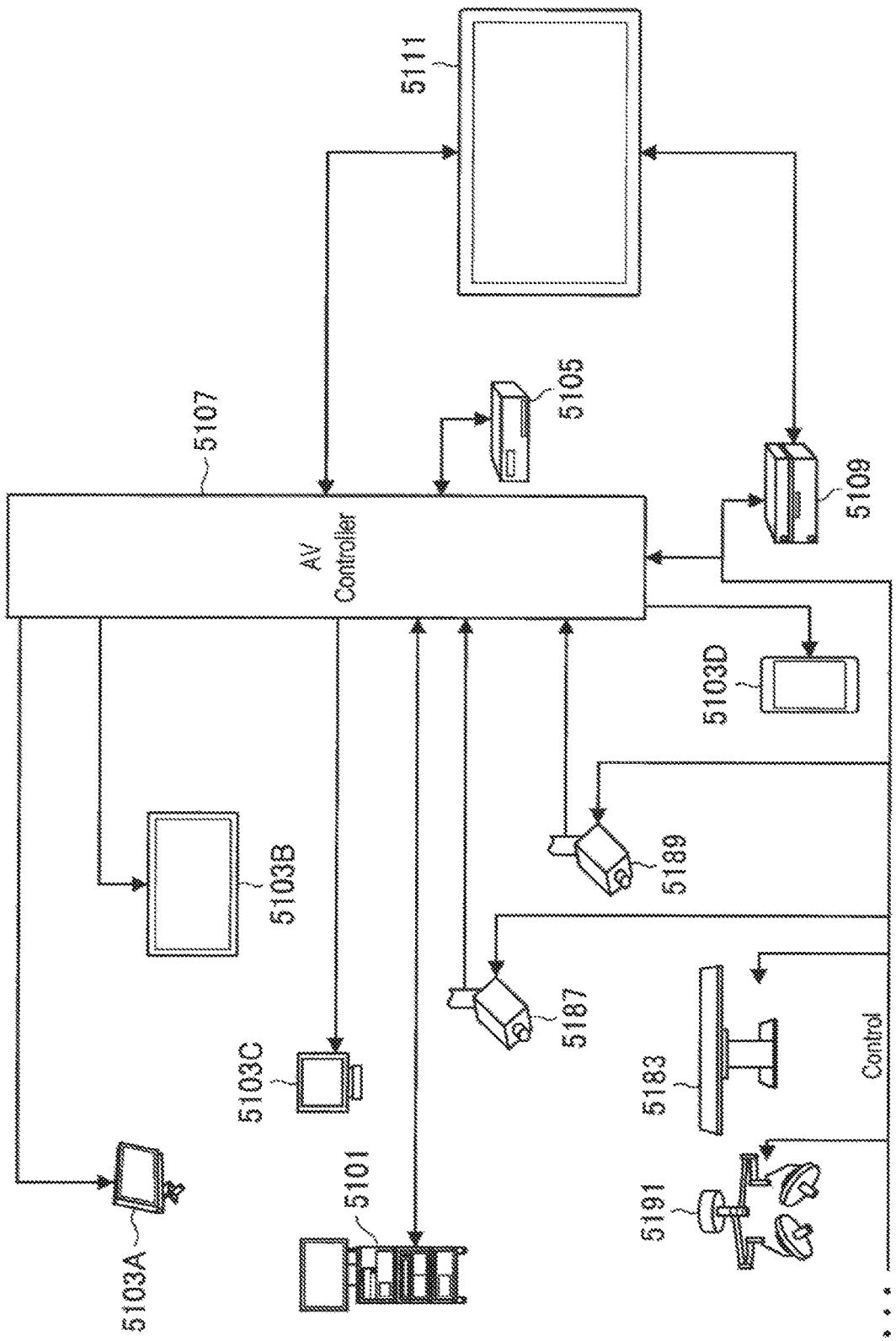
FIG. 22 is a view schematically depicting a general configuration of an operating room system.

FIG. 22 is a view schematically depicting a general configuration of an operating room system 5100 to which the technology according to an embodiment of the present disclosure can be applied. Referring to FIG. 22, the operating room system 5100 is configured such that a group of apparatus installed in an operating room are connected for cooperation with each other through an audiovisual (AV) controller 5107 and an operating room controlling apparatus 5109.

In the operating room, various apparatus may be installed. In FIG. 22, as an example, various apparatus group 5101 for endoscopic surgery, a ceiling camera 5187, a surgery field camera 5189, a plurality of display apparatus 5103A to 5103D, a recorder 5105, a patient bed 5183 and an illumination 5191 are depicted. The ceiling camera 5187 is provided on the ceiling of an operating room and images the hands of a surgeon. The surgery field camera 5189 is provided on the ceiling of the operating room and images a state of the entire operating room.

Among the apparatus mentioned, the apparatus group 5101 belongs to an endoscopic surgery system 5113 hereinafter described and include an endoscope, a display apparatus which displays an image picked up by the endoscope and so forth. Various apparatus belonging to the endoscopic surgery system 5113 are referred to also as medical equipment. Meanwhile, the display apparatus 5103A to 5103D, the recorder 5105, the patient bed 5183 and the illumination 5191 are apparatus which are equipped, for example, in the operating room separately from the endoscopic surgery system 5113. The apparatus which do not belong to the endoscopic surgery system 5113 are referred to also as non-medical equipment. The audiovisual controller 5107 and/or the operating room controlling apparatus 5109 cooperatively control operation of the medical equipment and the non-medical equipment with each other.

The audiovisual controller 5107 integrally controls processes of the medical equipment and the non-medical equipment relating to image display. Specifically, each of the apparatus group 5101, the ceiling camera 5187 and the surgery field camera 5189 from among the apparatus provided in the operating room system 5100 may be an apparatus having a function of sending information to be displayed during surgery (such information is hereinafter referred to as display information, and the apparatus mentioned is hereinafter referred to as apparatus of a sending source). Meanwhile, each of the display apparatus 5103A to 5103D may be an apparatus to which display information is outputted (the apparatus is hereinafter referred to also as apparatus of an output destination). Further, the recorder 5105 may be an apparatus which serves as both of an apparatus of a sending source and an apparatus of an output destination. The audiovisual controller 5107 has a function of controlling operation of an apparatus of a sending source and an apparatus of an output destination to acquire display information from the apparatus of a sending source and transmit the display information to the apparatus of an output destination so as to be displayed or recorded. It is to be noted that the display information includes various images picked up during surgery, various kinds of information relating to the surgery (for example, physical information of a patient, inspection results in the past or information regarding a surgical procedure) and so forth.

Specifically, to the audiovisual controller 5107, information relating to an image of a surgical region in a body cavity of a patient imaged by the endoscope may be transmitted as the display information from the apparatus group 5101. Further, from the ceiling camera 5187, information relating to an image of the hands of the surgeon picked up by the ceiling camera 5187 may be transmitted as display information. Further, from the surgery field camera 5189, information relating to an image picked up by the surgery field camera 5189 and illustrating a state of the entire operating room may be transmitted as display information. It is to be noted that, if a different apparatus having an image pickup function exists in the operating room system 5100, then the audiovisual controller 5107 may acquire information relating to an image picked up by the different apparatus as display information also from the different apparatus.

Alternatively, for example, in the recorder 5105, information relating to such images as mentioned above picked up in the past is recorded by the audiovisual controller 5107. The audiovisual controller 5107 can acquire, as display information, information relating to the images picked up in the past from the recorder 5105. It is to be noted that also various pieces of information relating to surgery may be recorded in advance in the recorder 5105.

The audiovisual controller 5107 controls at least one of the display apparatus 5103A to 5103D, which are apparatus of an output destination, to display acquired display information (namely, images picked up during surgery or various pieces of information relating to the surgery). In the example depicted, the display apparatus 5103A is a display apparatus installed so as to be suspended from the ceiling of the operating room; the display apparatus 5103B is a display apparatus installed on a wall face of the operating room; the display apparatus 5103C is a display apparatus installed on a desk in the operating room; and the display apparatus 5103D is a mobile apparatus (for example, a tablet personal computer (PC)) having a display function.

Further, though not depicted in FIG. 22, the operating room system 5100 may include an apparatus outside the operating room. The apparatus outside the operating room may be, for example, a server connected to a network constructed inside and outside the hospital, a PC used by medical staff, a projector installed in a meeting room of the hospital or the like. Where such an external apparatus is located outside the hospital, also it is possible for the audiovisual controller 5107 to cause display information to be displayed on a display apparatus of a different hospital through a teleconferencing system or the like to perform telemedicine.

The operating room controlling apparatus 5109 integrally controls processes other than processes relating to image display on the non-medical equipment. For example, the operating room controlling apparatus 5109 controls driving of the patient bed 5183, the ceiling camera 5187, the surgery field camera 5189 and the illumination 5191.

In the operating room system 5100, a centralized operation panel 5111 is provided such that it is possible to issue an instruction regarding image display to the audiovisual controller 5107 or issue an instruction regarding operation of the non-medical equipment to the operating room controlling apparatus 5109 through the centralized operation panel 5111. The centralized operation panel 5111 is configured by providing a touch panel on a display face of a display apparatus.

Figure 23:
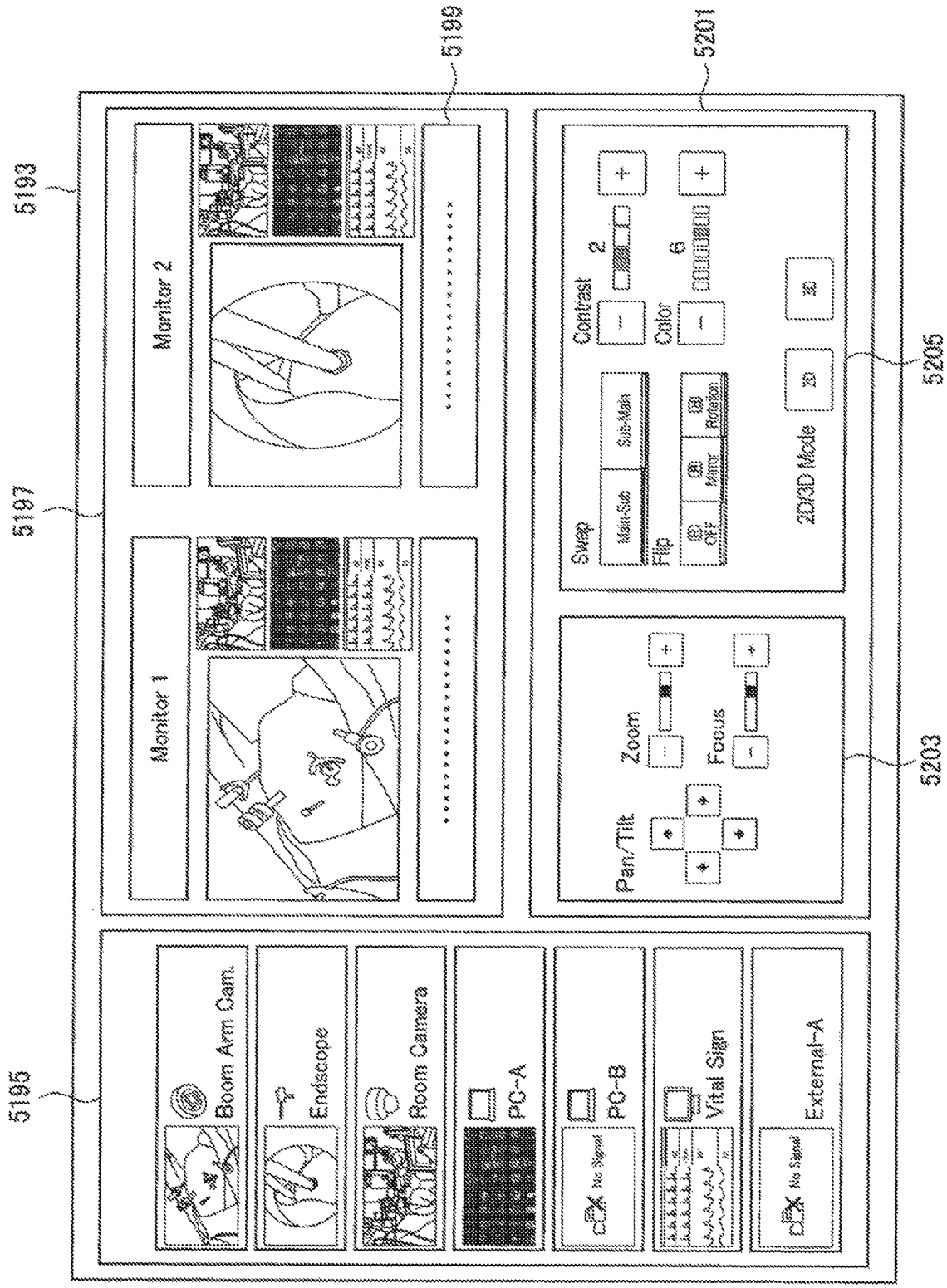
FIG. 23 is a view depicting an example of display of an operation screen image of a centralized operation panel.

FIG. 23 is a view depicting an example of display of an operation screen image on the centralized operation panel 5111. In FIG. 23, as an example, an operation screen image is depicted which corresponds to a case in which two display apparatus are provided as apparatus of an output destination in the operating room system 5100. Referring to FIG. 23, the operation screen image 5193 includes a sending source selection region 5195, a preview region 5197 and a control region 5201.

In the sending source selection region 5195, the sending source apparatus provided in the operating room system 5100 and thumbnail screen images representative of display information the sending source apparatus have are displayed in an associated manner with each other. A user can select display information to be displayed on the display apparatus from any of the sending source apparatus displayed in the sending source selection region 5195.

In the preview region 5197, a preview of screen images displayed on two display apparatus (Monitor 1 and Monitor 2) which are apparatus of an output destination is displayed. In the example depicted, four images are displayed by picture in picture (PinP) display in regard to one display apparatus. The four images correspond to display information sent from the sending source apparatus selected in the sending source selection region 5195. One of the four images is displayed in a comparatively large size as a main image while the remaining three images are displayed in a comparatively small size as sub images. The user can exchange between the main image and the sub images by suitably selecting one of the images from among the four images displayed in the region. Further, a status displaying region 5199 is provided below the region in which the four images are displayed, and a status relating to surgery (for example, elapsed time of the surgery, physical information of the patient and so forth) may be displayed suitably in the status displaying region 5199.

A sending source operation region 5203 and an output destination operation region 5205 are provided in the control region 5201. In the sending source operation region 5203, a graphical user interface (GUI) part for performing an operation for an apparatus of a sending source is displayed. In the output destination operation region 5205, a GUI part for performing an operation for an apparatus of an output destination is displayed. In the example depicted, GUI parts for performing various operations for a camera (panning, tilting and zooming) in an apparatus of a sending source having an image pickup function are provided in the sending source operation region 5203. The user can control operation of the camera of an apparatus of a sending source by suitably selecting any of the GUI parts. It is to be noted that, though not depicted, where the apparatus of a sending source selected in the sending source selection region 5195 is a recorder (namely, where an image recorded in the recorder in the past is displayed in the preview region 5197), GUI parts for performing such operations as reproduction of the image, stopping of reproduction, rewinding, fast-feeding and so forth may be provided in the sending source operation region 5203.

Further, in the output destination operation region 5205, GUI parts for performing various operations for display on a display apparatus which is an apparatus of an output destination (swap, flip, color adjustment, contrast adjustment and switching between two dimensional (2D) display and three dimensional (3D) display) are provided. The user can operate the display of the display apparatus by suitably selecting any of the GUI parts.

It is to be noted that the operation screen image to be displayed on the centralized operation panel 5111 is not limited to the depicted example, and the user may be able to perform operation inputting to each apparatus which can be controlled by the audiovisual controller 5107 and the operating room controlling apparatus 5109 provided in the operating room system 5100 through the centralized operation panel 5111.

Figure 24:
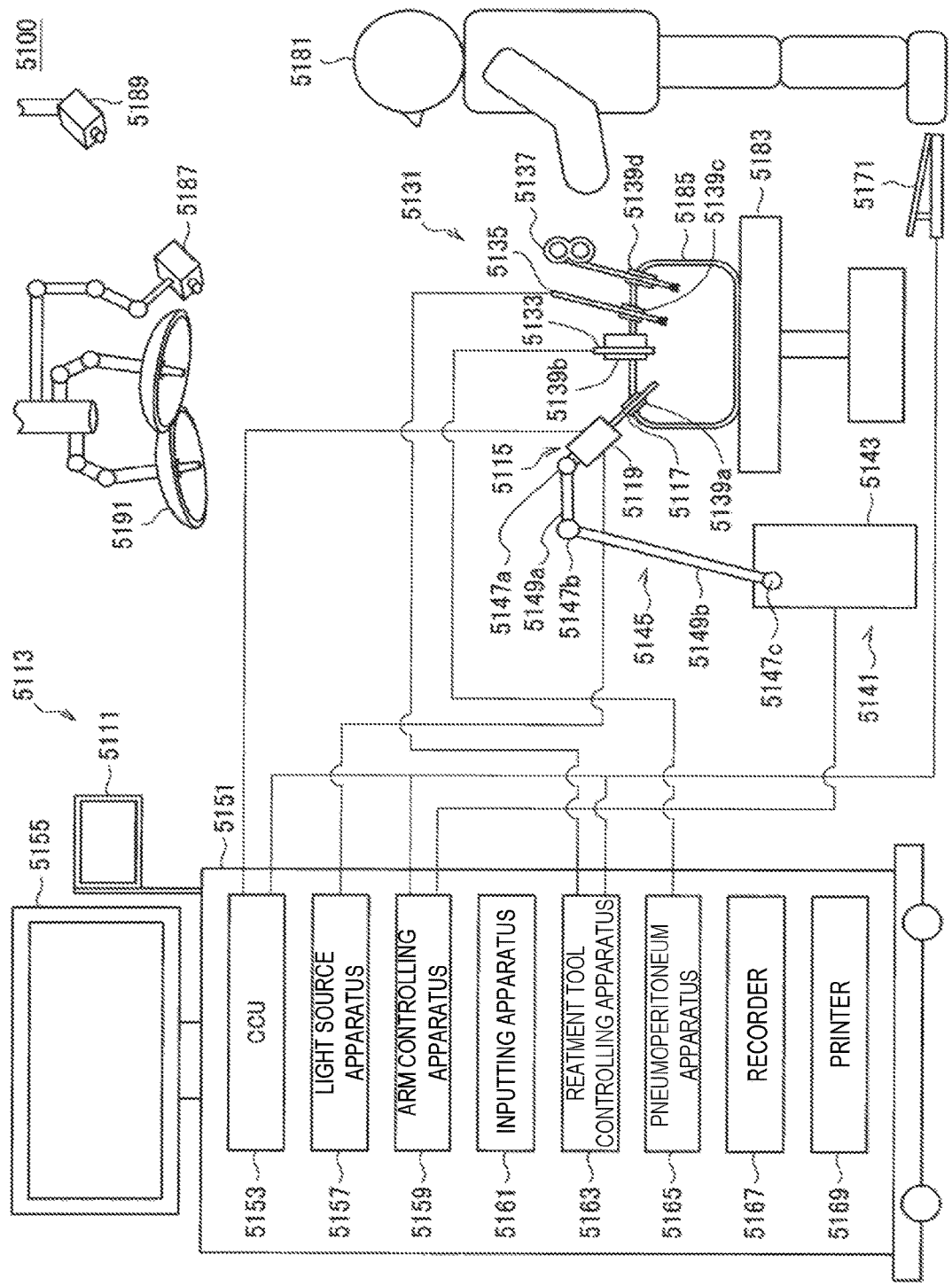
FIG. 24 is a view illustrating an example of a state of surgery to which the operating room system is applied.

FIG. 24 is a view illustrating an example of a state of surgery to which the operating room system described above is applied. The ceiling camera 5187 and the surgery field camera 5189 are provided on the ceiling of the operating room such that it can image the hands of a surgeon (medical doctor) 5181 who performs treatment for an affected area of a patient 5185 on the patient bed 5183 and the entire operating room. The ceiling camera 5187 and the surgery field camera 5189 may include a magnification adjustment function, a focal distance adjustment function, an imaging direction adjustment function and so forth. The illumination 5191 is provided on the ceiling of the operating room and irradiates at least upon the hands of the surgeon 5181. The illumination 5191 may be configured such that the irradiation light amount, the wavelength (color) of the irradiation light, the irradiation direction of the light and so forth can be adjusted suitably.

The endoscopic surgery system 5113, the patient bed 5183, the ceiling camera 5187, the surgery field camera 5189 and the illumination 5191 are connected for cooperation with each other through the audiovisual controller 5107 and the operating room controlling apparatus 5109 (not depicted in FIG. 24) as depicted in FIG. 22. The centralized operation panel 5111 is provided in the operating room, and the user can suitably operate the apparatus existing in the operating room through the centralized operation panel 5111 as described hereinabove.

In the following, a configuration of the endoscopic surgery system 5113 is described in detail. As depicted, the endoscopic surgery system 5113 includes an endoscope 5115, other surgical tools 5131, a supporting arm apparatus 5141 which supports the endoscope 5115 thereon, and a cart 5151 on which various apparatus for endoscopic surgery are mounted.

In endoscopic surgery, in place of incision of the abdominal wall to perform laparotomy, a plurality of tubular aperture devices called trocars 5139a to 5139d are used to puncture the abdominal wall. Then, a lens barrel 5117 of the endoscope 5115 and the other surgical tools 5131 are inserted into body cavity of the patient 5185 through the trocars 5139a to 5139d. In the example depicted, as the other surgical tools 5131, a pneumoperitoneum tube 5133, an energy device 5135 and forceps 5137 are inserted into body cavity of the patient 5185. Further, the energy device 5135 is a treatment tool for performing incision and peeling of a tissue, sealing of a blood vessel or the like by high frequency current or ultrasonic vibration. However, the surgical tools 5131 depicted are mere examples at all, and as the surgical tools 5131, various surgical tools which are generally used in endoscopic surgery such as, for example, tweezers or a retractor may be used.

An image of a surgical region in a body cavity of the patient 5185 picked up by the endoscope 5115 is displayed on a display apparatus 5155. The surgeon 5181 would use the energy device 5135 or the forceps 5137 while watching the image of the surgical region displayed on the display apparatus 5155 on the real time basis to perform such treatment as, for example, resection of an affected area. It is to be noted that, though not depicted, the pneumoperitoneum tube 5133, the energy device 5135, and the forceps 5137 are supported by the surgeon 5181, an assistant or the like during surgery.

(Supporting Arm Apparatus)

The supporting arm apparatus 5141 includes an arm unit 5145 extending from a base unit 5143. In the example depicted, the arm unit 5145 includes joint portions 5147*a*, 5147*b* and 5147*c* and links 5149*a* and 5149*b* and is driven under the control of an arm controlling apparatus 5159. The endoscope 5115 is supported by the arm unit 5145 such that the position and the posture of the endoscope 5115 are controlled. Consequently, stable fixation in position of the endoscope 5115 can be implemented.

(Endoscope)

The endoscope 5115 includes the lens barrel 5117 which has a region of a predetermined length from a distal end thereof to be inserted into a body cavity of the patient 5185, and a camera head 5119 connected to a proximal end of the lens barrel 5117. In the example depicted, the endoscope 5115 is depicted as a rigid endoscope having the lens barrel 5117 of the hard type. However, the endoscope 5115 may otherwise be configured as a flexible endoscope having the lens barrel 5117 of the flexible type.

The lens barrel 5117 has, at a distal end thereof, an opening in which an objective lens is fitted. A light source apparatus 5157 is connected to the endoscope 5115 such that light generated by the light source apparatus 5157 is introduced to a distal end of the lens barrel 5117 by a light guide extending in the inside of the lens barrel 5117 and is applied toward an observation target in a body cavity of the patient 5185 through the objective lens. It is to be noted that the endoscope 5115 may be a forward-viewing endoscope or may be an oblique-viewing endoscope or a side-viewing endoscope.

An optical system and an image pickup element are provided in the inside of the camera head 5119 such that reflected light (observation light) from an observation target is condensed on the image pickup element by the optical system. The observation light is photo-electrically converted by the image pickup element to generate an electric signal corresponding to the observation light, namely, an image signal corresponding to an observation image. The image signal is transmitted as RAW data to a CCU 5153. It is to be noted that the camera head 5119 has a function incorporated therein for suitably driving the optical system of the camera head 5119 to adjust the magnification and the focal distance.

It is to be noted that, in order to establish compatibility with, for example, a stereoscopic vision (3D display), a plurality of image pickup elements may be provided on the camera head 5119. In this case, a plurality of relay optical systems are provided in the inside of the lens barrel 5117 in order to guide observation light to the plurality of respective image pickup elements.

(Various Apparatus Incorporated in Cart)

The CCU 5153 includes a central processing unit (CPU), a graphics processing unit (GPU) or the like and integrally controls operation of the endoscope 5115 and the display apparatus 5155. Specifically, the CCU 5153 performs, for an image signal received from the camera head 5119, various image processes for displaying an image based on the image signal such as, for example, a development process (demosaic process). The CCU 5153 provides the image signal for which the image processes have been performed to the display apparatus 5155. Further, the audiovisual controller 5107 depicted in FIG. 22 is connected to the CCU 5153. The CCU 5153 provides the image signal for which the image processes have been performed also to the audiovisual controller 5107. Further, the CCU 5153 transmits a control signal to the camera head 5119 to control driving of the camera head 5119. The control signal may include information relating to an image pickup condition such as a magnification or a focal distance. The information relating to an image pickup condition may be inputted through the inputting apparatus 5161 or may be inputted through the centralized operation panel 5111 described hereinabove.

The display apparatus 5155 displays an image based on an image signal for which the image processes have been performed by the CCU 5153 under the control of the CCU 5153. If the endoscope 5115 is ready for imaging of a high resolution such as 4K (horizontal pixel number 3840× vertical pixel number 2160), 8K (horizontal pixel number 7680×vertical pixel number 4320) or the like and/or ready for 3D display, then a display apparatus by which corresponding display of the high resolution and/or 3D display are possible may be used as the display apparatus 5155. Where the apparatus is ready for imaging of a high resolution such as 4K or 8K, if the display apparatus used as the display apparatus 5155 has a size of equal to or not less than 55 inches, then a more immersive experience can be obtained. Further, a plurality of display apparatus 5155 having different resolutions and/or different sizes may be provided in accordance with purposes.

The light source apparatus 5157 includes a light source such as, for example, a light emitting diode (LED) and supplies irradiation light for imaging of a surgical region to the endoscope 5115.

The arm controlling apparatus 5159 includes a processor such as, for example, a CPU and operates in accordance with a predetermined program to control driving of the arm unit 5145 of the supporting arm apparatus 5141 in accordance with a predetermined controlling method.

An inputting apparatus 5161 is an input interface for the endoscopic surgery system 5113. A user can perform inputting of various kinds of information or instruction inputting to the endoscopic surgery system 5113 through the inputting apparatus 5161. For example, the user would input various kinds of information relating to surgery such as physical information of a patient, information regarding a surgical procedure of the surgery and so forth through the inputting apparatus 5161. Further, the user would input, for example, an instruction to drive the arm unit 5145, an instruction to change an image pickup condition (type of irradiation light, magnification, focal distance or the like) by the endoscope 5115, an instruction to drive the energy device 5135 or a like through the inputting apparatus 5161.

The type of the inputting apparatus 5161 is not limited and may be that of any one of various known inputting apparatus. As the inputting apparatus 5161, for example, a mouse, a keyboard, a touch panel, a switch, a foot switch 5171 and/or a lever or the like may be applied. Where a touch panel is used as the inputting apparatus 5161, it may be provided on the display face of the display apparatus 5155.

The inputting apparatus 5161 is otherwise a device to be mounted on a user such as, for example, a glasses type wearable device or a head mounted display (HMD), and various kinds of inputting are performed in response to a gesture or a line of sight of the user detected by any of the devices mentioned. Further, the inputting apparatus 5161 includes a camera which can detect a motion of a user, and various kinds of inputting are performed in response to a gesture or a line of sight of a user detected from a video picked up by the camera. Further, the inputting apparatus 5161 includes a microphone which can collect the voice of a user, and various kinds of inputting are performed by voice through the microphone. By configuring the inputting apparatus 5161 such that various kinds of information can be inputted in a contactless fashion in this manner, especially a user who belongs to a clean area (for example, the surgeon 5181) can operate an apparatus belonging to an unclean area in a contactless fashion. Further, since the user can operate an apparatus without releasing a possessed surgical tool from its hand, the convenience to the user is improved.

A treatment tool controlling apparatus 5163 controls driving of the energy device 5135 for cautery or incision of a tissue, sealing of a blood vessel or the like. A pneumoperitoneum apparatus 5165 feeds gas into a body cavity of the patient 5185 through the pneumoperitoneum tube 5133 to inflate the body cavity in order to secure the field of view of the endoscope 5115 and secure the working space for the surgeon. A recorder 5167 is an apparatus capable of recording various kinds of information relating to surgery. A printer 5169 is an apparatus capable of printing various kinds of information relating to surgery in various forms such as a text, an image or a graph.

In the following, especially a characteristic configuration of the endoscopic surgery system 5113 is described in more detail.

(Supporting Arm Apparatus)

The supporting arm apparatus 5141 includes the base unit 5143 serving as a base, and the arm unit 5145 extending from the base unit 5143. In the example depicted, the arm unit 5145 includes the plurality of joint portions 5147a, 5147b and 5147c and the plurality of links 5149a and 5149b connected to each other by the joint portion 5147b. In FIG. 24, for simplified illustration, the configuration of the arm unit 5145 is depicted in a simplified form. Actually, the shape, number and arrangement of the joint portions 5147a to 5147c and the links 5149a and 5149b and the direction and so forth of axes of rotation of the joint portions 5147a to 5147c can be set suitably such that the arm unit 5145 has a desired degree of freedom. For example, the arm unit 5145 may preferably be included such that it has a degree of freedom equal to or not less than 6 degrees of freedom. This makes it possible to move the endoscope 5115 freely within the movable range of the arm unit 5145. Consequently, it becomes possible to insert the lens barrel 5117 of the endoscope 5115 from a desired direction into a body cavity of the patient 5185.

An actuator is provided in the joint portions 5147a to 5147c, and the joint portions 5147a to 5147c include such that they are rotatable around predetermined axes of rotation thereof by driving of the actuator. The driving of the actuator is controlled by the arm controlling apparatus 5159 to control the rotational angle of each of the joint portions 5147a to 5147c thereby to control driving of the arm unit 5145. Consequently, control of the position and the posture of the endoscope 5115 can be implemented. Thereupon, the arm controlling apparatus 5159 can control driving of the arm unit 5145 by various known controlling methods such as force control or position control.

For example, if the surgeon 5181 suitably performs operation inputting through the inputting apparatus 5161 (including the foot switch 5171), then driving of the arm unit 5145 may be controlled suitably by the arm controlling apparatus 5159 in response to the operation input to control the position and the posture of the endoscope 5115. After the endoscope 5115 at the distal end of the arm unit 5145 is moved from an arbitrary position to a different arbitrary position by the control just described, the endoscope 5115 can be supported fixedly at the position after the movement. It is to be noted that the arm unit 5145 may be operated in a master-slave fashion. In this case, the arm unit 5145 may be remotely controlled by the user through the inputting apparatus 5161 which is placed at a place remote from the operating room.

Further, where force control is applied, the arm controlling apparatus 5159 may perform power-assisted control to drive the actuators of the joint portions 5147a to 5147c such that the arm unit 5145 may receive external force by the user and move smoothly following the external force. This makes it possible to move the arm unit 5145 with comparatively weak force when the user directly touches with and moves the arm unit 5145. Accordingly, it becomes possible for the user to move the endoscope 5115 more intuitively by a simpler and easier operation, and the convenience to the user can be improved.

Here, generally in endoscopic surgery, the endoscope 5115 is supported by a medical doctor called scopist. In contrast, where the supporting arm apparatus 5141 is used, the position of the endoscope 5115 can be fixed with a higher degree of certainty without hands, and therefore, an image of a surgical region can be obtained stably and surgery can be performed smoothly.

It is to be noted that the arm controlling apparatus 5159 may not necessarily be provided on the cart 5151. Further, the arm controlling apparatus 5159 may not necessarily be a single apparatus. For example, the arm controlling apparatus 5159 may be provided in each of the joint portions 5147a to 5147c of the arm unit 5145 of the supporting arm apparatus 5141 such that the plurality of arm controlling apparatus 5159 cooperate with each other to implement driving control of the arm unit 5145.

(Light Source Apparatus)

The light source apparatus 5157 supplies irradiation light upon imaging of a surgical region to the endoscope 5115. The light source apparatus 5157 includes a white light source which includes, for example, an LED, a laser light source or a combination of them. In this case, where a white light source includes a combination of red, green, and blue (RGB) laser light sources, since the output intensity and the output timing can be controlled with a high degree of accuracy for each color (each wavelength), adjustment of the white balance of a picked up image can be performed by the light source apparatus 5157. Further, in this case, if laser beams from the RGB laser light sources are applied time-divisionally on an observation target and driving of the image pickup elements of the camera head 5119 is controlled in synchronism with the irradiation timings, then images individually corresponding to the R, G and B colors can be picked up time-divisionally. According to the method just described, a color image can be obtained even if a color filter is not provided for the image pickup element.

Further, driving of the light source apparatus 5157 may be controlled such that the intensity of light to be outputted is changed for each predetermined time. By controlling driving of the image pickup element of the camera head 5119 in synchronism with the timing of the change of the intensity of light to acquire images time-divisionally and synthesizing the images, an image of a high dynamic range free from underexposed blocked up shadows and overexposed highlights can be created.

Further, the light source apparatus 5157 may be configured to supply light of a predetermined wavelength band ready for special light observation. In special light observation, for example, by utilizing the wavelength dependency of absorption of light of a body tissue, narrow band light observation (narrow band imaging) of imaging a predetermined tissue such as a blood vessel of a superficial portion of the mucous membrane or the like in a high contrast is performed by applying light of a narrower wavelength band in comparison with irradiation light upon ordinary observation (namely, white light). Alternatively, in special light observation, fluorescent observation for obtaining an image from fluorescent light generated by irradiation of excitation light may also be performed. In fluorescent observation, it is possible to perform observation of fluorescent light from a body tissue by irradiating excitation light on the body tissue (autofluorescence observation) or to obtain a fluorescent light image by locally injecting a reagent such as indocyanine green (ICG) into a body tissue and irradiating excitation light corresponding to a fluorescent light wavelength of the reagent upon the body tissue. The light source apparatus 5157 can be configured to supply such narrow-band light and/or excitation light suitable for special light observation as described above.

(Camera Head and CCU)

Figure 25:
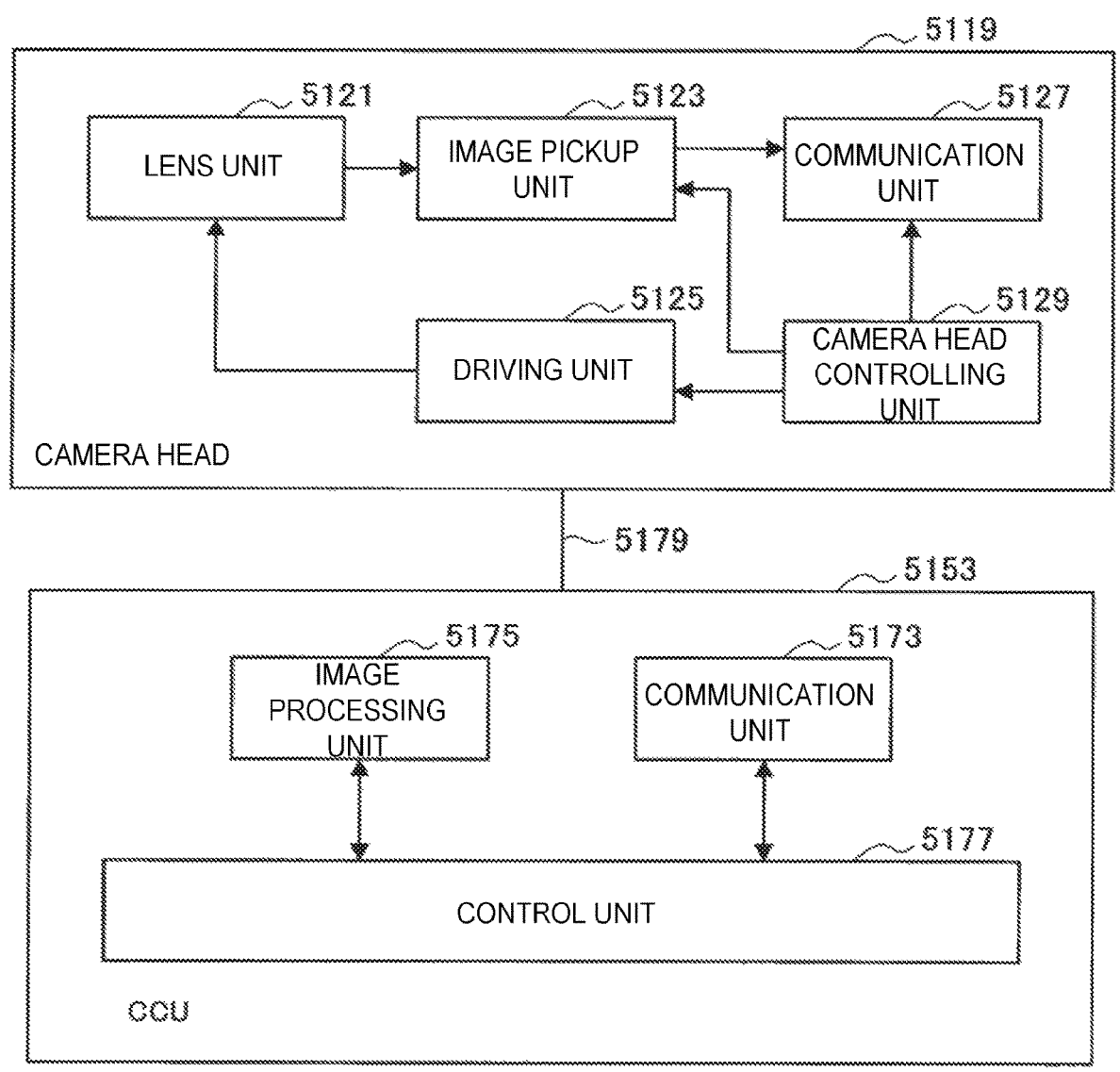
FIG. 25 is a block diagram depicting an example of a functional configuration of a camera head and a camera control unit (CCU) depicted in FIG. 24.

Functions of the camera head 5119 of the endoscope 5115 and the CCU 5153 are described in more detail with reference to FIG. 25. FIG. 25 is a block diagram depicting an example of a functional configuration of the camera head 5119 and the CCU 5153 depicted in FIG. 24.

Referring to FIG. 25, the camera head 5119 has, as functions thereof, a lens unit 5121, an image pickup unit 5123, a driving unit 5125, a communication unit 5127 and a camera head controlling unit 5129. Further, the CCU 5153 has, as functions thereof, a communication unit 5173, an image processing unit 5175 and a control unit 5177. The camera head 5119 and the CCU 5153 are connected to be bidirectionally communicable to each other by a transmission cable 5179.

First, a functional configuration of the camera head 5119 is described. The lens unit 5121 is an optical system provided at a connecting location of the camera head 5119 to the lens barrel 5117. Observation light taken in from a distal end of the lens barrel 5117 is introduced into the camera head 5119 and enters the lens unit 5121. The lens unit 5121 includes a combination of a plurality of lenses including a zoom lens and a focusing lens. The lens unit 5121 has optical properties adjusted such that the observation light is condensed on a light receiving face of the image pickup element of the image pickup unit 5123. Further, the zoom lens and the focusing lens include such that the positions thereof on their optical axis are movable for adjustment of the magnification and the focal point of a picked up image.

The image pickup unit 5123 includes an image pickup element and disposed at a succeeding stage to the lens unit 5121. Observation light having passed through the lens unit 5121 is condensed on the light receiving face of the image pickup element, and an image signal corresponding to the observation image is generated by photoelectric conversion. The image signal generated by the image pickup unit 5123 is provided to the communication unit 5127.

As the image pickup element which is included by the image pickup unit 5123, an image sensor, for example, of the complementary metal oxide semiconductor (CMOS) type is used which has a Bayer array and is capable of picking up an image in color. It is to be noted that, as the image pickup element, an image pickup element may be used which is ready, for example, for imaging of an image of a high resolution equal to or not less than 4K. If an image of a surgical region is obtained in a high resolution, then the surgeon 5181 can comprehend a state of the surgical region in enhanced details and can proceed with the surgery more smoothly.

Further, the image pickup element which is included by the image pickup unit 5123 is configured such that it has a pair of image pickup elements for acquiring image signals for the right eye and the left eye compatible with 3D display. Where 3D display is applied, the surgeon 5181 can comprehend the depth of a living body tissue in the surgical region with a higher degree of accuracy. It is to be noted that, if the image pickup unit 5123 is configured as that of the multi-plate type, then a plurality of systems of lens units 5121 are provided corresponding to the individual image pickup elements of the image pickup unit 5123.

The image pickup unit 5123 may not necessarily be provided on the camera head 5119. For example, the image pickup unit 5123 may be provided just behind the objective lens in the inside of the lens barrel 5117.

The driving unit 5125 includes an actuator and moves the zoom lens and the focusing lens of the lens unit 5121 by a predetermined distance along the optical axis under the control of the camera head controlling unit 5129. Consequently, the magnification and the focal point of a picked up image by the image pickup unit 5123 can be adjusted suitably.

The communication unit 5127 includes a communication apparatus for transmitting and receiving various kinds of information to and from the CCU 5153. The communication unit 5127 transmits an image signal acquired from the image pickup unit 5123 as RAW data to the CCU 5153 through the transmission cable 5179. Thereupon, in order to display a picked up image of a surgical region in low latency, preferably the image signal is transmitted by optical communication. This is because, since, upon surgery, the surgeon 5181 performs surgery while observing the state of an affected area through a picked up image, in order to achieve surgery with a higher degree of safety and certainty, it is demanded for a moving image of the surgical region to be displayed on the real time basis as far as possible. Where optical communication is applied, a photoelectric conversion module for converting an electric signal into an optical signal is provided in the communication unit 5127. After the image signal is converted into an optical signal by the photoelectric conversion module, it is transmitted to the CCU 5153 through the transmission cable 5179.

Further, the communication unit 5127 receives a control signal for controlling driving of the camera head 5119 from the CCU 5153. The control signal includes information relating to image pickup conditions such as, for example, information that a frame rate of a picked up image is designated, information that an exposure value upon image picking up is designated and/or information that a magnification and a focal point of a picked up image are designated.

The communication unit 5127 provides the received control signal to the camera head controlling unit 5129. It is to be noted that also the control signal from the CCU 5153 may be transmitted by optical communication. In this case, a photoelectric conversion module for converting an optical signal into an electric signal is provided in the communication unit 5127. After the control signal is converted into an electric signal by the photoelectric conversion module, it is provided to the camera head controlling unit 5129.

It is to be noted that the image pickup conditions such as the frame rate, exposure value, magnification or focal point are set automatically by the control unit 5177 of the CCU 5153 on the basis of an acquired image signal. In other words, an auto exposure (AE) function, an auto focus (AF) function and an auto white balance (AWB) function are incorporated in the endoscope 5115.

The camera head controlling unit 5129 controls driving of the camera head 5119 on the basis of a control signal from the CCU 5153 received through the communication unit 5127. For example, the camera head controlling unit 5129 controls driving of the image pickup element of the image pickup unit 5123 on the basis of information that a frame rate of a picked up image is designated and/or information that an exposure value upon image picking up is designated. Further, for example, the camera head controlling unit 5129 controls the driving unit 5125 to suitably move the zoom lens and the focus lens of the lens unit 5121 on the basis of information that a magnification and a focal point of a picked up image are designated. The camera head controlling unit 5129 may include a function for storing information for identifying of the lens barrel 5117 and/or the camera head 5119.

It is to be noted that, by disposing the components such as the lens unit 5121 and the image pickup unit 5123 in a sealed structure having high airtightness and high waterproof, the camera head 5119 can be provided with resistance to an autoclave sterilization process.

Now, a functional configuration of the CCU 5153 is described. The communication unit 5173 includes a communication apparatus for transmitting and receiving various kinds of information to and from the camera head 5119. The communication unit 5173 receives an image signal transmitted thereto from the camera head 5119 through the transmission cable 5179. Thereupon, the image signal may be transmitted preferably by optical communication as described above. In this case, for the compatibility with optical communication, the communication unit 5173 includes a photoelectric conversion module for converting an optical signal into an electric signal. The communication unit 5173 provides the image signal after conversion into an electric signal to the image processing unit 5175.

Further, the communication unit 5173 transmits, to the camera head 5119, a control signal for controlling driving of the camera head 5119. Also the control signal may be transmitted by optical communication.

The image processing unit 5175 performs various image processes for an image signal in the form of RAW data transmitted thereto from the camera head 5119. The image processes include various known signal processes such as, for example, a development process, an image quality improving process (a bandwidth enhancement process, a super-resolution process, a noise reduction (NR) process and/or an image stabilization process) and/or an enlargement process (electronic zooming process). Further, the image processing unit 5175 performs a detection process for an image signal for performing AE, AF and AWB.

The image processing unit 5175 includes a processor such as a CPU or a GPU, and when the processor operates in accordance with a predetermined program, the image processes and the detection process described above can be performed. It is to be noted that, where the image processing unit 5175 includes a plurality of GPUs, the image processing unit 5175 suitably divides information relating to an image signal such that image processes are performed in parallel by the plurality of GPUs.

The control unit 5177 performs various kinds of control relating to image picking up of a surgical region by the endoscope 5115 and display of the picked up image. For example, the control unit 5177 generates a control signal for controlling driving of the camera head 5119. Thereupon, if image pickup conditions are inputted by the user, then the control unit 5177 generates a control signal on the basis of the input by the user. Alternatively, where the endoscope 5115 has an AE function, an AF function and an AWB function incorporated therein, the control unit 5177 suitably calculates an optimum exposure value, focal distance and white balance in response to a result of a detection process by the image processing unit 5175 and generates a control signal.

Further, the control unit 5177 controls the display apparatus 5155 to display an image of a surgical region on the basis of an image signal for which the image processes have been performed by the image processing unit 5175. Thereupon, the control unit 5177 recognizes various objects in the surgical region image using various image recognition technologies. For example, the control unit 5177 can recognize a surgical tool such as forceps, a particular living body region, bleeding, mist when the energy device 5135 is used and so forth by detecting the shape, color and so forth of edges of the objects included in the surgical region image. The control unit 5177 causes, when it controls the display apparatus 5155 to display a surgical region image, various kinds of surgery supporting information to be displayed in an overlapping manner with an image of the surgical region using a result of the recognition. Where surgery supporting information is displayed in an overlapping manner and presented to the surgeon 5181, the surgeon 5181 can proceed with the surgery more safety and certainty.

The transmission cable 5179 which connects the camera head 5119 and the CCU 5153 to each other is an electric signal cable ready for communication of an electric signal, an optical fiber ready for optical communication or a composite cable thereof.

Here, while, in the example depicted in the figure, communication is performed by wired communication using the transmission cable 5179, the communication between the camera head 5119 and the CCU 5153 may be performed otherwise by wireless communication. Where the communication between the camera head 5119 and the CCU 5153 is performed by wireless communication, there is no necessity to lay the transmission cable 5179 in the operating room. Therefore, such a situation that movement of medical staff in the operating room is disturbed by the transmission cable 5179 can be eliminated.

An example of the operating room system 5100 to which the technology according to an embodiment of the present disclosure can be applied has been described above. It is to be noted here that, although a case in which the medical system to which the operating room system 5100 is applied is the endoscopic surgery system 5113 has been described as an example, the configuration of the operating room system 5100 is not limited to that of the example described above. For example, the operating room system 5100 may be applied to a soft endoscopic system for inspection or a microscopic surgery system in place of the endoscopic surgery system 5113.

The technology related to the present disclosure may be suitably applied to the recorder 5105 among the aforementioned configurations. In one example, the recorder 5105 may control a code amount assigned to each partial region of an image on the basis of a transfer function related to conversion between light and an image signal in accordance with the technology according to the present disclosure when an image captured by some camera (for example, a ceiling camera 5187, an operating room camera 5189, or a camera head 5119) is coded. In this manner, it is possible to prevent shortage of the assigned code amount for expressing grayscale of an original signal due to the applied transfer function and to inhibit codec distortion. In another example, the recorder 5105 may control a prediction residual code amount or a mode code amount for selecting a mode on the basis of a transfer function related to conversion between light and an image signal in accordance with the technology according to the present disclosure when an image captured by some camera is coded. In this manner, it is possible to prevent occurrence of bias of an unnatural prediction mode and to reduce distortion of the image. As a result, it is possible to enhance accuracy of diagnosis or therapy using the image in all the examples.

<6. Summary>

The technology according to the present disclosure provides an improvement in, for example, a digital video camera, a digital camcorder, a video encoder, or any type of existing device with an encoding function that has not necessarily sufficiently adapted to signal expressions that are being diversified, in accordance with the mechanism described in detail hitherto. According to the technology of the present disclosure, codec distortion that increases with extension of a dynamic range when the HDR video image is reproduced is reduced, and an HDR video image can be reproduced with satisfactory image quality. The technology according to the present disclosure can be applied to coding of a stationary image.

Although terminology specific to a specific video image coding scheme has been used in a part of the specification for simple explanation, the technology according to the present disclosure is not limited to such terms and can widely be applied to encoders in accordance with arbitrary video image coding schemes. For example, terms of luminance (luma) and chrominance (chroma) may be replaced with other terms such as brightness and saturation, respectively, depending on a color system used.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An image processing device including:

a coding unit that codes an image acquired on the basis of a transfer function related to conversion between light and an image signal; and a control unit that controls a prediction residual code amount or a mode code amount for mode selection when the image is coded by the coding unit, on the basis of the transfer function.

(2)

The image processing device according to (1), in which the control unit controls the mode code amount such that the mode code amount becomes smaller in a case in which a first transfer function corresponding to a first dynamic range is applied to the image than in a case in which a second transfer function corresponding to a second dynamic range that is narrower than the first dynamic range is applied to the image.

(3)

The image processing device according to (1), in which the control unit controls the prediction residual code amount such that the prediction residual code amount becomes larger in a case in which a first transfer function corresponding to a first dynamic range is applied to the image than in a case in which a second transfer function corresponding to a second dynamic range that is narrower than the first dynamic range is applied to the image.

(4)

The image processing device according to (2) or (3), in which the first dynamic range is a dynamic range for enabling display with luminance of greater than 100 nits.

(5)

The image processing device according to any one of (1) to (4), in which coding processing executed by the coding unit includes intra-prediction, and the prediction residual code amount or the mode code amount controlled by the control unit is used for mode selection among a plurality of candidate modes in the intra-prediction.

(6)

The image processing device according to any one of (1) to (5), in which coding processing executed by the coding unit includes inter-prediction, and the prediction residual code amount or the mode code amount controlled by the control unit is used for mode selection among a plurality of candidate modes in the inter-prediction.

(7)

The image processing device according to any one of (1) to (6), in which coding processing executed by the coding unit includes intra-prediction and inter-prediction, and the prediction residual code amount or the mode code amount controlled by the control unit is used for selecting a prediction method that is the intra-prediction or the inter-prediction.

(8)

The image processing device according to any one of (1) to (7), in which the control unit determines a type of the transfer function on the basis of input information related to the transfer function applied to the image and controls the prediction residual code amount or the mode code amount on the basis of the determined type.

(9)

The image processing device according to any one of (1) to (8), further including:

a mode selection unit that selects a mode in which cost including the prediction residual code amount and the mode code amount is minimum among a plurality of candidate modes, in which the coding unit codes the image in accordance with the mode selected by the mode selection unit.

(10)

The image processing device according to (8), in which the input information is information acquired via a user interface.

(11)

The image processing device according to (8), in which the input information is information acquired from an auxiliary signal to be multiplexed with an input image signal that expresses the image.

(12)

The image processing device according to (8), further including:

a storage unit that stores a value of the mode code amount associated with the type of the transfer function or a parameter for controlling the prediction residual code amount or the mode code amount.

(13)

An image processing method including:

coding an image acquired on the basis of a transfer function related to conversion between light and an image signal; and controlling a prediction residual code amount or a mode code amount for mode selection when the image is coded, on the basis of the transfer function.

(14)

A program that causes a processor of an image processing device to function as:

a coding unit that codes an image acquired on the basis of a transfer function related to conversion between light and an image signal; and a control unit that controls a prediction residual code amount or a mode code amount for mode selection when the image is coded by the coding unit, on the basis of the transfer function.

REFERENCE SIGNS LIST 100a, 100b, 100c image processing device
101 signal acquisition unit
102 signal processing unit
103, 104 information acquisition unit
107 storage unit
110 coding unit
115 quantization unit
140, 140c control unit
200a, 200b image processing device
201 signal acquisition unit
202 signal processing unit
203, 204 information acquisition unit
207 storage unit
210 coding unit
228 mode selection unit
230 intra-prediction unit
235 inter-prediction unit
240 control unit

The invention claimed is:

1. An image processing device comprising:
circuitry configured to:
obtain an image that is generated on a basis of an incident light and a transfer function related to a conversion between the incident light and the image;
determine a cost function for prediction mode selection according to a dynamic range of the transfer function, the cost function calculating a cost value of a corresponding candidate prediction mode of candidate prediction modes based on a prediction residual code amount representing distortion of a prediction image in the corresponding candidate prediction mode and a prediction mode code amount representing an overhead code amount in the corresponding candidate prediction mode, and the cost function being determined by increasing a contribution of the prediction residual code amount or decreasing a contribution of the prediction mode code amount in the cost function as the dynamic range of the transfer function increases;
determine a prediction mode from the candidate prediction modes for coding a coding unit of the image according to cost values of the candidate prediction modes calculated according to the determined cost function; and
encode the coding unit of the image according to the determined prediction mode.

2. The image processing device according to claim 1, wherein the circuitry is configured to:
set the prediction mode code amount of the corresponding candidate prediction mode to a first value in a case in which the transfer function corresponds to a first dynamic range; and
set the prediction mode code amount of the corresponding candidate prediction mode to a second value in a case in which the transfer function corresponds to a second dynamic range,
wherein the second dynamic range is narrower than the first dynamic range, and the first value is smaller than the second value.

3. The image processing device according to claim 1, wherein the circuitry is configured to:
set the prediction residual code amount of the corresponding candidate prediction mode to a first value in a case in which the transfer function corresponds to a first dynamic range,
set the prediction residual code amount of the corresponding candidate prediction mode to a second value in a case in which the transfer function corresponds to a second dynamic range,
the second dynamic range is narrower than the first dynamic range, and the first value is greater than the second value.

4. The image processing device according to claim 2, wherein the first dynamic range is a dynamic range for enabling display with luminance of greater than 100 nits.

5. The image processing device according to claim 1, wherein the candidate prediction modes include a plurality of candidate modes in intra-prediction.

6. The image processing device according to claim 1, wherein the candidate prediction modes include a plurality of candidate modes in inter-prediction.

7. The image processing device according to claim 1, wherein the candidate prediction modes are selected from a group including intra-prediction and inter-prediction.

8. The image processing device according to claim 1, wherein the circuitry is configured to determine a type of the transfer function on a basis of input information related to the transfer function applied to the image.

9. The image processing device according to claim 1, wherein the circuitry is configured to select the prediction mode that corresponds to a minimum cost value among the cost values of the candidate prediction modes calculated according to the cost function.

10. The image processing device according to claim 8, wherein the input information is information acquired via a user interface.

11. The image processing device according to claim 8, wherein the input information is information acquired from an auxiliary signal to be multiplexed with an input signal that expresses the image.

12. The image processing device according to claim 8, further comprising:
a storage configured to store sets of prediction mode code amount values associated with respective candidate types of the transfer function,
wherein the circuitry is configured to determine the cost function according to one of the sets of prediction mode code amount values associated with the type of the transfer function.

13. An image processing method comprising:
obtaining an image that is generated on a basis of an incident light and a transfer function related to a conversion between the incident light and the mage;
determining, by a processor of an image processing device, a cost function for prediction mode selection according to a dynamic range of the transfer function, the cost function calculating a cost value of a corresponding candidate prediction mode of candidate prediction modes based on a prediction residual code amount representing distortion of a prediction image in the corresponding candidate prediction mode and a prediction mode code amount representing an overhead code amount in the corresponding candidate prediction mode, and the cost function being determined by increasing a contribution of the prediction residual code amount or decreasing a contribution of the prediction mode code amount in the cost function as the dynamic range of the transfer function increases;
determining, by the processor of the image processing device, a prediction mode from the candidate prediction modes for coding a coding unit of the image according to cost values of the candidate prediction modes calculated according to the determined cost function; and
encoding the coding unit of the image according to the determined prediction mode.

14. The image processing method according to claim 13, wherein the determining the cost function comprises:
setting the prediction mode code amount of the corresponding candidate prediction mode to a first value in a case in which the transfer function corresponds to a first dynamic range; and
setting the prediction mode code amount of the corresponding candidate prediction mode to a second value in a case in which the transfer function corresponds to a second dynamic range,
wherein the second dynamic range is narrower than the first dynamic range, and the first value is smaller than the second value.

15. The image processing method according to claim 13, wherein the determining the cost function comprises:
setting the prediction residual code amount of the corresponding candidate prediction mode to a first value in a case in which the transfer function corresponds to a first dynamic range,
setting the prediction residual code amount of the corresponding candidate prediction mode to a second value in a case in which the transfer function corresponds to a second dynamic range,
the second dynamic range is narrower than the first dynamic range, and the first value is greater than the second value.

16. A non-transitory computer-readable medium storing a program which when executed by a processor of an image processing device causes the processor to perform a process comprising:
obtaining an image that is generated on a basis of an incident light and a transfer function related to a conversion between the incident light and the image;
determining a cost function for prediction mode selection according to a dynamic range of the transfer function, the cost function calculating a cost value of a corresponding candidate prediction mode of candidate prediction modes based on a prediction residual code amount representing distortion of a prediction image in the corresponding candidate prediction mode and a prediction mode code amount representing an overhead code amount in the corresponding candidate prediction mode, and the cost function being determined by increasing a contribution of the prediction residual code amount or decreasing a contribution of the prediction mode code amount in the cost function as the dynamic range of the transfer function increases;
determining a prediction mode from the candidate prediction modes for coding a coding unit of the image according to cost values of the candidate prediction modes calculated according to the determined cost function; and
encoding the coding unit of the image according to the determined prediction mode.

17. The non-transitory computer-readable medium according to claim 16, wherein the determining the cost function comprises:
setting the prediction mode code amount of the corresponding candidate prediction mode to a first value in a case in which the transfer function corresponds to a first dynamic range; and
setting the prediction mode code amount of the corresponding candidate prediction mode to a second value in a case in which the transfer function corresponds to a second dynamic range,
wherein the second dynamic range is narrower than the first dynamic range, and the first value is smaller than the second value.

18. The non-transitory computer-readable medium according to claim 16, wherein the determining the cost function comprises:
setting the prediction residual code amount of the corresponding candidate prediction mode to a first value in a case in which the transfer function corresponds to a first dynamic range,
setting the prediction residual code amount of the corresponding candidate prediction mode to a second value in a case in which the transfer function corresponds to a second dynamic range,
the second dynamic range is narrower than the first dynamic range, and the first value is greater than the second value.

* * * * *